US012233523B2

(12) United States Patent
Billings et al.

(10) Patent No.: US 12,233,523 B2
(45) Date of Patent: Feb. 25, 2025

(54) POWER TOOL WITH MULTIPLE MODES OF OPERATION AND ERGONOMIC HANDGRIP

(71) Applicant: Black & Decker Inc., New Britain, CT (US)

(72) Inventors: Ross A. Billings, Reisterstown, MD (US); Wesson Charles, Rosedale, MD (US); Michael Allen, Damascus, MD (US); Sona Mathew, Towson, MD (US); Michael Sikora, Baltimore, MD (US); Curtiss Morton, Baltimore, MD (US); Robert J. Cirincione, II, Towson, MD (US); BhanuPrakash Villuri, Towson, MD (US); Paul J. Korick, New Cumberland, PA (US); Madhur M. Purohit, Ellicott City, MD (US); Jason McKillican, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/456,420

(22) Filed: Nov. 24, 2021

(65) Prior Publication Data

US 2022/0176534 A1 Jun. 9, 2022

Related U.S. Application Data

(60) Provisional application No. 63/199,108, filed on Dec. 7, 2020.

(51) Int. Cl.

*B25D 16/00* (2006.01)
*B25D 17/02* (2006.01)

(Continued)

(52) U.S. Cl.

CPC ........... *B25D 16/006* (2013.01); *B25D 17/02* (2013.01); *B25D 17/04* (2013.01); *B25F 5/001* (2013.01);

(Continued)

(58) Field of Classification Search

CPC ...... B25D 16/006; B25D 17/02; B25D 17/04; B25D 2216/0007; B25D 2250/121;

(Continued)

(56) References Cited

U.S. PATENT DOCUMENTS 1,744,976 A 1/1930 Axel
1,881,728 A 10/1932 Axel (Continued)

FOREIGN PATENT DOCUMENTS

DE 7905217 U1 5/1979
DE 3321635 A1 12/1984

(Continued)

OTHER PUBLICATIONS

European Search Report for Application No. 21212407.7, dated Aug. 23, 2022, 11 pages.

(Continued)

*Primary Examiner* — Thomas M Wittenschlaeger
*Assistant Examiner* — Katie L Gerth
(74) *Attorney, Agent, or Firm* — Brake Hughes Bellermann LLP

(57) ABSTRACT

A power tool includes a housing, a motor disposed in the housing, a motor controller disposed in the housing and electrically coupled to the motor, and a transmission disposed in the housing and coupled to the motor. A tool bit holder is rotatably driven by the motor via the transmission and receives a tool bit for rotatably driving threaded fasteners. A power switch and an electronic model select switch are actuatable from outside the housing and are coupled to (Continued)

the motor controller. The power switch controls power delivery to the motor. The electronic mode select switch is configured to select between at least a first mode of operation in which power delivery to the motor is controlled by actuation of the power switch and an electronic lock on mode in which continuous power is delivered to the motor upon a single actuation and release of the power switch.

23 Claims, 59 Drawing Sheets

(51) Int. Cl.

| | |
|---|---|
| ***B25D 17/04*** | (2006.01) |
| ***B25F 5/00*** | (2006.01) |
| ***B25F 5/02*** | (2006.01) |
| ***B25G 1/10*** | (2006.01) |

(52) U.S. Cl.
CPC ................ *B25F 5/02* (2013.01); *B25G 1/102* (2013.01); *B25D 2216/0007* (2013.01); *B25D 2250/121* (2013.01); *B25D 2250/255* (2013.01)

(58) Field of Classification Search
CPC ...... B25D 2250/255; B25F 5/001; B25F 5/02; B25G 1/102; B25B 21/02; B25B 21/00
See application file for complete search history.

(56) References Cited

U.S. PATENT DOCUMENTS

| | | | |
|---|---|---|---|
| 2,320,067 | A | 5/1943 | Caughren |
| 2,456,571 | A | 12/1948 | Turner et al. |
| 2,724,299 | A | 11/1955 | Amtsberg |
| 3,019,673 | A | 2/1962 | Sjostrand et al. |
| 3,114,423 | A | 12/1963 | Naslund |
| 3,203,490 | A | 8/1965 | McCarty et al. |
| 3,456,740 | A | 7/1969 | Paule et al. |
| 3,517,755 | A | 6/1970 | Badcock |
| 3,521,895 | A | 7/1970 | Smith |
| 3,712,352 | A | 1/1973 | Lafferty, Sr. |
| 3,809,349 | A | 5/1974 | Baedke |
| 3,851,562 | A | 12/1974 | Tomita et al. |
| 3,960,035 | A | 6/1976 | Workman et al. |
| 3,963,156 | A | 6/1976 | Perrin |
| 4,436,125 | A | 3/1984 | Blenkush |
| 4,628,586 | A | 12/1986 | Yoshimi et al. |
| 4,700,031 | A | 10/1987 | Claghorn et al. |
| 4,752,088 | A | 6/1988 | Stahl et al. |
| 4,809,572 | A | 3/1989 | Sasaki |
| 4,947,714 | A | 8/1990 | Fluri |
| 4,974,764 | A | 12/1990 | Cantwell |
| 5,052,497 | A | 10/1991 | Houben et al. |
| 5,060,733 | A | 10/1991 | Kress et al. |
| 5,090,747 | A | 2/1992 | Kotake |
| 5,113,951 | A | 5/1992 | Houben et al. |
| 5,138,916 | A | 8/1992 | Sato et al. |
| D330,318 | S | 10/1992 | Snider |
| D332,208 | S | 1/1993 | Sakamoto et al. |
| 5,209,308 | A | 5/1993 | Sasaki |
| D337,038 | S | 7/1993 | Sakamoto et al. |
| D345,090 | S | 3/1994 | Okumura |
| 5,342,155 | A | 8/1994 | Harroun |
| 5,372,206 | A | 12/1994 | Sasaki et al. |
| 5,398,946 | A | 3/1995 | Quiring |
| 5,447,343 | A | 9/1995 | Gajewski et al. |
| 5,452,830 | A | 9/1995 | Hopkins et al. |
| 5,464,229 | A | 11/1995 | Salpaka |
| 5,482,413 | A | 1/1996 | Argaud |
| 5,515,754 | A | 5/1996 | Elkins |
| 5,551,927 | A | 9/1996 | Maus et al. |
| 5,568,849 | A | 10/1996 | Sasaki et al. |
| 5,639,194 | A | 6/1997 | Harroun |
| 5,690,577 | A | 11/1997 | Enzmann et al. |
| 5,692,574 | A | 12/1997 | Terada |
| D399,055 | S | 10/1998 | Coady |
| D402,872 | S | 12/1998 | Clowers et al. |
| D406,740 | S | 3/1999 | Zurwelle |
| D413,242 | S | 8/1999 | Robson |
| 5,951,026 | A | 9/1999 | Harman, Jr. et al. |
| 5,988,653 | A | 11/1999 | Kuo |
| 6,047,971 | A | 4/2000 | Harman, Jr. et al. |
| 6,053,675 | A | 4/2000 | Holland et al. |
| 6,079,716 | A | 6/2000 | Harman, Jr. et al. |
| D429,134 | S | 8/2000 | Schultz et al. |
| 6,109,149 | A | 8/2000 | Neumaier |
| 6,127,751 | A | 10/2000 | Kristen et al. |
| 6,142,537 | A | 11/2000 | Shimada et al. |
| 6,173,792 | B1 | 1/2001 | Hald |
| 6,176,162 | B1 | 1/2001 | Ludwig et al. |
| 6,199,383 | B1 | 3/2001 | Pusateri |
| 6,270,085 | B1 | 8/2001 | Chen et al. |
| 6,293,559 | B1 | 9/2001 | Harman, Jr. |
| 6,321,622 | B1 | 11/2001 | Tsuge et al. |
| 6,325,157 | B1 | 12/2001 | Arakawa et al. |
| 6,354,177 | B2 | 3/2002 | Peters |
| 6,354,635 | B1 | 3/2002 | Dyson et al. |
| D457,046 | S | 5/2002 | Boyle et al. |
| D457,797 | S | 5/2002 | Huang |
| 6,455,186 | B1 | 9/2002 | Moores, Jr. et al. |
| D467,481 | S | 12/2002 | Watson |
| D470,028 | S | 2/2003 | Cooper |
| D470,737 | S | 2/2003 | Chunn et al. |
| 6,536,536 | B1 | 3/2003 | Gass et al. |
| 6,536,537 | B1 | 3/2003 | Sasaki et al. |
| 6,543,549 | B1 | 4/2003 | Riedl et al. |
| 6,551,037 | B2 | 4/2003 | Gifford et al. |
| D478,263 | S | 8/2003 | Welsh |
| 6,641,011 | B1 | 11/2003 | Kahn |
| 6,645,666 | B1 | 11/2003 | Moores, Jr. et al. |
| 6,648,192 | B1 | 11/2003 | Chong |
| D484,385 | S | 12/2003 | Sakai et al. |
| 6,679,406 | B2 | 1/2004 | Sakai et al. |
| 6,688,611 | B2 | 2/2004 | Gifford et al. |
| 6,694,631 | B2 | 2/2004 | Bone et al. |
| 6,729,414 | B2 | 5/2004 | Cooper et al. |
| 6,729,415 | B1 | 5/2004 | Huang |
| 6,776,245 | B2 | 8/2004 | Kristen et al. |
| D496,574 | S | 9/2004 | Sakai et al. |
| D497,300 | S | 10/2004 | Chen et al. |
| 6,803,683 | B2 | 10/2004 | Bone et al. |
| 6,834,730 | B2 | 12/2004 | Gass et al. |
| 6,866,105 | B2 | 3/2005 | Pfisterer et al. |
| 6,905,052 | B2 | 6/2005 | Sakai et al. |
| D507,952 | S | 8/2005 | Wu |
| 6,923,268 | B2 | 8/2005 | Totsu |
| 6,929,266 | B2 | 8/2005 | Peters et al. |
| 6,949,309 | B2 | 9/2005 | Moores, Jr. et al. |
| 6,962,523 | B2 | 11/2005 | Fraser et al. |
| D517,323 | S | 3/2006 | Raimondo et al. |
| 7,014,945 | B2 | 3/2006 | Moores, Jr. et al. |
| D519,808 | S | 5/2006 | Otsuka et al. |
| 7,066,678 | B2 | 6/2006 | Huang |
| D524,136 | S | 7/2006 | Taniguchi et al. |
| 7,093,668 | B2 | 8/2006 | Gass et al. |
| 7,121,358 | B2 | 10/2006 | Gass et al. |
| D531,476 | S | 11/2006 | Kokawa et al. |
| 7,140,451 | B2 | 11/2006 | Yoshimizu et al. |
| D533,420 | S | 12/2006 | Waldron |
| D533,423 | S | 12/2006 | Ino et al. |
| D534,405 | S | 1/2007 | Concari |
| 7,157,882 | B2 | 1/2007 | Johnson et al. |
| 7,157,883 | B2 | 1/2007 | Johnson et al. |
| 7,164,257 | B2 | 1/2007 | Johnson et al. |
| 7,165,663 | B2 | 1/2007 | Donner |
| D539,110 | S | 3/2007 | Okuda |
| 7,188,557 | B2 | 3/2007 | Yamada |
| D540,135 | S | 4/2007 | Okuda |
| 7,237,457 | B2 | 7/2007 | Hsu |
| D550,052 | S | 9/2007 | Lee |
| D556,002 | S | 11/2007 | Ino |
| 7,306,052 | B2 | 12/2007 | Vahabi-Nejad et al. |
| 7,307,230 | B2 | 12/2007 | Chen |

(56) References Cited

U.S. PATENT DOCUMENTS 7,308,950 B2 12/2007 Faatz et al.
D560,109 S 1/2008 Huang
7,328,752 B2 2/2008 Gass et al.
7,331,408 B2 2/2008 Arich et al.
D563,185 S 3/2008 Concari
7,342,381 B2 3/2008 Johnson et al.
7,344,054 B2 3/2008 Sakai et al.
D566,506 S 4/2008 Aglassinger
7,398,834 B2 7/2008 Jung et al.
7,431,136 B2 10/2008 Simm et al.
7,469,753 B2 12/2008 Klemm et al.
7,490,746 B2 2/2009 Sakai et al.
7,492,124 B2 2/2009 Johnson et al.
D587,545 S 3/2009 Hayakawa et al.
7,498,526 B2 3/2009 Lohr et al.
7,500,811 B2 3/2009 Pfob
7,504,804 B2 3/2009 Johnson et al.
D592,477 S 5/2009 Wright
7,540,334 B2 6/2009 Gass et al.
7,565,854 B2 7/2009 Chiang et al.
7,594,354 B1 9/2009 Chadwick
D605,015 S 12/2009 Aglassinger
D605,484 S 12/2009 Aglassinger
D605,485 S 12/2009 Aglassinger
D605,488 S 12/2009 Aglassinger
D605,489 S 12/2009 Aglassinger
D605,921 S 12/2009 Cowan
D609,073 S 2/2010 Lin
D609,543 S 2/2010 Misaki et al.
7,658,239 B2 2/2010 Klemm et al.
7,667,437 B2 2/2010 Johnson et al.
7,669,507 B2 3/2010 Furusawa et al.
7,677,752 B2 3/2010 Tadokoro et al.
7,705,497 B2 4/2010 Arich et al.
D617,168 S 6/2010 Yamamoto et al.
7,736,792 B2 6/2010 Moores, Jr. et al.
7,757,704 B2 7/2010 Lien
7,758,274 B2 7/2010 Paul
7,786,627 B2 8/2010 Riedl
7,791,318 B2 9/2010 Johnson et al.
7,793,572 B2 9/2010 Hirt et al.
7,802,706 B1 9/2010 Selsor
7,810,414 B2 10/2010 Hsu
7,823,483 B2 11/2010 Yamada
D628,454 S 12/2010 Misaki
7,874,232 B2 1/2011 Gauthreaux et al.
7,944,181 B2 5/2011 Johnson et al.
7,952,326 B2 5/2011 Johnson et al.
7,988,538 B2 8/2011 Trautner et al.
D647,774 S 11/2011 Okuda et al.
D647,775 S 11/2011 Toszegi
8,067,860 B2 11/2011 Hoffmann et al.
8,100,200 B2 1/2012 Wolfer
8,113,297 B2 2/2012 Sakakibara et al.
8,113,922 B2 2/2012 Esenwein
8,172,004 B2 5/2012 Ho
8,220,367 B2 7/2012 Hsu
8,261,852 B2 9/2012 Miyazawa et al.
8,261,853 B2 9/2012 Hachisuka
8,267,192 B2 9/2012 Lopano et al.
8,286,724 B2 * 10/2012 Furusawa ................ H01H 3/20 173/48
D670,989 S 11/2012 Kawase et al.
8,308,034 B2 11/2012 Shibata et al.
D672,627 S 12/2012 Kawase et al.
8,328,475 B2 12/2012 Naughton et al.
8,333,252 B2 12/2012 Britz et al.
8,348,727 B2 1/2013 Trautner et al.
8,354,183 B2 1/2013 Konuma et al.
8,360,439 B2 1/2013 Hirt et al.
D675,500 S 2/2013 Taniguchi et al.
8,381,832 B1 2/2013 Picard
8,381,835 B2 2/2013 Hosokawa
D677,137 S 3/2013 Kawase et al.
D678,744 S 3/2013 Aoki et al.
D679,160 S 4/2013 Okuda et al.
D679,161 S 4/2013 Kawase et al.
8,418,778 B2 4/2013 Eshleman et al.
8,430,182 B2 4/2013 Soika et al.
8,443,913 B2 5/2013 Nagasaka et al.
D684,612 S 6/2013 Frazier
8,499,850 B2 8/2013 Hofbrucker et al.
8,500,173 B2 8/2013 Zahler et al.
8,657,029 B2 2/2014 Miyazawa et al.
8,678,106 B2 3/2014 Matsunaga et al.
8,698,430 B2 * 4/2014 Watanabe ................ B25F 5/02 702/182
8,708,060 B2 4/2014 Tsuge
8,714,282 B2 5/2014 Chen et al.
D710,174 S 8/2014 Moss
D710,175 S 8/2014 Moss et al.
D710,176 S 8/2014 Santamarina
D713,706 S 9/2014 Jing et al.
D717,351 S 11/2014 Burca
D719,428 S 12/2014 Aoki et al.
8,944,179 B2 2/2015 Ukai et al.
D727,127 S 4/2015 Schmid
9,296,095 B2 3/2016 Yoshino et al.
9,505,120 B2 11/2016 Aoki et al.
9,508,497 B2 * 11/2016 Kuhnle .............. H01H 11/0018
9,539,716 B2 1/2017 Leupert et al.
9,550,290 B2 1/2017 Miyazawa et al.
10,131,042 B2 11/2018 Mergener et al.
10,131,043 B2 11/2018 Mergener et al.
10,213,908 B2 2/2019 Mergener et al.
10,272,550 B2 4/2019 Dey et al.
10,295,990 B2 5/2019 Dey et al.
10,322,498 B2 6/2019 Ishikawa et al.
10,350,744 B2 7/2019 Lopano et al.
10,391,599 B2 8/2019 Yoshida et al.
10,478,950 B2 11/2019 Nagasaka et al.
11,059,156 B2 * 7/2021 Abe ...................... B25D 17/24
11,498,197 B2 * 11/2022 Larsen ...................... B25F 5/02
2001/0050297 A1 12/2001 Zahorski
2002/0122707 A1 * 9/2002 Sakai .................... B25B 23/045 224/268
2002/0166421 A1 11/2002 Bowerman
2003/0121678 A1 * 7/2003 Manschitz ............... H01H 9/06 173/48
2003/0146008 A1 8/2003 Andriolo
2003/0168483 A1 9/2003 Mabe
2004/0011544 A1 1/2004 Cooper et al.
2004/0074938 A1 4/2004 Sakai et al.
2004/0112615 A1 * 6/2004 Mayr .................. B25D 16/006 173/217
2004/0178240 A1 9/2004 Bauer
2004/0188119 A1 9/2004 Chen
2004/0200628 A1 * 10/2004 Schmitzer ............ B25D 16/006 173/1
2005/0057042 A1 3/2005 Wicks
2005/0092792 A1 5/2005 Sakai et al.
2005/0230134 A1 10/2005 Wu
2005/0279517 A1 12/2005 Hoffman et al.
2006/0011367 A1 1/2006 Teng et al.
2006/0011681 A1 1/2006 Raimondo et al.
2006/0088393 A1 4/2006 Cooper
2006/0137144 A1 6/2006 Tillim et al.
2006/0156859 A1 * 7/2006 Nemetz .................. B25D 17/24 74/606 R
2006/0185866 A1 * 8/2006 Jung .................... B25D 16/006 173/48
2006/0225540 A1 10/2006 Tsai et al.
2006/0291966 A1 * 12/2006 Klemm ................... B25B 21/00 408/124
2007/0102462 A1 3/2007 Sakai et al.
2008/0017396 A1 * 1/2008 Kristen ................ B25D 16/006 173/162.2
2008/0187822 A1 8/2008 Brietenbach
2011/0094764 A1 4/2011 Wei
2011/0139479 A1 6/2011 Nagasaka et al.
2011/0180286 A1 7/2011 Oomori et al.
2011/0204621 A1 8/2011 Whitaker et al.
2011/0209888 A1 9/2011 Elsworthy

(56) References Cited

U.S. PATENT DOCUMENTS

| | | | | |
|---|---|---|---|---|
| 2011/0297409 | A1 | 12/2011 | Chen et al. | |
| 2011/0303718 | A1 | 12/2011 | Spasov et al. | |
| 2012/0043102 | A1 | 2/2012 | Okuda | |
| 2012/0061117 | A1 | 3/2012 | Nagasaka et al. | |
| 2012/0073847 | A1 | 3/2012 | Nagasaka et al. | |
| 2012/0080963 | A1 | 4/2012 | Yoshikawa | |
| 2012/0085560 | A1 | 4/2012 | Kuroyanagi et al. | |
| 2012/0090863 | A1 | 4/2012 | Puzio et al. | |
| 2012/0160530 | A1 | 6/2012 | Ikuta et al. | |
| 2012/0169256 | A1 | 7/2012 | Suda et al. | |
| 2012/0199372 | A1 | 8/2012 | Nishikawa et al. | |
| 2012/0292865 | A1 | 11/2012 | Sugimoto et al. | |
| 2012/0318549 | A1 | 12/2012 | Nagasaka et al. | |
| 2013/0000934 | A1 | 1/2013 | Tadokoro et al. | |
| 2013/0105188 | A1 | 5/2013 | Sakamaki et al. | |
| 2014/0008090 | A1 | 1/2014 | Kokinelis et al. | |
| 2014/0190717 | A1* | 7/2014 | Simpson | G09F 23/00 29/428 |
| 2015/0041164 | A1* | 2/2015 | Sergyeyenko | B25B 23/147 173/176 |
| 2015/0151424 | A1 | 6/2015 | Elder et al. | |
| 2015/0231779 | A1 | 8/2015 | Kaupp et al. | |
| 2015/0290791 | A1 | 10/2015 | Takahashi et al. | |
| 2016/0311094 | A1* | 10/2016 | Mergener | H02J 7/0024 |
| 2016/0354888 | A1 | 12/2016 | Huber et al. | |
| 2016/0354905 | A1 | 12/2016 | Ely et al. | |
| 2017/0083014 | A1* | 3/2017 | Conrad | B25B 23/1475 |
| 2017/0151661 | A1 | 6/2017 | Chen | |
| 2018/0015603 | A1 | 1/2018 | Abe et al. | |
| 2018/0021931 | A1 | 1/2018 | Abe et al. | |
| 2018/0215029 | A1 | 8/2018 | Steckel | |
| 2018/0222022 | A1 | 8/2018 | Kumagai et al. | |
| 2019/0022837 | A1 | 1/2019 | Dey et al. | |
| 2019/0111550 | A1 | 4/2019 | Kato et al. | |
| 2019/0111551 | A1 | 4/2019 | Kato et al. | |
| 2019/0143495 | A1 | 5/2019 | Mergener et al. | |
| 2019/0219990 | A1 | 7/2019 | Dey et al. | |
| 2019/0283227 | A1* | 9/2019 | Gumpert | B25B 23/1475 |
| 2020/0023501 | A1 | 1/2020 | Bandy et al. | |
| 2020/0047319 | A1 | 2/2020 | Nagasaka et al. | |
| 2020/0094392 | A1* | 3/2020 | Larsen | B25F 5/001 |

FOREIGN PATENT DOCUMENTS

| | | | |
|---|---|---|---|
| DE | 4333599 | | 4/1994 |
| DE | 19908300 | C1 | 11/2000 |
| DE | 10209096 | | 9/2002 |
| DE | 102004007764 | B3 | 9/2005 |
| DE | 202006004934 | U1 | 8/2007 |
| DE | 10109956 | B4 | 4/2009 |
| DE | 202013105823 | U1 | 4/2014 |
| DE | 102012220423 | A1 | 5/2014 |
| DE | 102012220426 | A1 | 5/2014 |
| DE | 202015002702 | U1 | 4/2015 |
| EP | 0345896 | | 12/1989 |
| EP | 1344609 | A1 | 9/2003 |
| EP | 1321246 | A3 | 6/2004 |
| EP | 1632313 | | 3/2006 |
| EP | 1645372 | | 4/2006 |
| EP | 1690649 | A1 | 8/2006 |
| EP | 1327500 | B1 | 7/2007 |
| EP | 1864758 | | 12/2007 |
| EP | 1759813 | A3 | 4/2008 |
| EP | 1720678 | A4 | 5/2009 |
| EP | 2186609 | A2 | 5/2010 |
| EP | 2221150 | A1 | 8/2010 |
| EP | 2239102 | A2 | 10/2010 |
| EP | 2258518 | A2 | 12/2010 |
| EP | 2022607 | B1 | 3/2011 |
| EP | 2349648 | | 8/2011 |
| EP | 2363246 | A2 | 9/2011 |
| EP | 2380707 | | 10/2011 |
| EP | 2404708 | | 1/2012 |
| EP | 2428325 | | 3/2012 |
| EP | 2433758 | | 3/2012 |
| EP | 2439024 | | 4/2012 |
| EP | 2444202 | A2 | 4/2012 |
| EP | 2468453 | | 6/2012 |
| EP | 2474391 | | 7/2012 |
| EP | 2489473 | A2 | 8/2012 |
| EP | 2517833 | | 10/2012 |
| EP | 2184138 | B1 | 1/2013 |
| EP | 2402123 | B1 | 5/2013 |
| EP | 2749376 | A2 | 7/2014 |
| EP | 2835223 | A1 | 2/2015 |
| EP | 2186609 | B1 | 10/2015 |
| EP | 3078458 | A1 | 10/2016 |
| EP | 2946886 | B1 | 2/2017 |
| EP | 2647474 | B1 | 4/2017 |
| EP | 2364818 | B1 | 8/2017 |
| EP | 3342536 | A1 | 7/2018 |
| EP | 3369529 | A1 | 9/2018 |
| EP | 3381621 | A1 | 10/2018 |
| EP | 3235604 | B1 | 6/2019 |
| EP | 3539724 | A1 | 9/2019 |
| GB | 2426797 | A | 12/2006 |
| JP | 09011158 | A | 1/1997 |
| JP | 2002307326 | A | 10/2002 |
| JP | 2004255503 | A | 9/2004 |
| JP | 2005153049 | A | 6/2005 |
| JP | 2006123086 | A | 5/2006 |
| JP | 2006255837 | A | 9/2006 |
| JP | 2007276108 | A | 10/2007 |
| JP | 2008044024 | A | 2/2008 |
| JP | 2008062337 | A | 3/2008 |
| JP | 2008062344 | | 3/2008 |
| JP | 2008284617 | A | 11/2008 |
| JP | 2009078322 | A | 4/2009 |
| JP | 2009083058 | A | 4/2009 |
| JP | 2010036260 | A | 2/2010 |
| JP | 4525298 | B2 | 6/2010 |
| JP | 2010149246 | | 7/2010 |
| JP | 2010201512 | A | 9/2010 |
| JP | 2011101919 | | 5/2011 |
| JP | 2011235372 | A | 11/2011 |
| JP | 2012040659 | A | 3/2012 |
| JP | 2012196737 | A | 10/2012 |
| JP | 2013006253 | A | 1/2013 |
| JP | 5201389 | B2 | 2/2013 |
| JP | 2014028412 | A | 2/2014 |
| JP | 5759321 | B2 | 6/2015 |
| JP | 3207597 | B2 | 10/2016 |
| WO | 200047872 | | 8/2000 |
| WO | 2008035811 | | 3/2008 |
| WO | 2011052260 | A1 | 5/2011 |

OTHER PUBLICATIONS

Deutsch, Stuart—"New Dewalt 20V Brushless Drywall Screwgun"—Tool Guyd—Jul. 18, 2014 [online], [retrieved on Oct. 15, 2014]—Retrieved from <URL: http://toolguyd.com/dewalt-20v-brushless-drywall-screwgun/>.

Forte, Ian—"DeWalt Studio Fall 2011: Final Model—DeWalt Ergo Tech Cordless Drywall Screwgun"—Coroflot—Oct. 16, 2011 [online] [retrieved on Oct. 15, 2014]—Retrieved from <URL: www.coroflot.com/ianforte/dewalt-studio-fall-2011>.

amazon.com—printout of webpage offering sale of Bosch SG182BN Bare Tool 18-Volt Brushless Drywall Screwdriver—Jan. 13, 2015—3 pages—U.S.A.

Hilti Online—printout of webpage offering sale of Hilti SD 4500-A18 Cordless Drywall Screw Driver—Jan. 13, 2015—2 pages—U.S.A.

makitatools.com—printout of webpage offering sale of 18V LXT® Lithium-Ion Cordless Drywall Screwdriver, Tool Only, Model LXSF01Z—Jan. 13, 2015—2 pages—U.S.A.

Extended European Search Report for EP Application No. 23156289.3, dated May 16, 2023, 10 pages.

Dewaele, Karl—Examination Report re: related European Patent Application No. 16151118.3-1019—dated Mar. 27, 2018—7 pages—European Patent Office—Netherlands.

(56) References Cited

OTHER PUBLICATIONS

Dewaele, Karl—Extended European Search Report—dated Aug. 31, 2017—8 pages—The Hague.
Dewaele, Karl—Partial European Search Report re: related EP application No. 16151118—dated Jul. 25, 2016—13 pages—The Hague.

* cited by examiner

2912

POWER TOOL WITH MULTIPLE MODES OF OPERATION AND ERGONOMIC HANDGRIP

CROSS REFERENCE TO RELATED APPLICATION

This application claims the benefit of U.S. Provisional Application No. 63/199,108, filed on Dec. 7, 2020, and titled "Power Tool With Multiple Modes Of Operation And Ergonomic Handgrip," which is hereby incorporated by reference in its entirety.

TECHNICAL FIELD

This description relates to a power tool with multiple modes of operation and an ergonomic handgrip.

BACKGROUND

When performing fastening tasks such as fastening sheet goods to interior or exterior walls, there are many variations in the fastening tasks that present challenges to productivity. For example, there are variations in material types and hardness, variations in fastener quality and fastener type, variations in wall type (e.g., wood vs. metal) and wall thickness, as well as other variations. Many power tools for performing fastening tasks, such as screwguns, have one speed and/or one mode for the varied fastening tasks and situations. Having one speed and/or one mode to cover all fastening variations can lead to damaged or broken fasteners, which causes delays and lost productivity. Users may also manually slow the screwgun down using partial trigger actuation, which also reduces productivity and increases user fatigue.

Additionally, power tools such as screwguns are a type of "dead spindle" power tool where the motor and the output spindle are separated from each other until the user applies pressure to push the two component together. Once the corresponding clutches engage, power is transmitted from the motor to the output spindle and a fastener (e.g., screw) is driven into a work piece. Generally, these power tools have an on/off trigger that a user needs to pull to drive the fastener.

It is desirable to have a power tool for fastening and other tasks, such as a screwgun, with technical improvements that address these challenges.

SUMMARY

According to one general aspect, a power tool includes a housing, a motor disposed in the housing, a motor controller disposed in the housing and electrically coupled to the motor, a transmission disposed in the housing and coupled to the motor, and a tool bit holder configured to be rotatably driven by the motor via the transmission and configured to receive a tool bit for rotatably driving threaded fasteners. The power tool includes a power switch actuatable from outside the housing and coupled to the motor controller to control power delivery to the motor and an electronic mode select switch actuatable from outside the housing and electrically coupled to the motor controller. The electronic mode select switch is configured to select between at least a first mode of operation in which power delivery to the motor is controlled by actuation of the power switch and an electronic lock on mode in which continuous power is delivered to the motor upon a single actuation and release of the power switch.

According to another general aspect, a power tool includes a housing including a motor housing portion, a transmission housing portion coupled to the motor housing portion, and a handle portion coupled to and extending transverse to the motor housing portion, a motor disposed at least partially in the motor housing portion, a motor controller disposed in the housing and electrically coupled to the motor to control power delivery to the motor, a transmission disposed at least partially in the transmission housing portion, and a tool bit holder configured to be rotatably driven by the motor via the transmission and configured to receive a tool bit for rotatably driving threaded fasteners. The power tool includes a power switch actuatable from outside the housing and coupled to the motor controller to control power delivery to the motor and an electronic mode select switch coupled to and actuatable from outside the motor housing. The electronic mode select switch is electrically coupled to the motor controller and is configured to select among a plurality of modes of operation of the motor, where the electronic mode select switch is configured to be actuatable by a user with one hand while gripping the housing with the one hand in a position for actuating the power switch and driving a threaded fastener into a workpiece.

According to another general aspect, a power tool includes a housing including a motor housing portion, a transmission housing portion coupled to the motor housing portion, and a handle portion coupled to and extending transverse to a bottom surface of the motor housing portion, where the motor housing portion includes a top surface generally opposite the bottom surface. The power tool includes a motor at least partially disposed in the motor housing portion, a motor controller disposed in the housing and electrically coupled to the motor, a transmission disposed at least partially in the transmission housing portion, a tool bit holder configured to be rotatably driven by the motor via the transmission and configured to receive a tool bit for rotatably driving treaded fasteners, a power switch actuatable from outside the housing and coupled to the motor controller to control power delivery to the motor, and an electronic mode select switch coupled to and actuatable from outside the motor housing portion. The electronic mode select switch is electrically coupled to the motor controller and configured to select among a plurality of modes of operation of the motor. The electronic mode select switch is disposed on the top surface of the motor housing portion. The power tool includes a belt clip disposed on the top surface of the motor housing portion.

According to another general aspect, a power tool includes a housing, a motor disposed in the housing, a motor controller disposed in the housing and electrically coupled to the motor, a transmission and clutch assembly disposed in the housing and coupled to the motor, where the transmission and clutch assembly includes at least an output clutch and an input clutch, a tool bit holder configured to be rotatably driven by the motor via the transmission and clutch assembly and configured to receive a tool bit for rotatably driving threaded fasteners, a power switch actuatable from outside the housing and coupled to the motor controller to control power delivery to the motor, an electronic mode select switch actuatable from outside the housing and electrically coupled to the motor controller and having one or more modes of operation for controlling power to the motor, and a mode change sensor for sensing changes in position of the output clutch, where the mode change sensor is located forward of the input clutch and is configured to send signals to the electronic mode select switch responsive to sensing changes in the position of the output clutch.

According to another general aspect, a power tool includes a housing, a motor disposed in the housing, a motor controller disposed in the housing and electrically coupled to the motor, and a transmission and clutch assembly disposed in the housing and coupled to the motor. The transmission and clutch assembly includes a planetary gear assembly having a planet carrier, an output clutch, an intermediate clutch coupled to one face of the planet carrier, and an input clutch integrated with an opposite face of the planet carrier. The power tool includes an electronic mode select switch coupled to and actuatable from outside the motor housing, where the electronic mode select switch is electrically coupled to the motor controller and is configured to select among a plurality of modes of operation of the motor, and a tool bit holder configured to be rotatably driven by the motor via the transmission and clutch assembly and configured to receive a tool bit for rotatably driving threaded fasteners.

According to another general aspect, a power tool includes a housing, a motor disposed in the housing, a motor controller disposed in the housing and electrically coupled to the motor, a transmission disposed in the housing and configured to be driven by the motor, an output spindle extending from the housing and configured to be moved axially relative to the housing when depressed against a workpiece, a clutch disposed between the transmission and the tool bit holder, the clutch having an input clutch member coupled to the transmission and an output clutch member coupled to the output spindle, the output clutch moveable between a rearward position in which torque is transmitted from the transmission to the output spindle via the clutch when the output spindle is depressed against a workpiece, and a forward position in which torque transmission from the transmission to the output shaft is interrupted, a sensor assembly including a sensed member coupled to the output spindle axially forward of the output clutch member and configured to move axially with the output spindle and a sensing member axially fixed relative to the housing to sense a position of the sensed member, and a brake mechanism configured to engage the output member the clutch when in the forward position to inhibit rotation of the output member, the brake mechanism including at least one leg extending from a point axially forward of the sensed member and extending past at least a portion of the sensed member to engage the output clutch member when in the forward position.

The details of one or more implementations are set forth in the accompanying drawings and the description below. Other features will be apparent from the description and drawings, and from the claims.

DETAILED DESCRIPTION

Figure 1B:
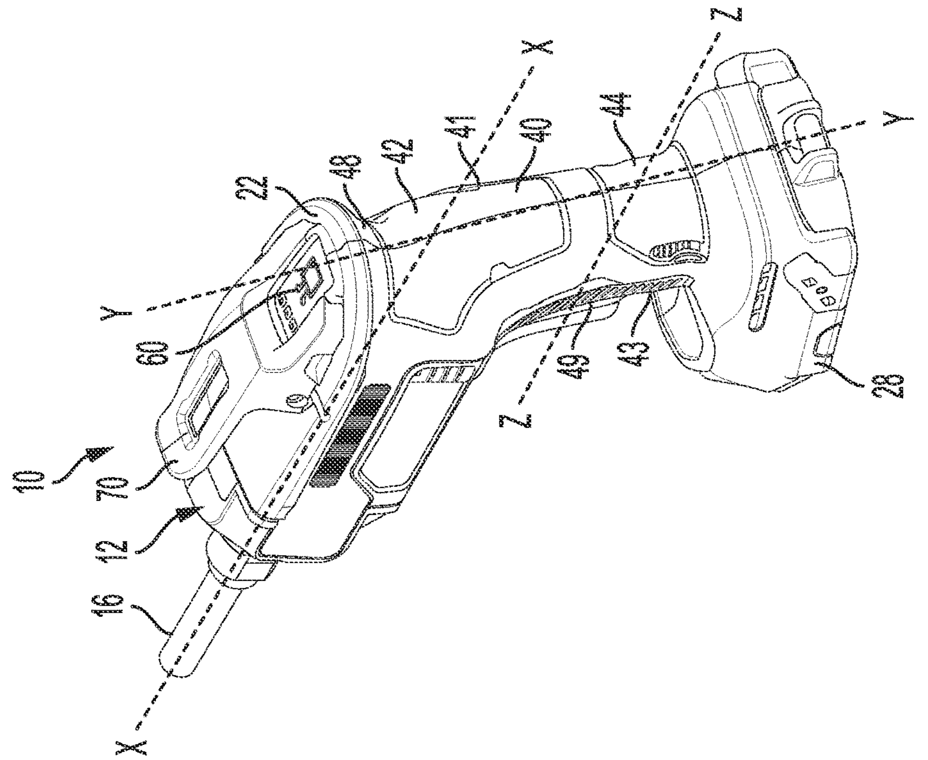
FIG. 1B is a rear perspective view of the screwgun of FIG. 1A.

This document describes and illustrates a power tool, such as a screwgun (also referred to interchangeably as a screwdriver), that is a battery powered, cordless power tool. The power tool is generally configured to rotatably drive threaded fasteners into a workpiece. More specifically, in some implementations, the power tool may be used to drive drywall screws for affixing drywall to studs. To assist with driving threaded fasteners into a workpiece, the power tool includes an electronic mode select switch (also referred to as a digital mode select switch), which enables the power tool to be operated in one of multiple modes of operation. The modes of operation enable a motor in the power tool to be operated in various different drive modes. For example, the modes of operation include one or more of manual high speed, manual low speed, push start mode, lock on mode, and one or more rapid sequential modes. More specifically, the manual high speed mode and the manual low speed mode control the motor mode of operation and power delivery to the motor in cooperation with the actuation of a power switch (also referred to as a trigger) on the power tool. The other modes of operation control the motor mode of operation regardless of the actuation of the power switch.

In this manner, the electronic mode select switch provides different modes of operation for the power tool, including modes at different speeds, to address the technical needs and varied situations for driving fasteners into workpieces. This provides the user more options for operating the power tool in different fastening situations compared to a power tool with fewer speeds and fewer modes of operation. The user may select an appropriate mode of operation for a given fastening situation. By using an appropriate mode of operation for the given fastening situation, fastening efficiency may be improved and re-work of fastening jobs may be avoided because damage to fasteners and/or the workpiece can be minimized because the mode of operation may be better matched to the fastening situation. Furthermore, user fatigue caused by trying to control the motor speed using the power switch may be reduced by providing modes of operation that operate the power tool at different speeds using the power switch and in different modes without having to actuate the power switch. Also, the electronic mode select switch enables more modes of operation and a smoother transition between modes of operation when compared to a mechanical mode select switch. A visual indicator on the electronic mode select switch may be used to indicate the selected mode of operation. Each of the modes of operation is described in more detail below.

The power tool is ergonomically configured to enable simultaneous one-handed operation of the power tool and one-handed operation of both the power switch and the electronic mode select switch using the same hand. The electronic mode select switch and the power switch are both actuatable from outside the housing of the power tool. For example, the power switch may be located on a handle portion of the housing and the electronic mode select switch may be located on a motor housing portion of the housing. More specifically, for instance, the electronic mode select switch may be located on a top surface of the motor housing portion. The housing is ergonomically configured with multiple gripping regions to enable multiple, different one-handed grip positions by the user, while simultaneously providing access to the electronic mode select switch on the motor housing portion and the power switch on the handle portion. The ergonomic configuration of the power tool provides comfort during operation of the power tool for extended periods of time, which may reduce user fatigue during the extended use periods. The ergonomic configuration also provides for one-handed ease of operation using the various different modes of operation. Additionally, a belt clip (also referred to as a clip or tool clip) may be located in a same area on the motor housing portion as the electronic mode select switch. The belt clip may protect the electronic mode select switch from physical damage due to unintended drops of the power tool and/or unintended banging of the power tool against a foreign object and may provide a convenient place to retain the power tool on a user's belt or other stationary object when not in use.

As mentioned above, the power tool includes multiple different modes of operation. For some of the modes of operation, the power tool includes a sensing mechanism (also referred to as a sensor or a mode change sensor) that is used to detect and trigger one or more of the modes of operation. The sensor, which may be a Hall sensor, an inductive sensor, or other type of sensor, senses a position of the output clutch when the input clutch is engaged and the sensor sends a signal that causes the motor to start. The sensor may be located on or in front of the output clutch, as illustrated and described below in more detail, which increases the accuracy of sensing the position of the output clutch and reduces the complexity of prior sensing linkages, which were at least partially located behind the output clutch.

Furthermore, the power tool includes a multiple part clutch arrangement in combination with a planetary gear transmission. In one example arrangement, an input clutch face and corresponding clutch surfaces are integrated as part of the output planet gear carrier of the transmission. The integrated clutch and transmission components provides for a more compact clutch and transmission assembly and for an overall more compact and ergonomically configured, quieter operating power tool. These features and other features are described in more detail below with respect to the figures.

Figure 1A:
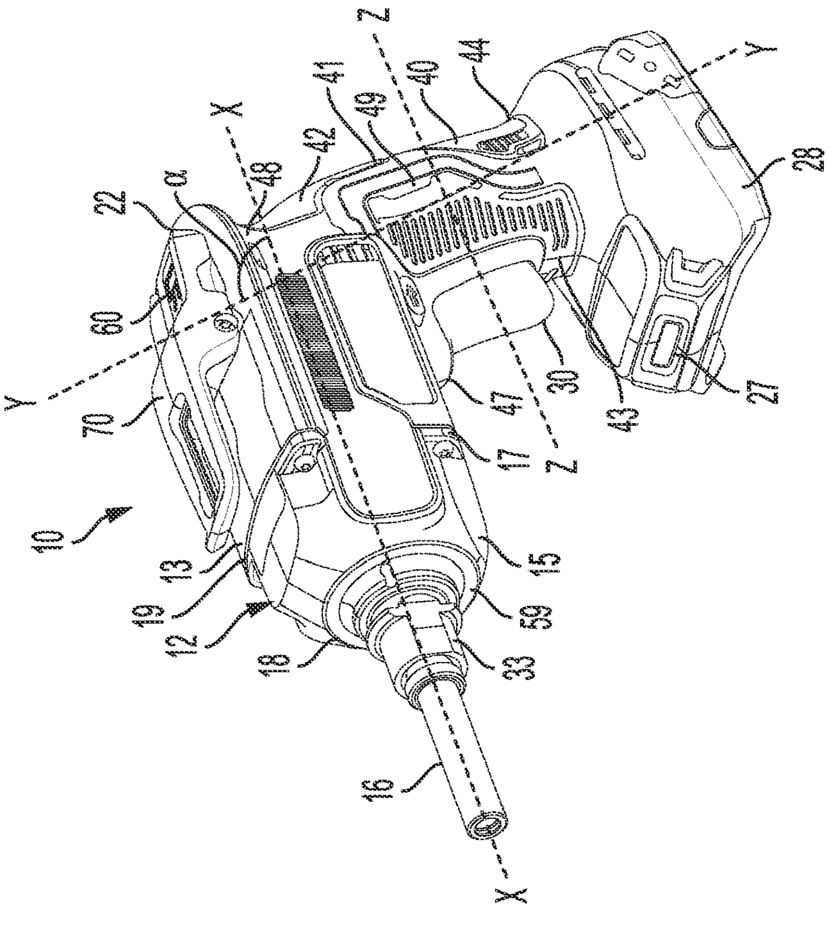
FIG. 1A is a front perspective view of an example screwgun.
Figure 1D:
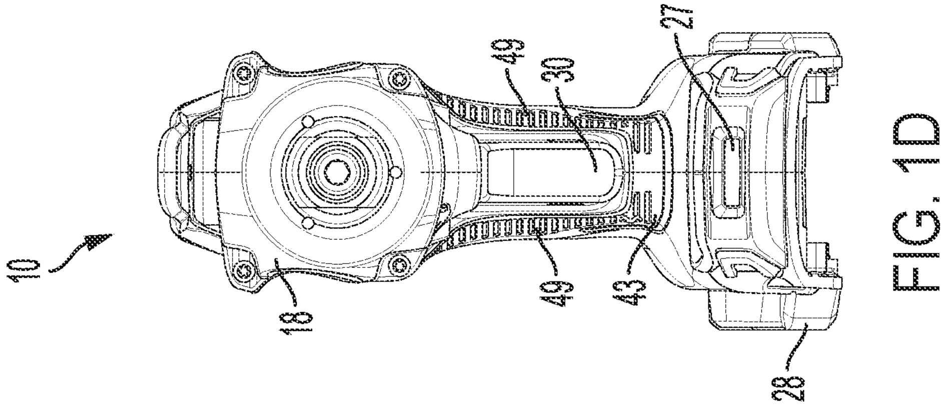
FIG. 1D is a front view of the screwgun of FIG. 1A.
Figure 1C:
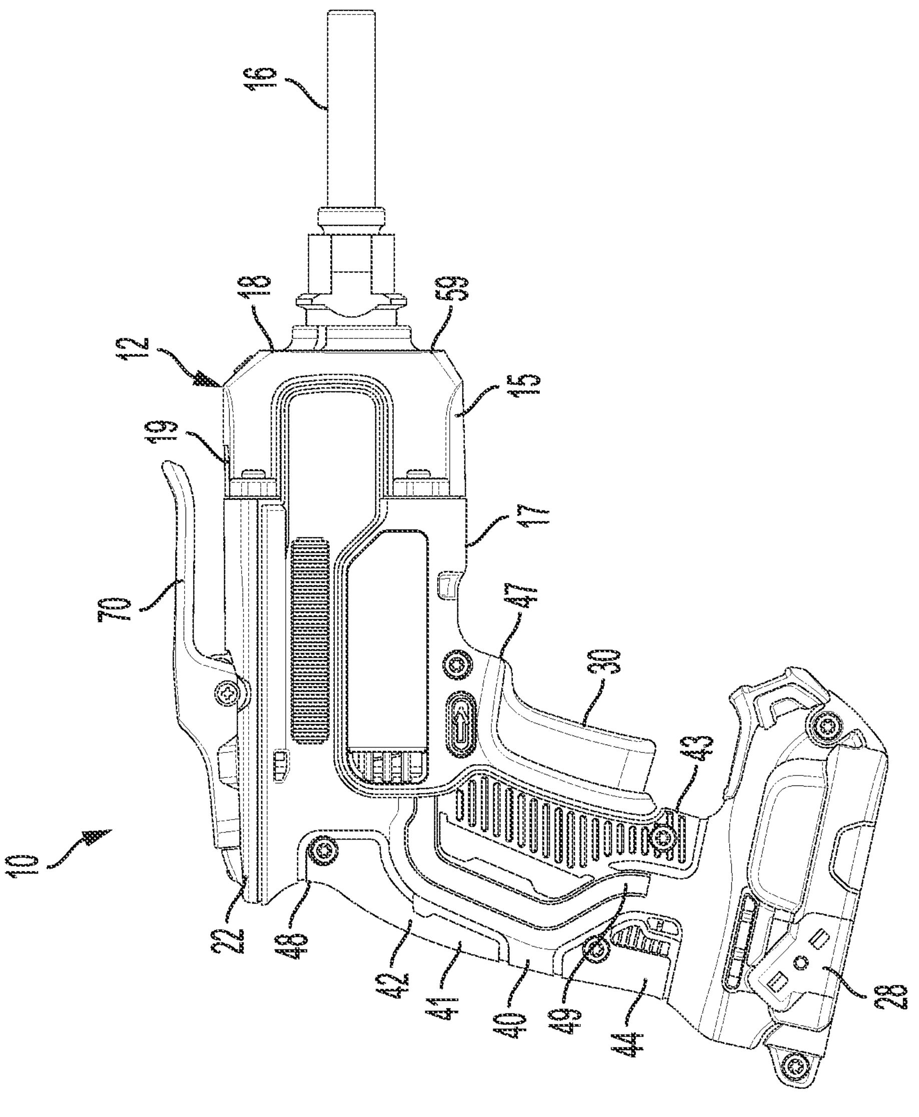
FIG. 1C is a right side view of the screwgun of FIG. 1A.
Figure 1F:
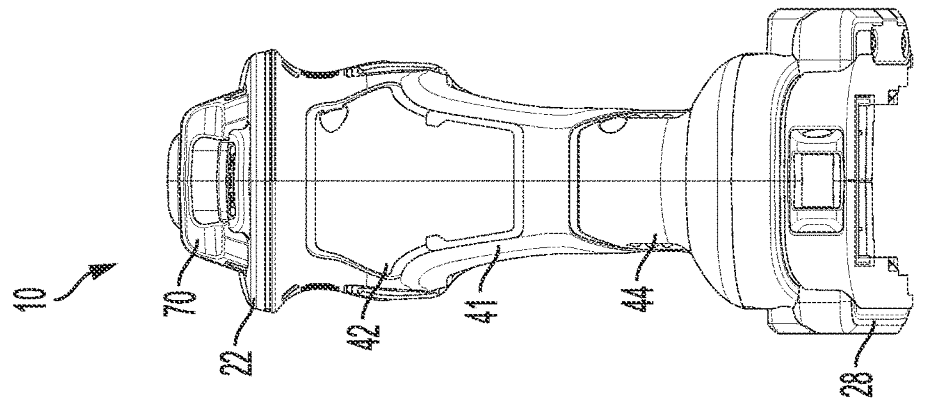
FIG. 1F is a rear view of the screwgun of FIG. 1A.
Figure 1E:
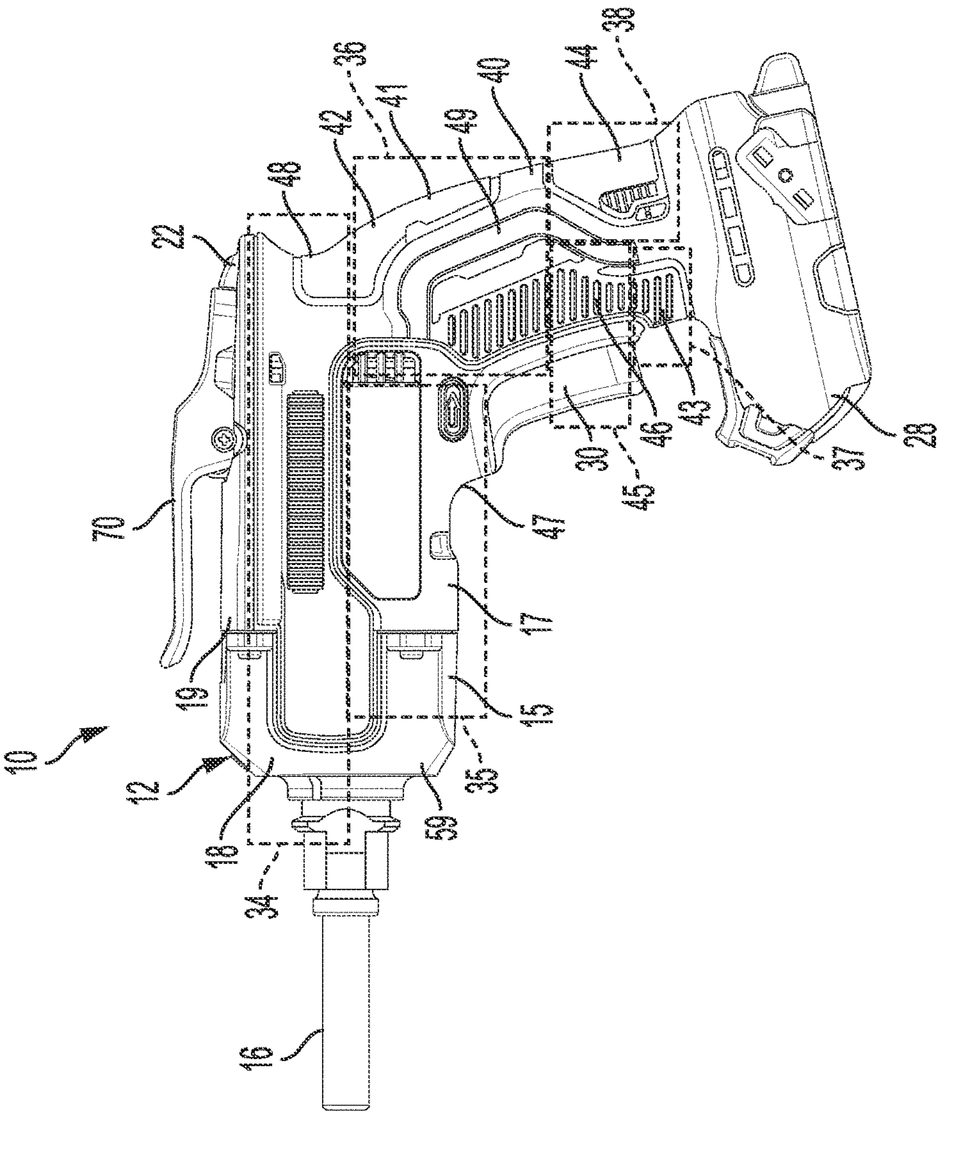
FIG. 1E is a left side view of the screwgun of FIG. 1A.
Figure 1H:
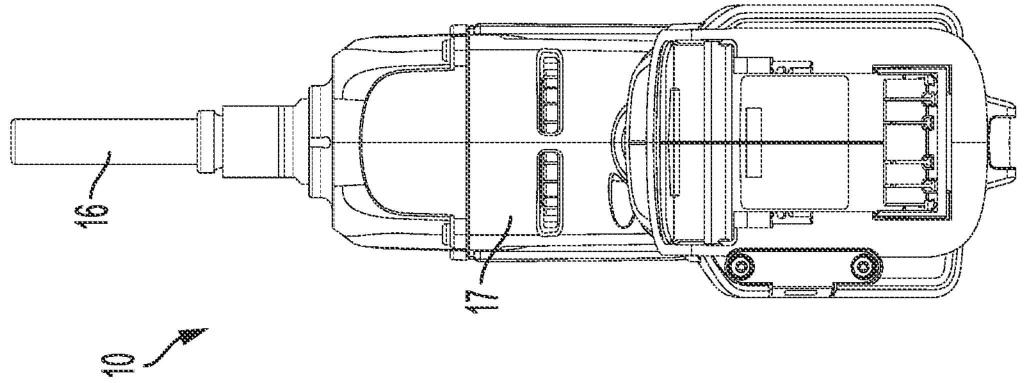
FIG. 1H is a bottom view of the screwgun of FIG. 1A.
Figure 1G:
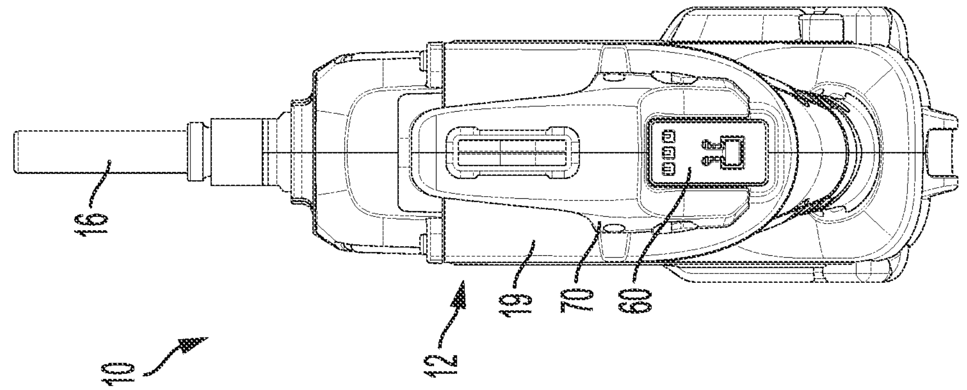
FIG. 1G is a top view of the screwgun of FIG. 1A.
Figure 2:
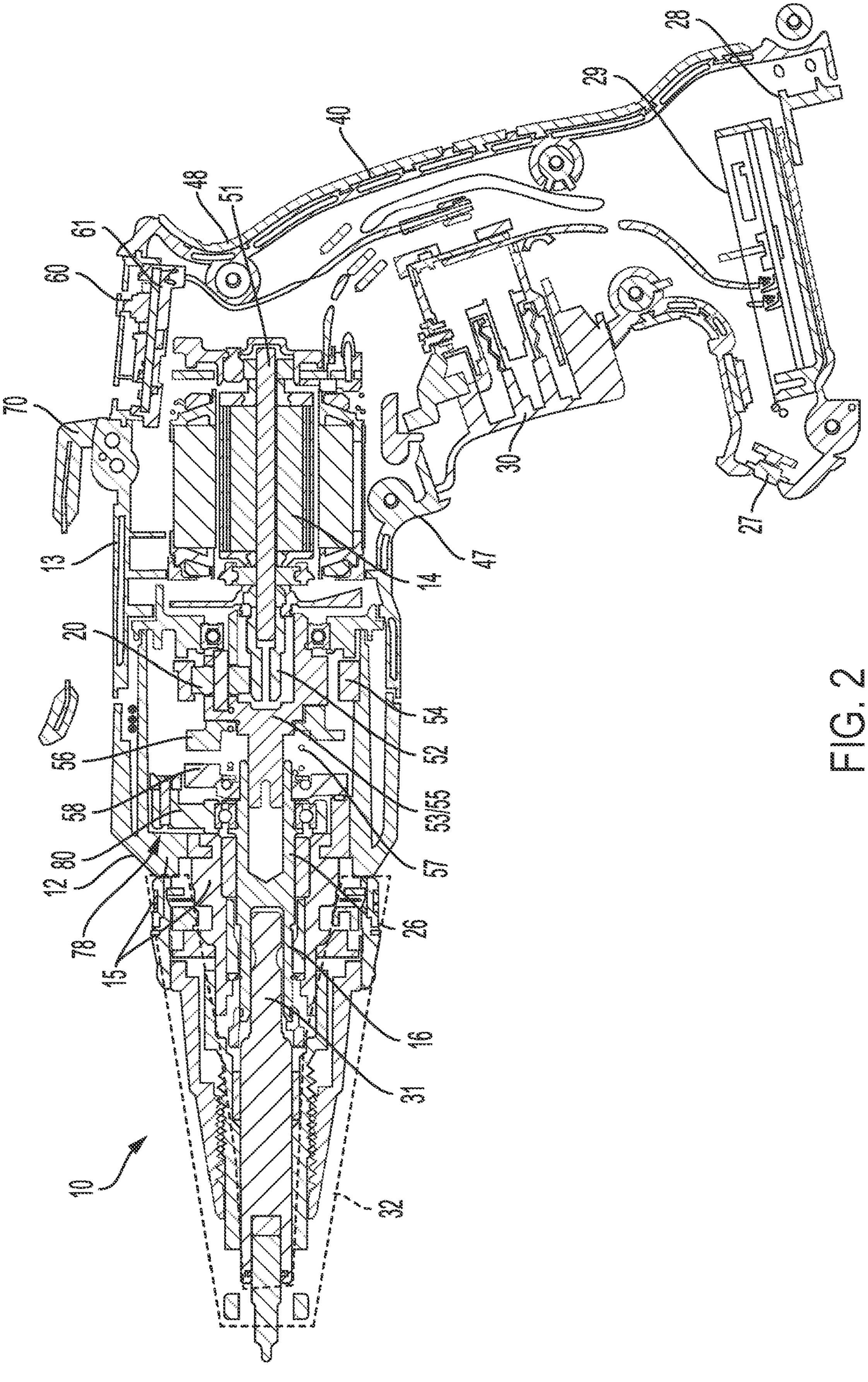
FIG. 2 is left side cutaway view of an example screwgun.

Referring to FIGS. 1A-1H and 2, in one example implementation, a power tool 10 is illustrated. In the illustrated examples, the power tool 10 is a screwgun, which also may be referred to as a screwdriver, that is configured to rotatably drive threaded fasteners into a workpiece. FIG. 1A is a front perspective view of the example screwgun. FIG. 1B is a rear perspective view of the screwgun of FIG. 1A. FIG. 1C is a right side view of the screwgun of FIG. 1A. FIG. 1D is a front view of the screwgun of FIG. 1A. FIG. 1E is a left side view of the screwgun of FIG. 1A. FIG. 1F is a rear view of the screwgun of FIG. 1A. FIG. 1G is a top view of the screwgun of FIG. 1A. FIG. 1H is a bottom view of the screwgun of FIG. 1A. FIG. 2 is left side cutaway view of an example screwgun.

The power tool 10 has a housing 12 having a front end portion 18, a rear end portion 22, and sidewalls defining a tool axis X-X. The housing includes a motor housing portion 13 that contains a motor 14 (e.g., a rotary motor) and a transmission housing portion 15 that contains a planetary gear transmission that transmits rotary motion from the motor 14 to an output spindle 26. The motor housing portion 13 includes a bottom surface 17 and a top surface 19, which is generally opposite the bottom surface 17. The transmission housing portion 15 is coupled to the motor housing portion 13. Coupled to the front end portion 18 of the transmission housing portion 15 and mechanically connected to the output spindle 26 is a working end or tool bit holder 16 for retaining a tool bit 31 (e.g., a drill bit or screw driving bit), as shown in FIG. 2, and defining a tool holder axis X-X. As shown, the tool bit holder 16 includes a hex bit retention mechanism. Further details regarding example tool holders are set forth in commonly-owned U.S. Patent Application Nos. 12/394,426 (now U.S. Pat. No. 8,622,401) and 14/186,088 (now U.S. Pat. No. 9,616,557), which are incorporated herein by reference. The working end of the tool bit holder 16 could encompass other elements, such as a different hex bit holder, a chuck, a nosepiece of a nailer or stapler, or a saw blade holder. As illustrated in FIG. 2, a removable depth adjust nosecone assembly 32 is coupled to the front end portion 18 of the housing 12. The motor 14 drives the working end or tool bit holder 16 via the motor output shaft 51, the transmission, and the output spindle 26. A nosepiece 33 or magazine may optionally be coupled to the front end portion 18 of the housing 12, as described and shown in the aforementioned U.S. patent application Ser. No. 14/186,088 (now U.S. Pat. No. 9,616,557), which is incorporated by reference.

Extending downward and slightly rearward of the housing 12 is a handle portion 40 in a pistol grip formation. The handle portion 40 has a proximal portion 42 coupled to the housing 12 and a distal portion 44 coupled to a battery receptacle 28. The handle portion 40 also has a first front wall portion 43 and a second front wall portion 59 facing the tool bit holder 16 side of the tool, a rear wall portion 41 facing away from the tool bit holder 16 side of the tool, and sidewalls 49. The handle portion 40 extends generally along a handle axis Y-Y that is at an obtuse angle α to the tool bit holder axis X-X and that lies along a midline of the handle portion 40. For example, the angle α may be approximately 100-115 degrees, e.g., approximately 106 degrees, such that the distal portion 44 is located generally rearward and downward of the rear end portion 22 of the housing 12. It should be understood that this angle can be varied among a wide range of angles. The handle portion 40 also includes a finger rest recess 47 and a rear concave recess 48 for use when gripping the power tool 10 in one-handed operation.

The motor 14 may be powered by an electrical power source, e.g., a battery (not shown), which is coupled to the battery receptacle 28. In some implementations, the motor 14 may be a brushless motor. It is understood that the motor 14 may be implemented as other types of motors. A trigger 30, also referred to as a power switch, is coupled to the handle portion 40 adjacent the motor housing portion 13 of the housing 12. The trigger 30 electrically connects the battery (or other source of power) to the motor 14 via a motor controller 29 for controlling power delivery to the motor 14. The motor controller 29 is in electrical communication with the motor 14. The motor controller 29 may include a memory module and a microcontroller. The trigger 30 defines a trigger axis Z-Z extending along the direction of trigger travel, which is generally perpendicular to the handle axis Y-Y. A light unit (e.g., an LED) 27 may be disposed on the battery receptacle 28 and may be angled to illuminate an area in front of the tool bit holder 16. Power delivery to the light unit 27 may be controlled by the trigger 30 and the motor controller 29, or by a separate switch on the tool. As shown in the drawings, the power tool is a battery powered cordless screwgun, also referred to as a screwdriver. However, it should be understood that the tool may be any type of corded, cordless, pneumatic, or combustion powered tool, such as a drill, an impact driver, a wrench, a hammer, a hammer drill, a nailer, a stapler, a saw, a grinder, a sander, or a router.

As mentioned above, the motor 14 drives the working end or tool bit holder 16 via the motor output shaft 51, the transmission, and the output spindle 26. The transmission may be a planetary gear transmission that includes a sun gear 52 (also referred to as a pinion), a planet carrier 53 for holding one or more (e.g., three) planet gears 20, and a ring gear 54 that is fixed around the planet gears. The sun gear 52 is operably coupled to the motor output shaft 51, which rotatably drives the sun gear 52. The sun gear 52 is operably coupled to the planet gears 20 where the teeth of the sun gear 52 rotatably drive the planet gears 20. The planet gears 20 rotate around axes that revolve around the sun gear 52. The ring gear 54 binds and encases the planet gears 20 with the planet gears 20 rotating within the fixed ring gear 54.

The transmission is operably coupled to a clutch system that includes an input clutch 55 integrated with the planet carrier 53, an intermediate clutch 56, a clutch spring 57, and an output clutch 58. The output clutch 58 is operably coupled to the output spindle 26 and the tool bit holder 16. The output clutch 58 moves axially with the with the output spindle 26 and the tool bit holder 16. In general operation, the rotation of the motor output shaft 51 rotatably drives the sun gear 52 and the planet carrier 53 with the integrated input clutch 55 and the intermediate clutch 56. An axial gap between the intermediate clutch 56 and the output clutch 58 keeps the output clutch disengaged from the intermediate clutch 56 until an axial force is exerted on the tool bit holder 16, such as by a user pressing the tool bit holder 16 into a workpiece. The axial force exerted on the tool bit holder axially moves the tool bit holder 16 and the output spindle 26, which is coupled to the tool bit holder 16, and the output clutch 58, which is coupled to the output spindle 26, and compresses the clutch spring 57 until the output clutch 58 engages the rotating intermediate clutch 56. The rotating intermediate clutch 56 imparts rotation to and rotatably drives the output clutch 58, the output spindle 26, and the tool bit holder 16. Additional details and description of the transmission and clutch assemblies are provided below in more detail with respect to FIGS. 13A-16B, including different implementations.

The power tool 10 includes an electronic mode select switch 60. The electronic mode select switch 60 provides an interface for a user to change the power tool modes of operation using an electronic switch instead of a mechanical switch. The electronic mode select switch 60 is actuatable from outside the housing 12. The electronic mode select switch 60 is disposed on the motor housing portion 13. While the electronic mode select switch 60 is illustrated as being disposed on a top surface 19 of the motor housing portion 13, it is understood that the electronic mode select switch 60 may be disposed in other locations on the motor housing portion 13 such as, for example, on either side of the motor housing portion 13 or on a back of the motor housing portion 13 above the proximal portion 42 of the handle portion 40. As illustrated in FIG. 2, the electronic mode select switch 60 includes a printed circuit board (PCB) 61 that has a microcontroller and a memory module. Additional details, including the details of the various modes of operation, are provided below with respect to FIGS. 3A-9.

Furthermore, a sensor (also referred to interchangeably as a mode change sensor) may be used to detect movement of the output spindle 26 for use in one or more of the modes of operation. When the sensor detects axial movement of the output spindle 26, such as when the tool bit 31 engages a workpiece, the sensor sends a signal that causes the power tool 10 to operate and drive the fastener into the workpiece. When the sensor detects the axial movement of the output spindle 26 returning to its original position, then the sensor sends a signal that causes the power tool to stop driving the fastener into the workpiece. The sensor assembly includes a sensed member that moves together with the output spindle 26 and a sensing member that remains stationary relative to the sensed member and that senses movement of the sensed member relative to the sensing member. Alternatively, the sensing member could move together with the output spindle 26, while the sensed member remains stationary relative to the sensing member. For example, in the implementation of FIG. 2, a sensor assembly 78 is illustrated as including a sensing member 79 with a Hall sensor 92 and a sensed member 89 including a magnet arm assembly 80. Additional details, including details of various other sensor implementations, are provided below with respect to FIGS. 17A-27C.

The power tool 10 includes a clip 70, which also may be referred to interchangeably as a tool belt clip, a belt clip, a tool clip, a removable clip, and a hook. The clip 70 is disposed on the top surface 19 of the motor housing portion 13 and is secured to the motor housing portion 13 using removable fasteners. In this manner, the clip 70 is removable from the power tool 10. In some implementations, the clip 70 may be integral with the power tool. The clip 70 enables the power tool 10 to hang from various surfaces, hooks, hangars, tool belt, and other objects. In some implementations, a portion of the clip 70 at least partially surrounds the electronic mode select switch 60 and, since the clip 70 is raised above top surface 19 of the motor housing portion 13, provides physical protection for the electronic mode select switch 60, which is recessed in the top surface 19. The clip 70 is illustrated and described in more detail below with respect to FIGS. 3A-4.

Figure 3A:
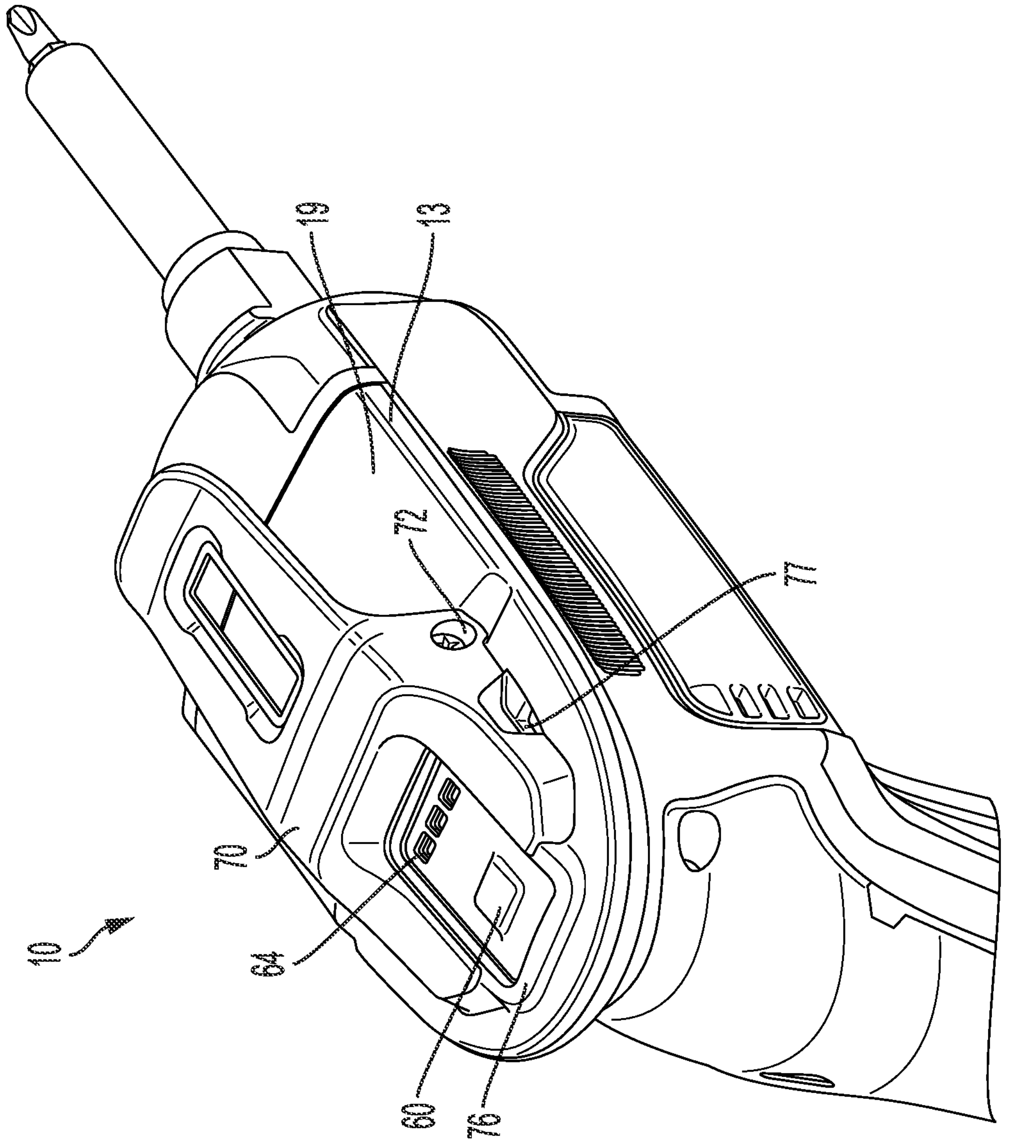
FIG. 3A is a top rear perspective view of an example screwgun with a removable clip.
Figure 3B:
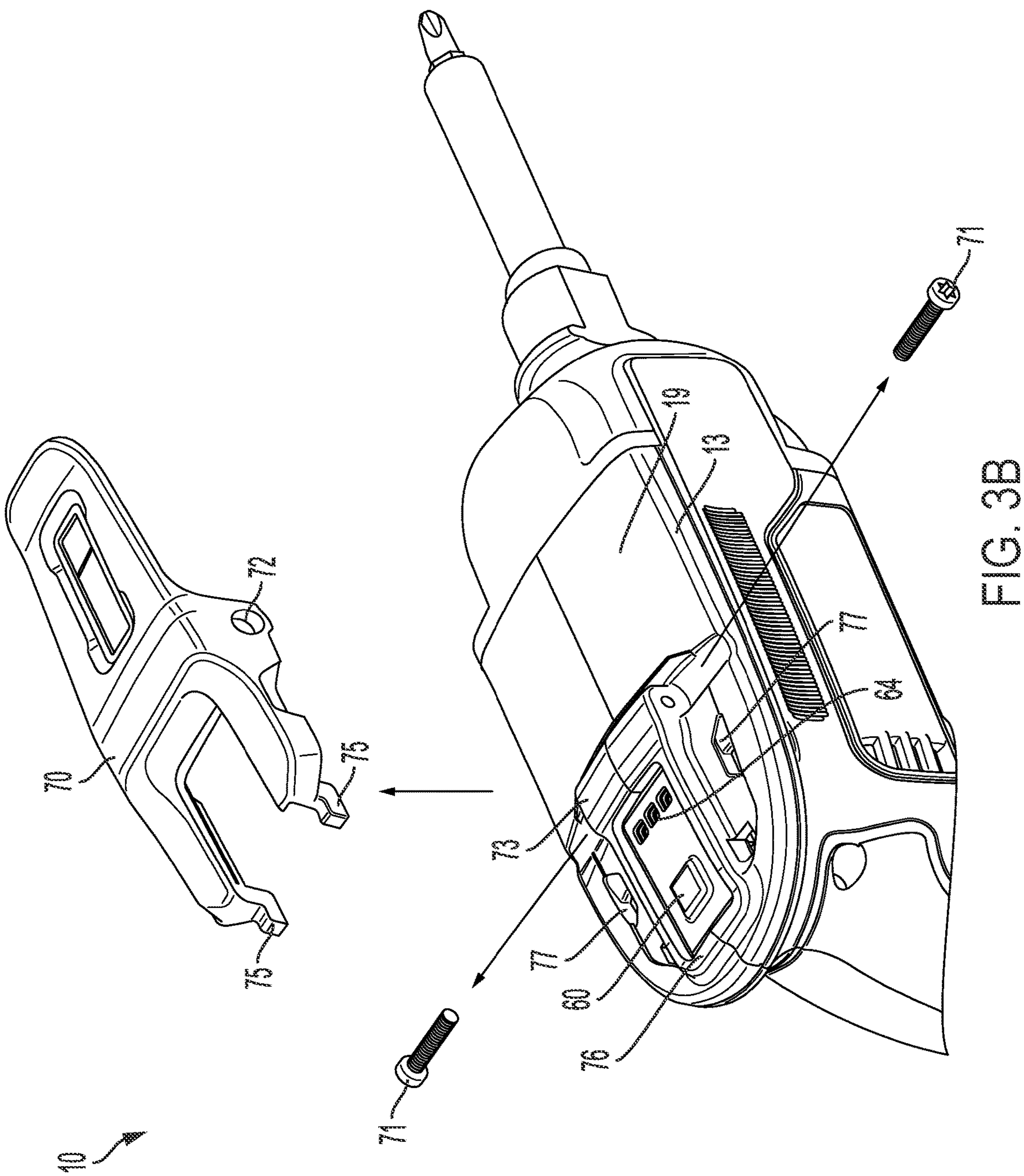
FIG. 3B is a top rear perspective view of the screwgun of FIG. 3A with an exploded view of the removable clip.
Figure 4:
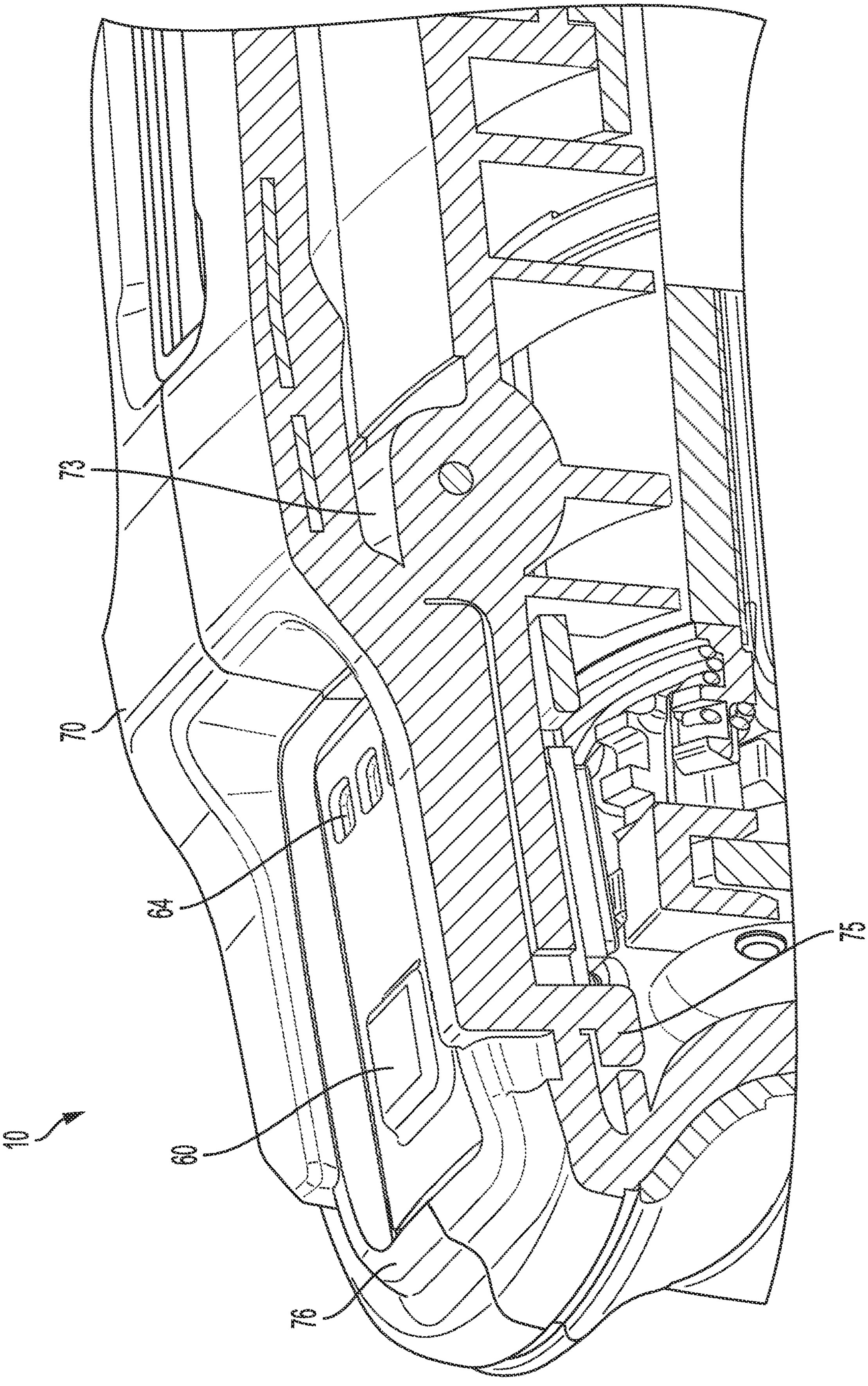
FIG. 4 is a partial rear perspective cutaway view of the screwgun of FIG. 3A.
Figure 5:
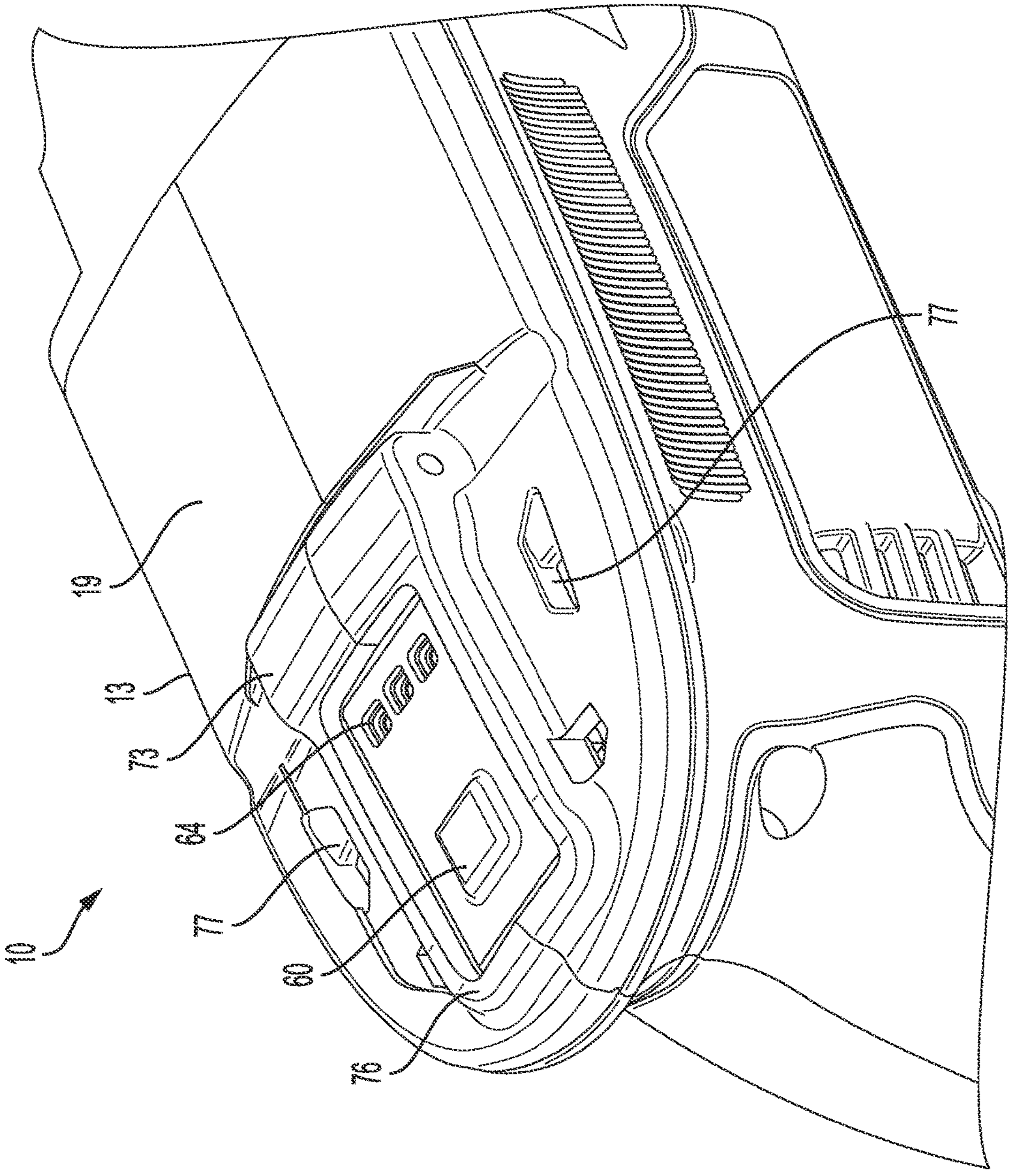
FIG. 5 is a partial top rear perspective view of the screwgun of FIG. 3A with the removable clip removed.
Figure 6:
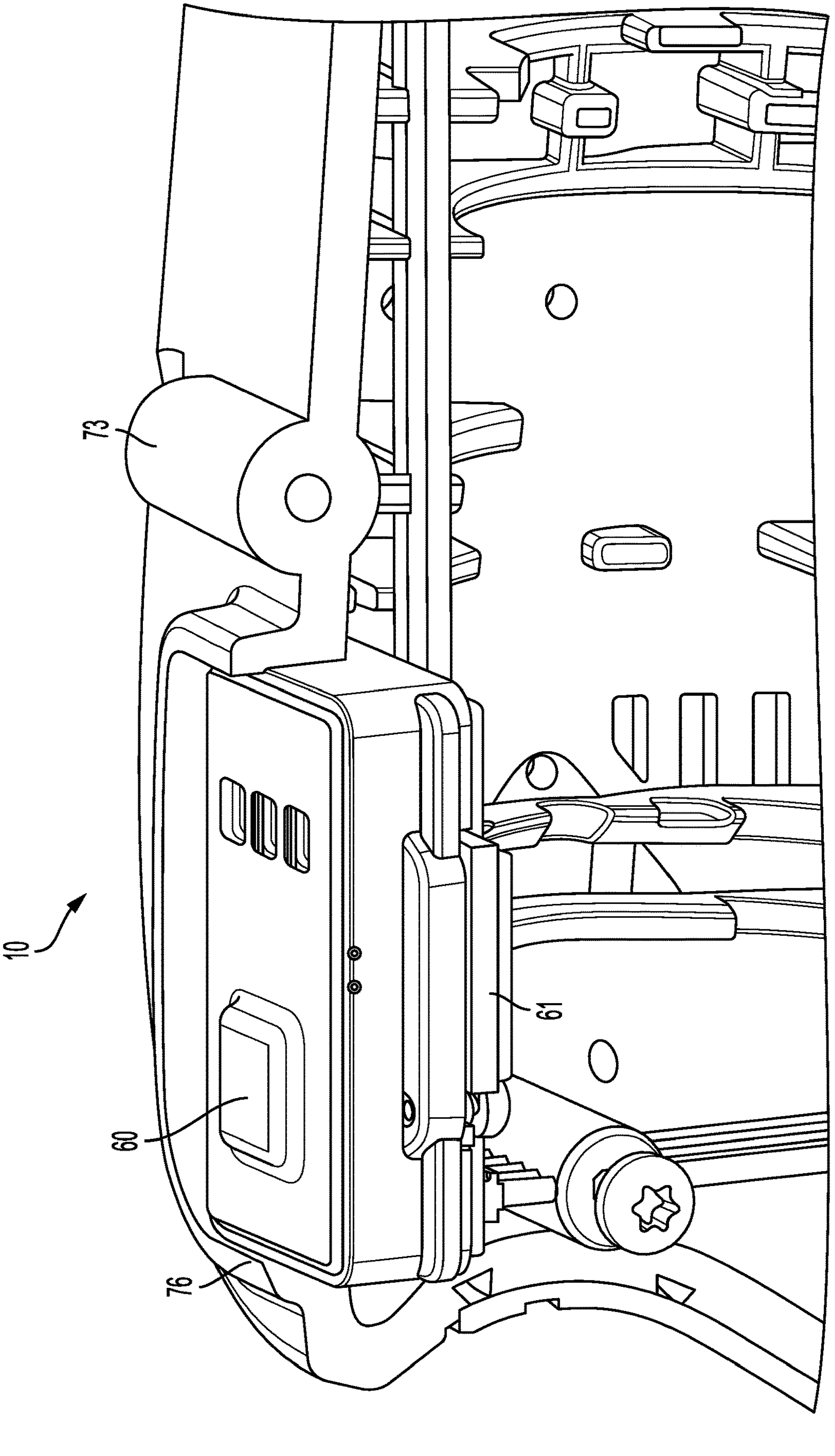
FIG. 6 is a partial right side cutaway view of the screwgun of FIG. 3A with the removable clip removed.
Figure 7:
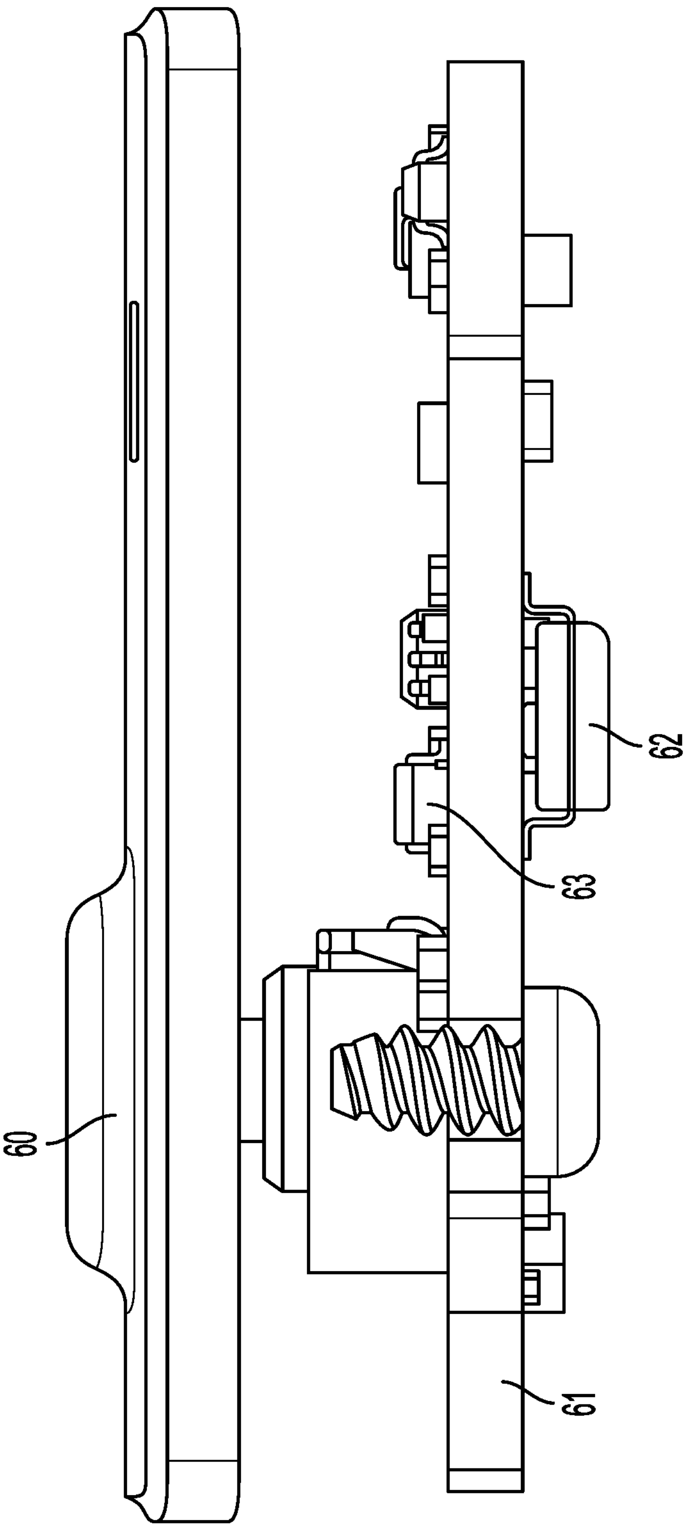
FIG. 7 is a side view of a mode change switch from the screwgun of FIG. 3A.
Figure 8:
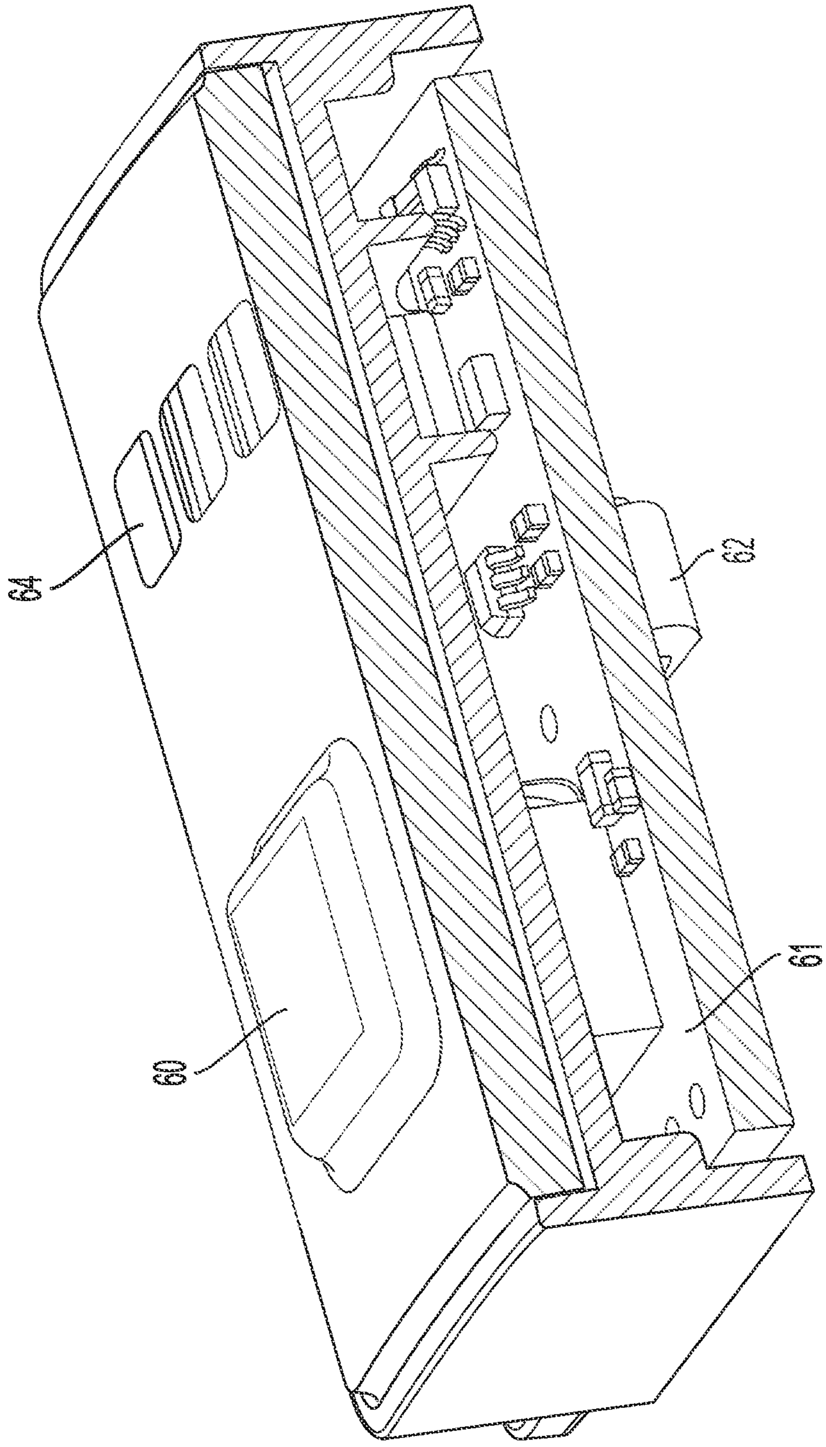
FIG. 8 is a perspective view of the mode change switch of FIG. 7.
Figure 9:
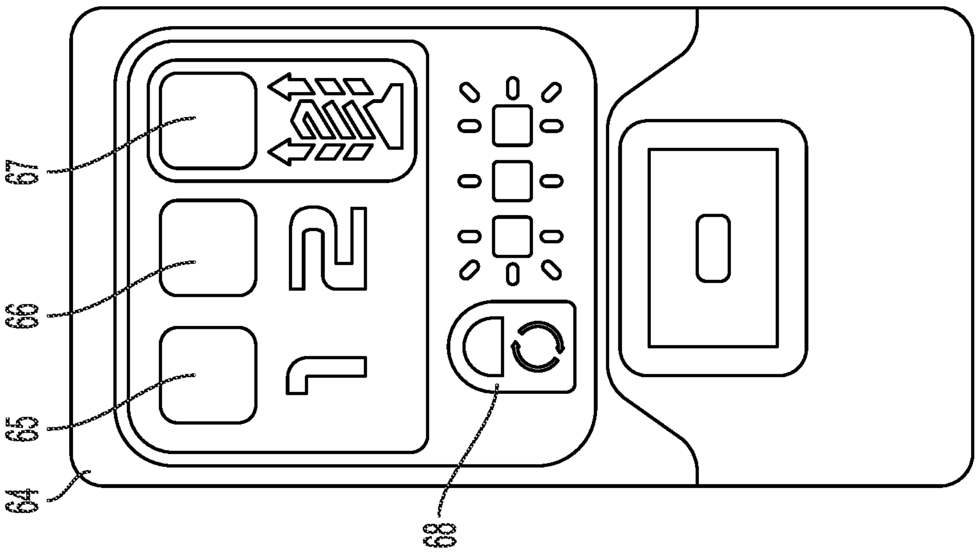
FIG. 9 is an example schematic of an example indicator for a mode change switch.

Referring to FIGS. 3A-9, the electronic mode select switch 60 and the clip 70 are illustrated in more detail. The power tool 10 illustrated in FIGS. 3A-9 may be the same power tool 10 and include the same features and functions as power tool 10 of FIGS. 1A-2, where the example implementation illustrated is a screwgun. FIG. 3A is a top rear perspective view of an example screwgun (i.e., power tool 10) with a removable clip 70. FIG. 3B is a top rear perspective view of the screwgun (i.e., power tool 10) of FIG. 3A with an exploded view of the removable clip 70. FIG. 4 is a partial rear perspective cutaway view of the screwgun (i.e., power tool 10) of FIG. 3A. FIG. 5 is a partial top rear perspective view of the screwgun (i.e., power tool 10) of FIG. 3A with the removable clip 70 removed. FIG. 6 is a partial right side cutaway view of the screwgun (i.e., power tool 10) of FIG. 3A with the removable clip 70 removed. FIG. 7 is a side view of the electronic mode select switch 60 from the screwgun (i.e., power tool 10) of FIG. 3A. FIG. 8 is a perspective view of the electronic mode select switch 60 of FIG. 7. FIG. 9 is an example schematic of an example indicator for the electronic mode select switch 60.

As mentioned above, in some implementations, the electronic mode select switch 60 and the clip 70 are disposed on the top surface 19 of the motor housing portion 13 of the power tool 10. In this manner, the electronic mode select switch 60 and the clip 70 are located in a same area on the motor housing portion 13. The clip 70 is a removable clip that is secured to the top surface 19 using fasteners 71 that are received through slots 72 of the clip 70 and received into a fastener receiver 73 on the top surface 19 of the power tool 10. The fasteners 71 are removable to enable the clip 70 to be removed and re-assembled as desired. The clip 70 also includes two feet 75 that hook into the motor housing portion 13 for additional support.

The clip 70 is raised above the top surface 19, while the electronic mode select switch 60 is recessed into the top surface 19. In this manner, the clip 70 provides physical protection to the electronic mode select switch 60 and may prevent unintended selection of the electronic mode select switch 60 and may prevent damage to the electronic mode select switch 60 due to a drop of the power tool 10 or knocking the power tool 10 into another object. The top surface 19 also includes a rib 76 that is disposed around and encircles or at least partially surrounds the electronic mode select switch 60. The rib 76 is raised above the top surface 19 and may provide protection to the electronic mode select switch 60 against drops or other accidents when the clip 70 is removed.

The top surface 19 also may include multiple air vents 77 that aid in cooling the power tool 10 and, specifically, the motor and electrical and electronic components. The air vents 77 are air intake vents that receive air external to the power tool 10 and use the air for cooling. In some implementations, the air vents 77 are disposed on the top surface 19 on either side of the electronic mode select switch 60 adjacent to the fastener receiver 73. It is understood that the air vents 77 may be located at other points on the top surface 19 and/or at other points on the motor housing portion 13.

The electronic mode select switch 60 provides an interface for user selection of multiple different modes of operation of the power tool 10. The electronic mode select switch 60 is electrically coupled to (i.e., in electrical communication with) the motor controller 29 and may be used to electronically control the mode of operation of the power tool 10 and the motor. The modes of operation may include manual high speed, manual low speed, push start mode, lock on mode, and multiple, different rapid sequential modes. The modes of operation are selected by the user depressing the electronic mode select switch 60. The modes of operation may be programmed in a particular order and the user may cycle through the modes of operation by depressing the electronic mode select switch 60. The electronic mode select switch 60 may include the PCB 61, which includes a microcontroller 62, a memory module 63, and an indicator 64. The memory module 63 may store the instructions for the different modes of operation, including the sequential order for activating the modes. The microcontroller 62 may perform the instructions stored in the memory module 63 and communicates the instructions to the motor controller 29. The indicator 64 is configured to provide a visual indication to the user of the selected mode of operation.

For the manual high speed mode and the manual low speed mode, the electronic mode select switch 60 is used in conjunction with the trigger (trigger 30 of FIG. 2). First the electronic mode select switch is selected to place the mode of operation in the manual high speed mode or the manual low speed mode and then the trigger 30 is used to turn the motor and the power tool on and off. In some implementations, the trigger 30 is a variable speed trigger that is used to control the amount of power delivered to the motor (and thus its operating speed) to be variable based on the travel distance of the trigger 30 or the amount of user pull of the trigger 30. In some implementations, the trigger 30 functions as an on-off switch so that the amount of the power delivered to the motor (and thus the operating speed of the motor) remains substantially constant regardless of the travel distance of the trigger so long as it has been actuated.

In manual high speed mode, the trigger 30 is used to actuate the motor by the user pulling the trigger 30. When the trigger 30 is pulled by the user, the motor turns ON at the highest or maximum power and/or operating speed of the power tool 10 or has a variable speed up to the highest or maximum power and/or operating speed based on the amount of pull on the variable speed trigger. When the trigger 30 is released, the motor turns OFF and the power tool 10 turns OFF.

In the manual low speed mode, the trigger 30 is used to actuate the motor by the user pulling on the trigger 30. When the trigger 30 is pulled by the user, the motor turns ON at a reduced percentage of the highest or maximum operating speed of the power tool or has a variable power or speed up to a reduced percentage of the full operating speed of the power tool 10 based on the amount of pull on the variable speed trigger. In either case, the percentage of the full operating speed may be configurable by a user. In some implementations, the percentage of the full operating speed may be preset. For example, the percentage of the full operating speed may be set to 75% of the full operating speed. In operation, when the mode is set to the manual low speed and the trigger is fully pulled all the way, the motor turns ON and operates at 75% of the full power and/or operating speed. In this manner, a full trigger pull operates at this set lower speed. In some implementations, the variable trigger may be pulled less and the motor and power tool operate at an even lower percentage of the full power and/or operating speed depending on how far the trigger is pulled. In some implementations, the motor remains at a substantially constant reduced percentage of power and/or motor speed regardless of the amount of trigger travel, so long as the trigger has been actuated. When the trigger is released, the motor and the power tool turn OFF.

The use of the manual low speed mode may assist in maximizing user productivity and reducing user fatigue. The manual low speed mode also may reduce and/or eliminate fasteners that break and/or burn up from too high of an operating speed. The manual low speed mode also may reduce and/or eliminate broken fastener threads from thin wall sheet metal applications.

The push start mode is another mode of operation that is actuated by using the electronic mode select switch 60 to select the push start mode. The push start mode also may be referred to as auto start mode. In the push start mode, the trigger 30 is not used to actuate the motor and the power tool 10. In the push start mode, the initial motor state is that the motor is not running. The sensor assembly 78, which may include a nosepiece switch, detects movement of the output spindle towards the clutch, for example, when the user pushes the power tool 10 against a workpiece to drive a fastener into the workpiece. When the sensor assembly 78 detects the movement, the sensor assembly sends a signal to the motor controller to turn the motor ON. The motor turns ON, the clutch is engaged by the pushing movement of the power tool 10 against the workpiece, and the fastener is driven into the workpiece. After the fastener is driven into the workpiece, the output spindle 26 returns to its initial position. The sensor assembly 78 detects the movement of the output spindle 26 to its original position and the sensor assembly sends a signal to the motor controller to turn the motor OFF.

In some implementations, the push start mode may include only one speed option. For example, the motor may only operate at full operating speed in push start mode that has only one speed option. In some implementations, the push start mode may include a high speed option and a low speed option. In a push start high speed mode, the engagement of the workpiece by pushing the power tool 10 against the workpiece, automatically turns the motor on at full operating speed based on the sensor assembly detecting the movement of the output spindle 26. In a push start low speed mode, when the sensor assembly detects the movement of the output spindle 26, the motor is turned ON to a percentage of the full operating speed, which may be a configurable percentage of the full operating speed or a preset percentage of the full operating speed, similar to the manual low speed mode.

Another mode of operation is the lock on mode of operation. The lock on mode is actuated by using the electronic mode select switch to select the lock on mode. When the user fully pulls and releases the trigger 30, the motor turns on full operating speed and the motor remains ON until the user fully pulls and releases the trigger 30 again. For instance, a partial trigger pull will not turn ON the motor in this mode and a partial trigger pull will not turn OFF the motor in this mode. In lock on mode, continuous power is delivered to the motor upon a single actuation and release of the power switch. With the lock on mode of operation, the motor remains turned ON as the user engages and disengages from a workpiece to drive fasteners. The clutch engages and disengages with the depressing and release of the power tool 10 against the workpiece. This mode of operation enables a faster pace of driving fasteners because the motor remains fully ON resulting in no lag time between driving fasteners.

In some implementations, the modes of operation include one or more rapid sequential modes. The rapid sequential modes are similar to the push start mode except that the motor remains running for a period of time after the sensor assembly detects the output spindle has returned to its initial position instead of the motor turning OFF. In a rapid sequential mode, the electronic mode select switch 60 is used to select the mode. When the user pushes the power tool 10 against the workpiece, the sensor assembly detects the movement of the output spindle 26 and sends a signal to start the motor. The user then drives a fastener into the workpiece. When the sensor assembly detects the output spindle 26 has returned to its initial position, the sensor assembly sends a signal to turn OFF the motor. The motor remains on for a period of time, which may be a preset time or may be a time adjustable by a user. For example, the motor may remain on for 3 seconds. The motor may be set to remain on for other periods of time. This enables another fastener to be driven within the period of time that the motor is still at full operating speed. If another fastener is driven, the period of time resets when the output spindle 26 returns to its initial position and the sensor assembly sends a signal to turn off the motor. If no drive event occurs during the period of time, the motor turns off and waits for the next sensed movement of the output spindle 26 to turn on again.

In some implementations of the rapid sequential mode, the motor speed may drop to a percentage of the full operating speed (e.g., 75% of the full operating speed) during the period of time instead of staying on at full operating speed. If the sensor assembly detects movement of the output spindle 26 to drive another fastener, the motor increases to full operating speed and then returns to the percentage of the full operating speed after the fastener is driven for the period of time. If no drive event occurs during the period of time, the motor turns off and waits for the next sensed movement of the output spindle 26 to turn on again.

Referring to FIG. 9, the indicator 64 provides a visual indication to the user of the current mode of operation. In this example, three lights 65-67 (e.g., light emitting diodes (LEDs)) may be used to indicate the current mode of operation. The lights 65-67 may be used alone and in combination to indicate a particular mode. The user may cycle through the modes of operation by depressing the electronic mode select switch, which causes the indicator 64 and the lights 65-67 to change with each selection of the electronic mode select switch. For example, when only light 65 is illuminated, the mode of operation may be manual low speed. When only light 66 is illuminated, the mode of operation may be manual high speed. When lights 66 and 67 are illuminated together, the mode of operation may be push start mode. When lights 65, 66, and 67 are illuminated, the mode of operation may be lock on mode. The fixed symbol 68 also provides an indication to the user that the lock on mode is functional when all three lights 65-67 are illuminated. It is understood that this is merely one example of how the indicator 64 may be used to indicate the particular modes of operation to the user and that the lights 65-67 may be assigned to indicate other modes.

Figure 10A:
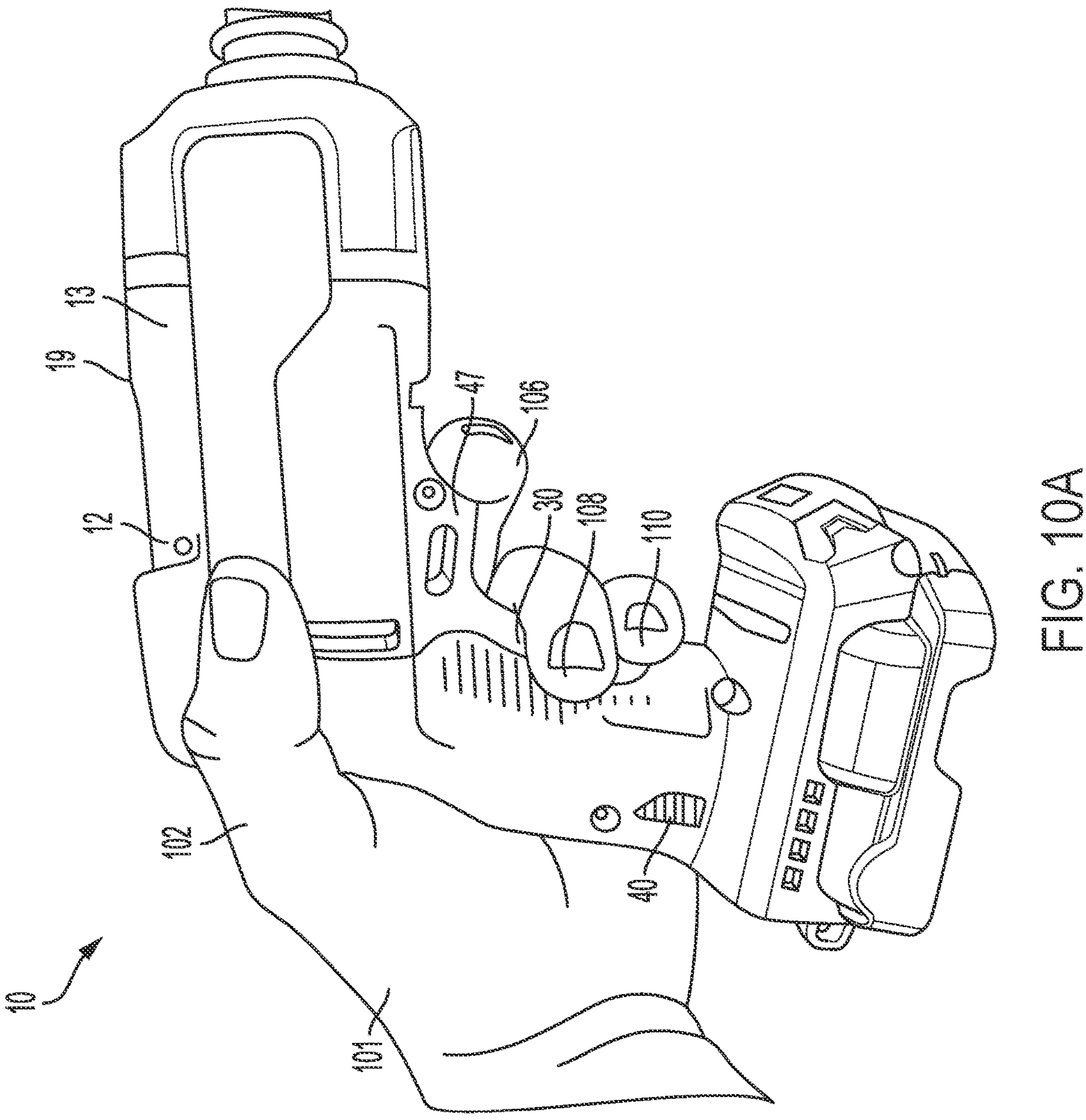
FIG. 10A is a right side view of a screwgun being gripped in a first position.
Figure 10B:
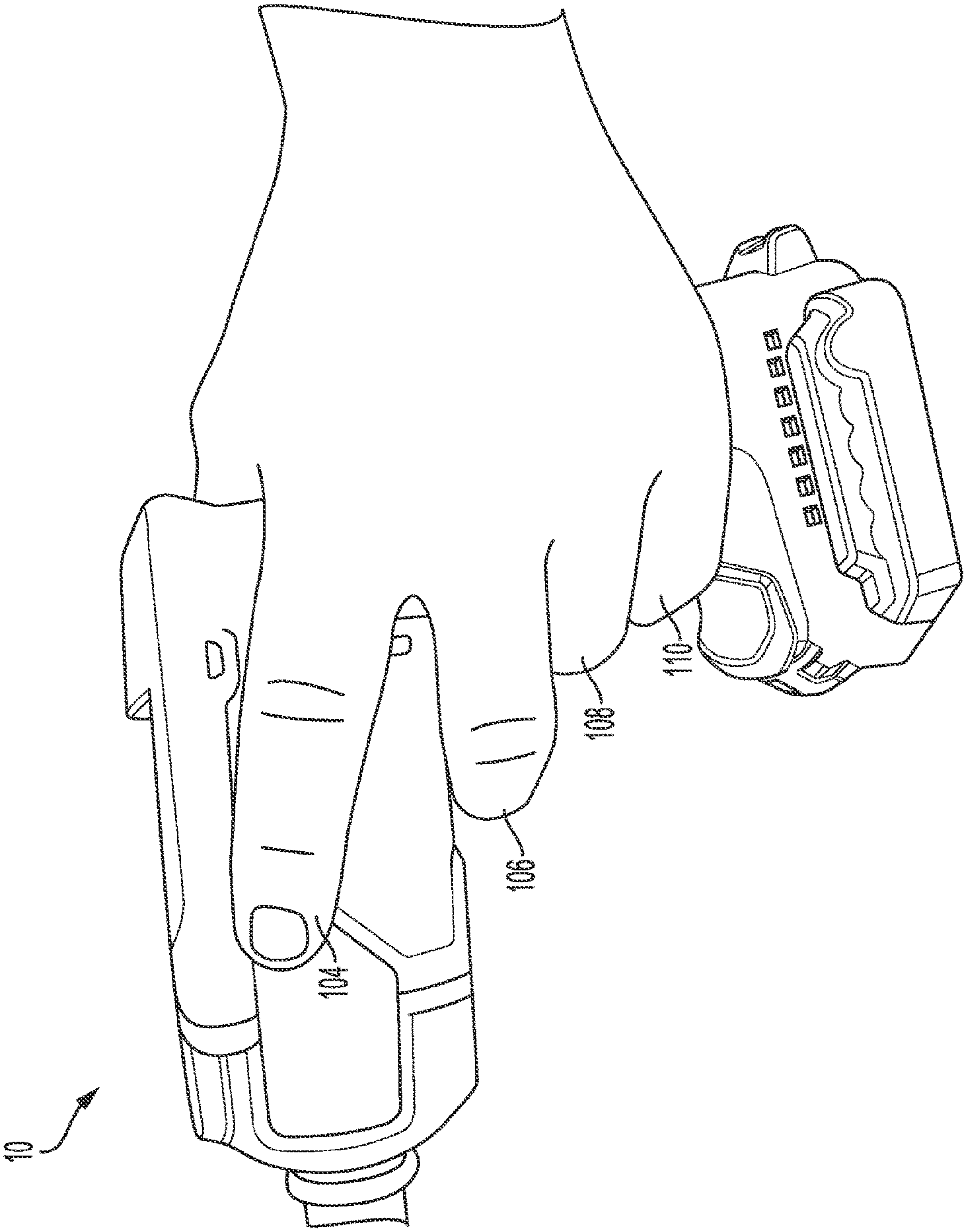
FIG. 10B is a left side view of the screwgun of FIG. 10A being gripped in the first position.
Figure 10C:
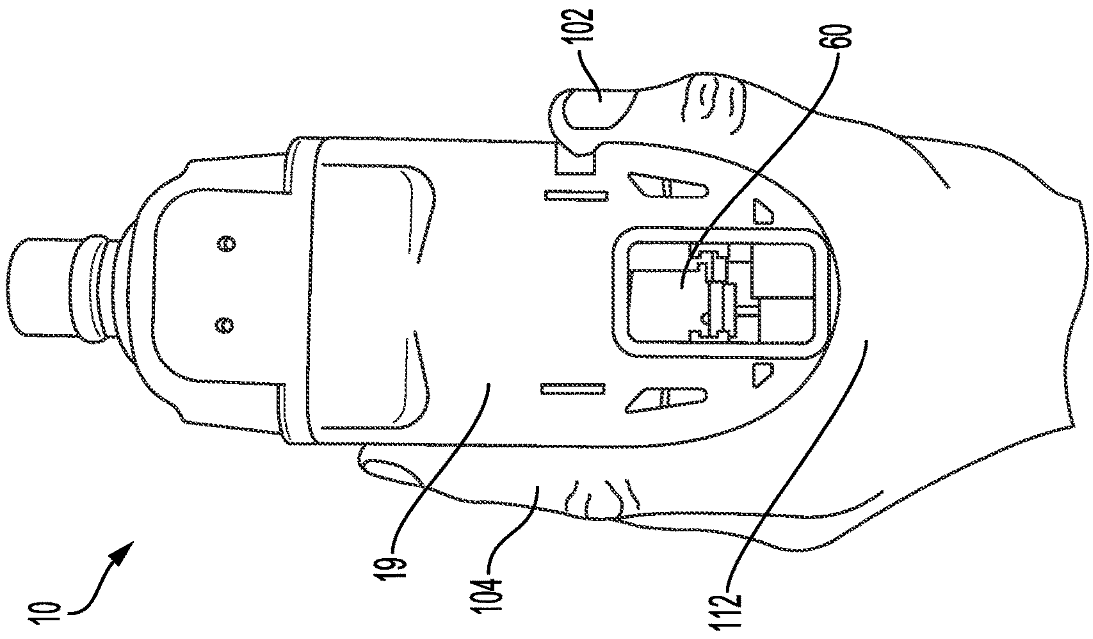
FIG. 10C is a top view of the screwgun of FIG. 10A being gripped in the first position.

Referring to FIGS. 10A-12B, various different user hand positions for gripping the power tool 10 are illustrated. The power tool 10 may be the same power tool 10 as illustrated in FIGS. 1A-1H and include the same reference numbers to refer to the same components. For example, FIGS. 10A-10D illustrate different views of a power tool 10 being gripped in a first position. FIG. 10A is a right side view of a screwgun being gripped in a first position. FIG. 10B is a left side view of the screwgun of FIG. 10A being gripped in the first position. FIG. 10C is a top view of the screwgun of FIG. 10A being gripped in the first position. FIG. 10D is a top view of the screwgun of FIG. 10A being gripped in the first position with the thumb near the electronic mode select switch.

Figure 11A:
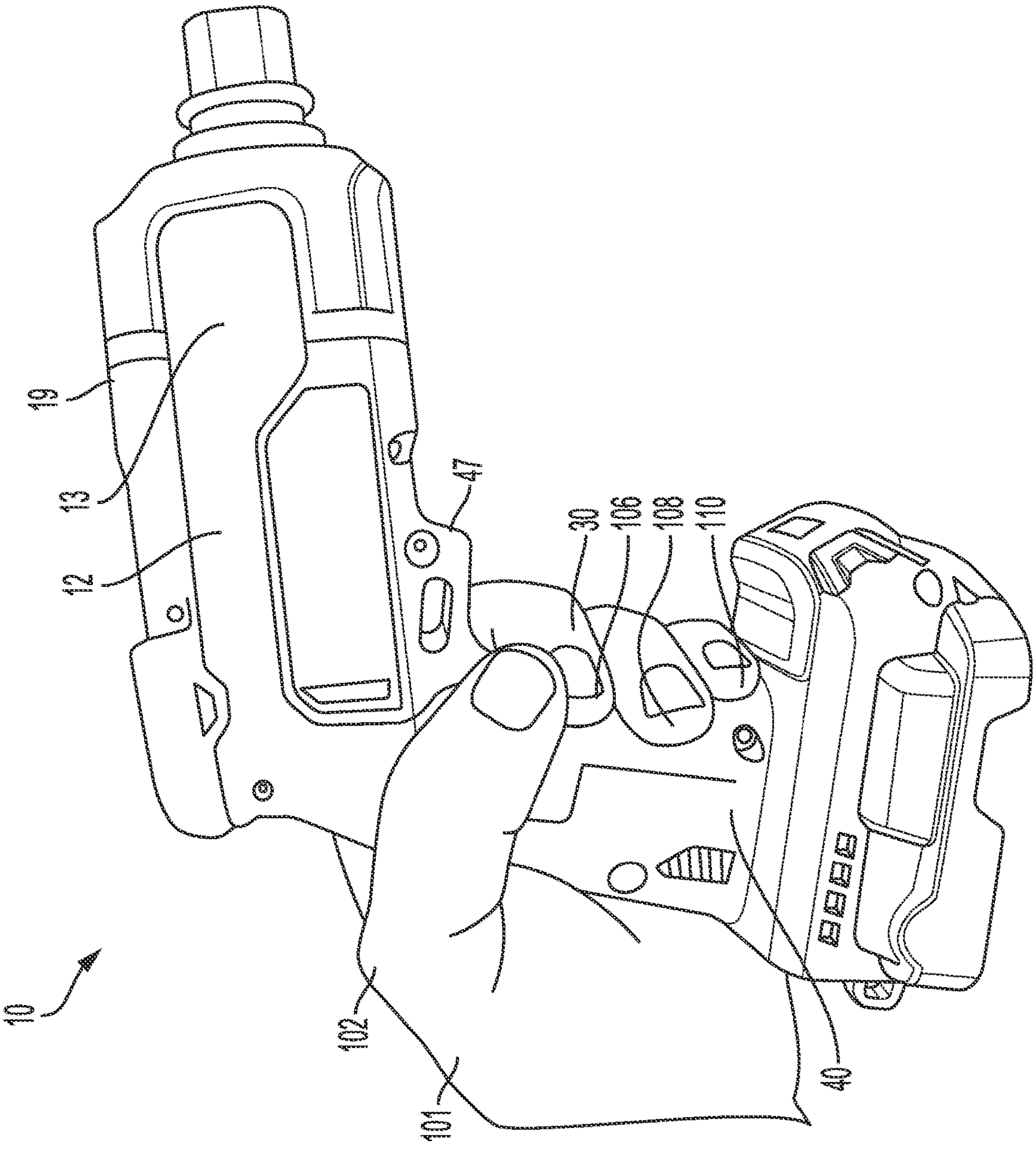
FIG. 11A is a right side view of the screwgun of FIG. 10A being gripped in a second position.
Figure 11B:
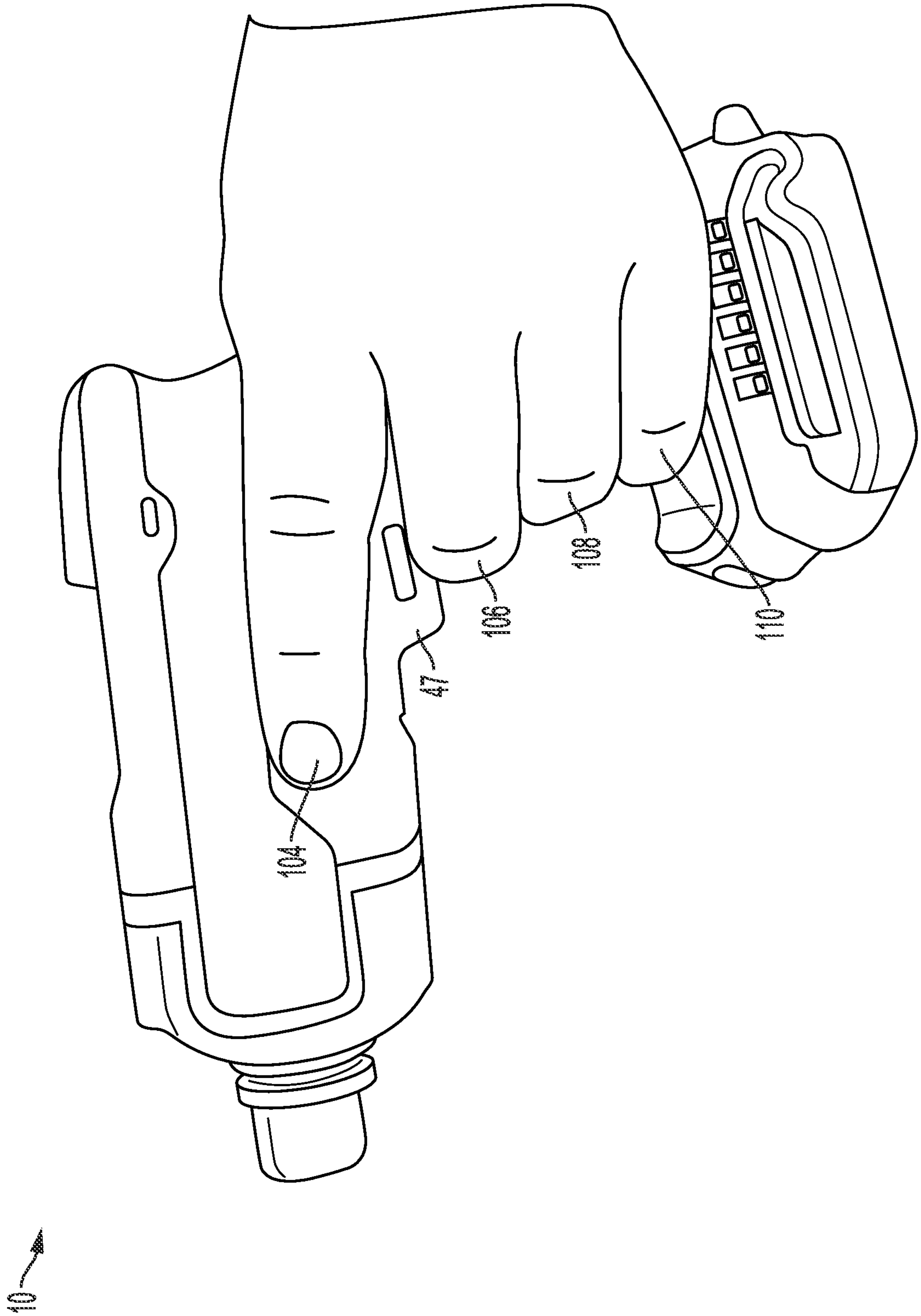
FIG. 11B is a left side view of the screwgun of FIG. 10A being gripped in the second position.

FIGS. 11A-11B illustrate different views of the power tool 10 being gripped in a second position. FIG. 11A is a right side view of the screwgun of FIG. 10A being gripped in a second position. FIG. 11B is a left side view of the screwgun of FIG. 10A being gripped in the second position.

As shown in FIGS. 10A-11B, the power tool 10 is ergonomically configured to enable simultaneous one-handed operation of the power tool and one-handed operation of both the trigger 30 (also referred to as a power switch) and the electronic mode select switch 60 using the same hand. The electronic mode select switch 60 and the trigger 30 are both actuatable from outside the housing of the power tool. For example, the trigger 30 may be located on a handle portion 40 of the housing 12 and the electronic mode select switch 60 may be located on a motor housing portion 13 of the housing 12. More specifically, for instance, the electronic mode select switch 60 may be located on a top surface 19 of the motor housing portion 13. The housing 12 is ergonomically configured with multiple gripping regions to enable multiple, different one-handed grip positions by the user, while simultaneously providing access to the electronic mode select switch 60 on the motor housing portion 13 and the trigger 30 on the handle portion 40. The ergonomic configuration of the power tool 10 provides comfort during operation of the power tool for extended periods of time, which may reduce user fatigue during the extended use periods. The ergonomic configuration also provides for one-handed ease of operation using the various different modes of operation.

Referring also back to FIG. 1E, the power tool 10 includes a housing 12, also referred to as an ergonomic housing, designed to be contoured to a user's hand. The housing 12 includes a first gripping region 34 on a top portion of the motor housing portion 13, a second gripping region 36 on the rear wall portion 41 of the proximal portion 42 of the handle portion 40, a third gripping region 35 on a bottom portion of the motor housing portion 13 below the first gripping region 34, a fourth gripping region 38 on the rear wall portion 41 of the distal portion 44 of the handle portion 40, a fifth gripping region 45 on a front wall portion 43 of the proximal portion 46 of the handle portion 40 adjacent to the trigger 30, and a sixth gripping region 37 on the front wall portion 43 of the proximal portion 46 of the handle portion 40 distal of the fifth gripping region 45 and adjacent the battery receptacle 28. One or more of the gripping regions 34, 35, 36, 38, 45, 37 may be formed or covered with an elastomeric material, such as rubber or a resilient plastic material, and may include one or more ridges or recesses to facilitate gripping of these regions. For ease of illustration the gripping regions 34, 35, 36, 38, 45, 37 are not illustrated in the other FIGS. 10A-11B.

The ergonomic grip facilitates ergonomic gripping of the tool by a user's hand in two different grip positions during operation of the tool. FIGS. 10A-11B illustrate the anatomical parts of a user's hand. Generally, a user's hand includes a palm 101 to which is connected a thumb 102, a forefinger 104, a middle finger 106, a ring finger 108, and a pinky finger 110. A web 112 of muscles connects the base of the thumb 102 and forefinger 104. In addition, the palm 101 includes a center region flanked by two fleshy pads in the form of a thenar eminence on the thumb side of the palm and the hypothenar eminence on the pinky side of the palm. Further, there are fleshy pads on the palm 101 at the base of the thumb 102 and each finger 104, 106, 108, and 110.

Figure 10D:
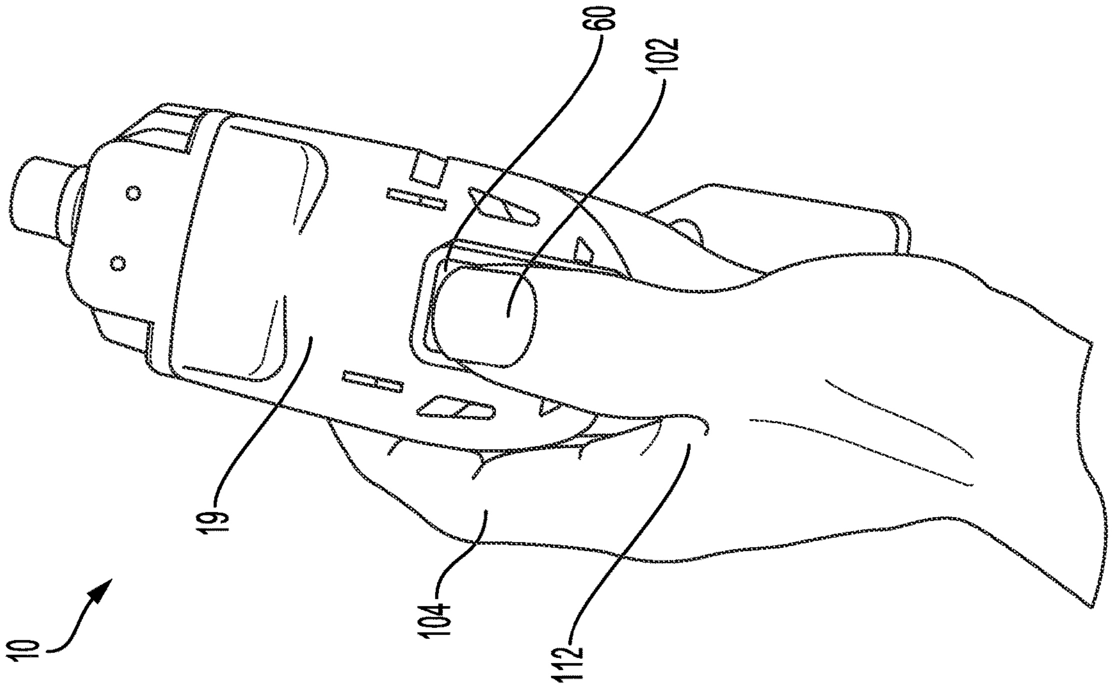
FIG. 10D is a top view of the screwgun of FIG. 10A being gripped in the first position with the thumb near the mode select switch.

In the first gripping position illustrated in FIGS. 10A-10D, the thumb 102 grips the power tool 10 on the concave recess on one side of the motor housing portion 13 and the forefinger 104 grips the power tool 10 on the concave recess on the opposite side of the motor housing portion 13. The middle finger 106 grips the power tool 10 on the finger rest recess 47, which is located on the handle portion 40 near the bottom surface of the motor housing portion 13. The ring finger 108 and the pinky finger 110 grip the trigger 30 on the handle portion 40. In this manner, the finger rest recess 47 provides a gripping location for the middle finger 106 to provide leverage to enable the thumb 102 to move easily from the concave recess on the motor housing portion (FIG. 10C) to the electronic mode select switch on the top surface of the motor housing portion (FIG. 10D). Of course, the user may just as easily move the thumb 102 back from the electronic mode select switch to the concave recess, all while maintaining a steady, reliable, and comfortable grip on the power tool 10. In this manner, the user may operate the power tool with one hand and simultaneously change modes of operation with the same hand by moving the thumb 102 from the side of the power tool to the top of the power tool 10.

In the second gripping position illustrated in FIGS. 11A-11B, the thumb 102 is wrapped around the handle portion 40. The forefinger 104 grips the power tool 10 on the concave recess on the motor housing portion 13. The middle finger 106 grips the trigger 30 on the handle portion 40 and the ring finger 108 and the pinky finger 110 grip the handle portion 40 below the trigger 30. In this manner, FIGS. 11A-11B illustrate a second gripping position that is different than the first gripping position illustrated in FIGS. 10A-10D. Both gripping positions enable one-handed operation of the power tool 10 that enables the user to maintain a comfortable and steady grip for periods of time while using the power tool 10 on a workpiece(s).

Figure 12B:
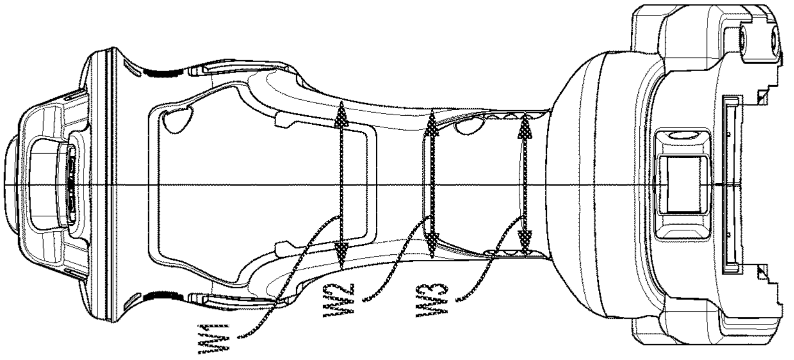
FIG. 12B is a rear view of the screwgun of FIG. 1A.
Figure 12A:
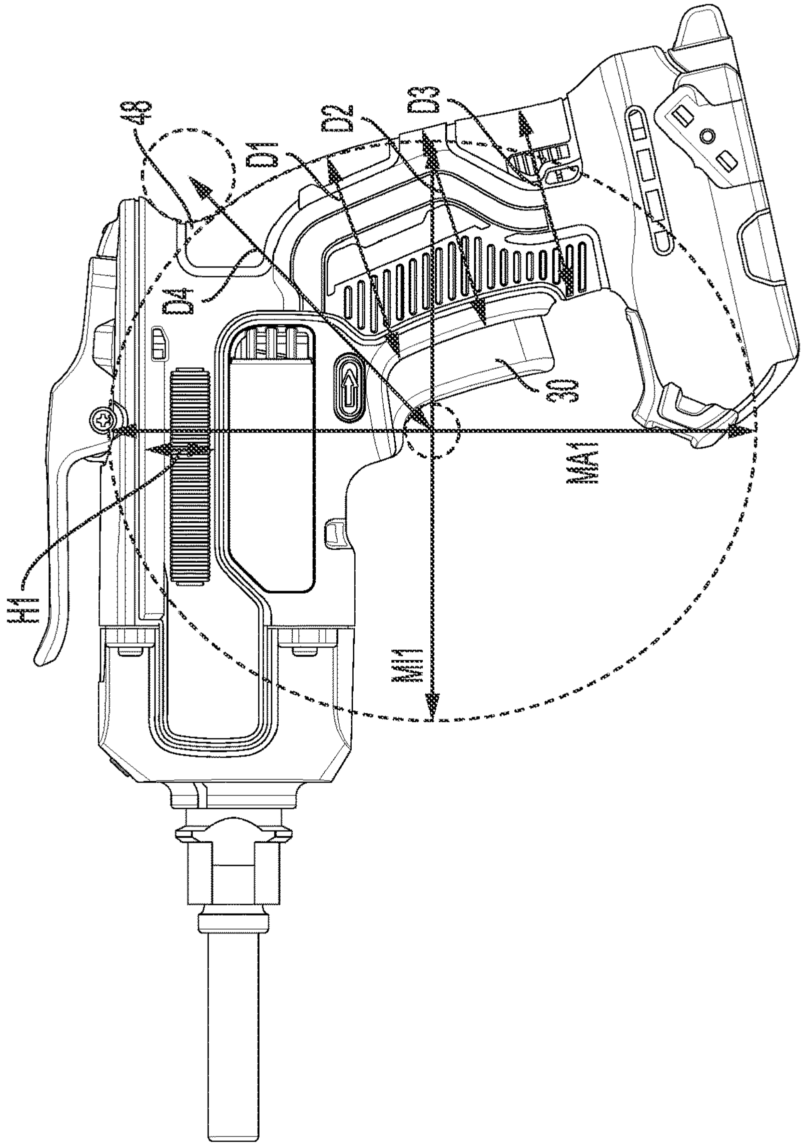
FIG. 12A is a left side view of the screwgun of FIG. 1A.

Referring to FIGS. 12A and 12B, features are illustrated, including example dimensions, that provide for a housing 12 with superior ergonomics. FIG. 12A is a left side view of the screwgun of FIG. 1A. FIG. 12B is a rear view of the screwgun of FIG. 1A. The handle portion 40 has a first depth D1 and a first width W1 at the trigger 30, a second depth D2 and a second width W2, and a third depth D3 and a third width W3 at the base of the handle portion 40. The first depth D1 is slightly greater than the second depth D2, which is greater than the third depth D3. For example, the first depth D1 is approximately 45 mm to 55 mm (e.g., approximately 50 mm), the second depth D2 is approximately 40 mm to 50 mm (e.g., approximately 48 mm), and the third depth D3 is approximately 38 mm to 48 mm (e.g., approximately 45 mm). The first width W1 is greater than the second width W2, which is approximately equal to the third width W3. For example, the first width W1 is approximately 37 mm to 42 mm (e.g., approximately 39 mm), the second width W2 is approximately 31 mm to 36 mm (e.g., approximately 34 mm), and the third width W3 is approximately 28 mm to 35 mm (e.g., approximately 33 mm). The concave recesses on either side of the motor housing portion 13 have a height H1, which is approximately 14 mm to 20 mm (e.g., approximately 16 mm).

The housing 12 further includes a fourth depth D4 measured from the trigger 30 to the rear concave recess 48 of approximately 80 mm to 85 mm (e.g., approximately 82 mm). The ergonomics of the housing 12 also form an ellipse-shape centered on the trigger 30 with a major axis MA1 extending from the top surface of the motor housing to the battery receptacle and having dimensions of approximately of 142 mm to 147 mm (e.g., approximately 145 mm) and a minor axis MI1 extending from the rear of the handle to the front of the motor housing and having dimensions of approximately of 128 mm to 132 mm (e.g., approximately 130 mm).

Figure 13A:
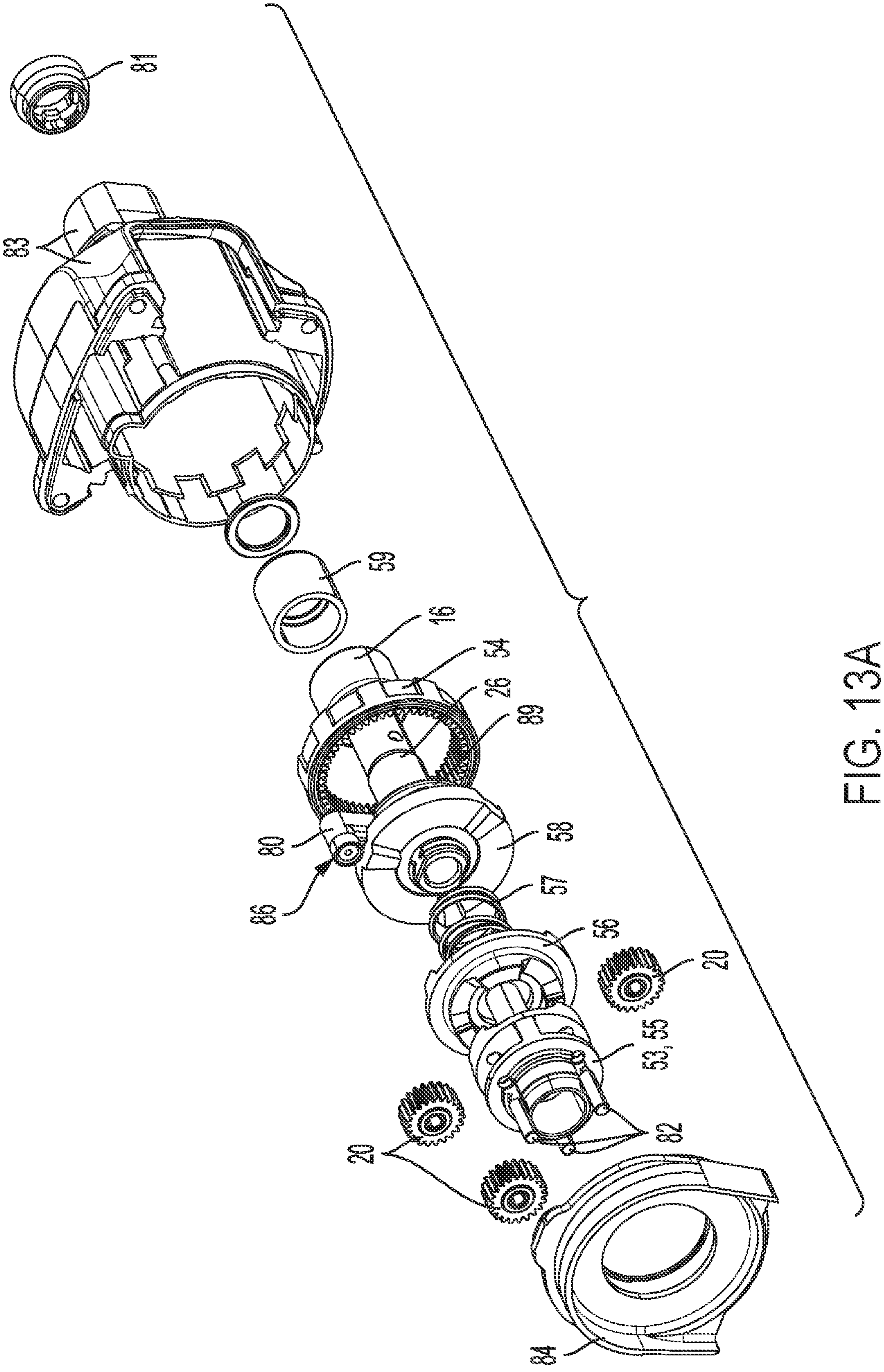
FIG. 13A is a rear portion perspective exploded view of an example transmission and clutch assembly for a screwgun.
Figure 13B:
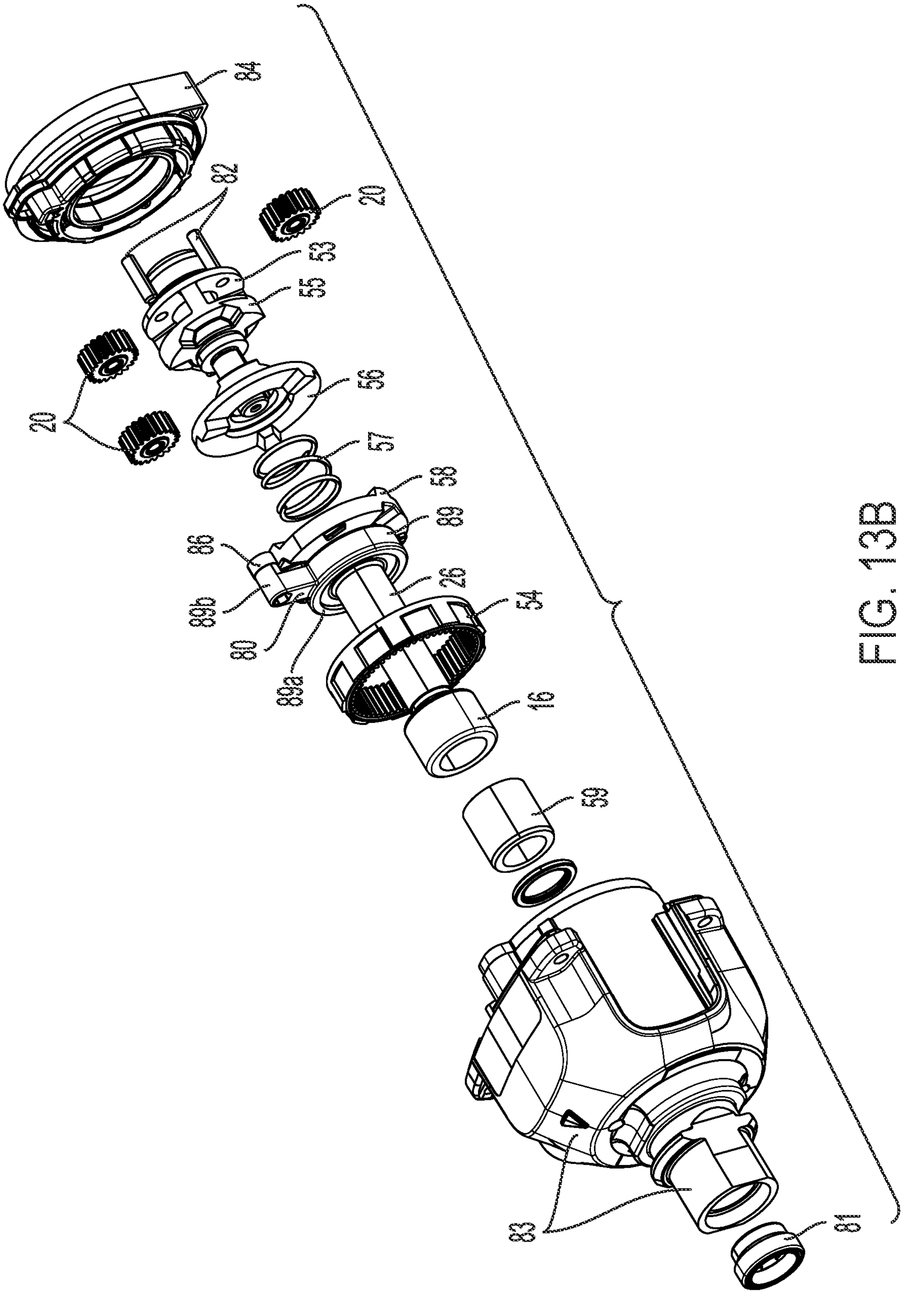
FIG. 13B is a front portion perspective exploded view of the transmission and clutch assembly of FIG. 13A.
Figures 13C, 13D:
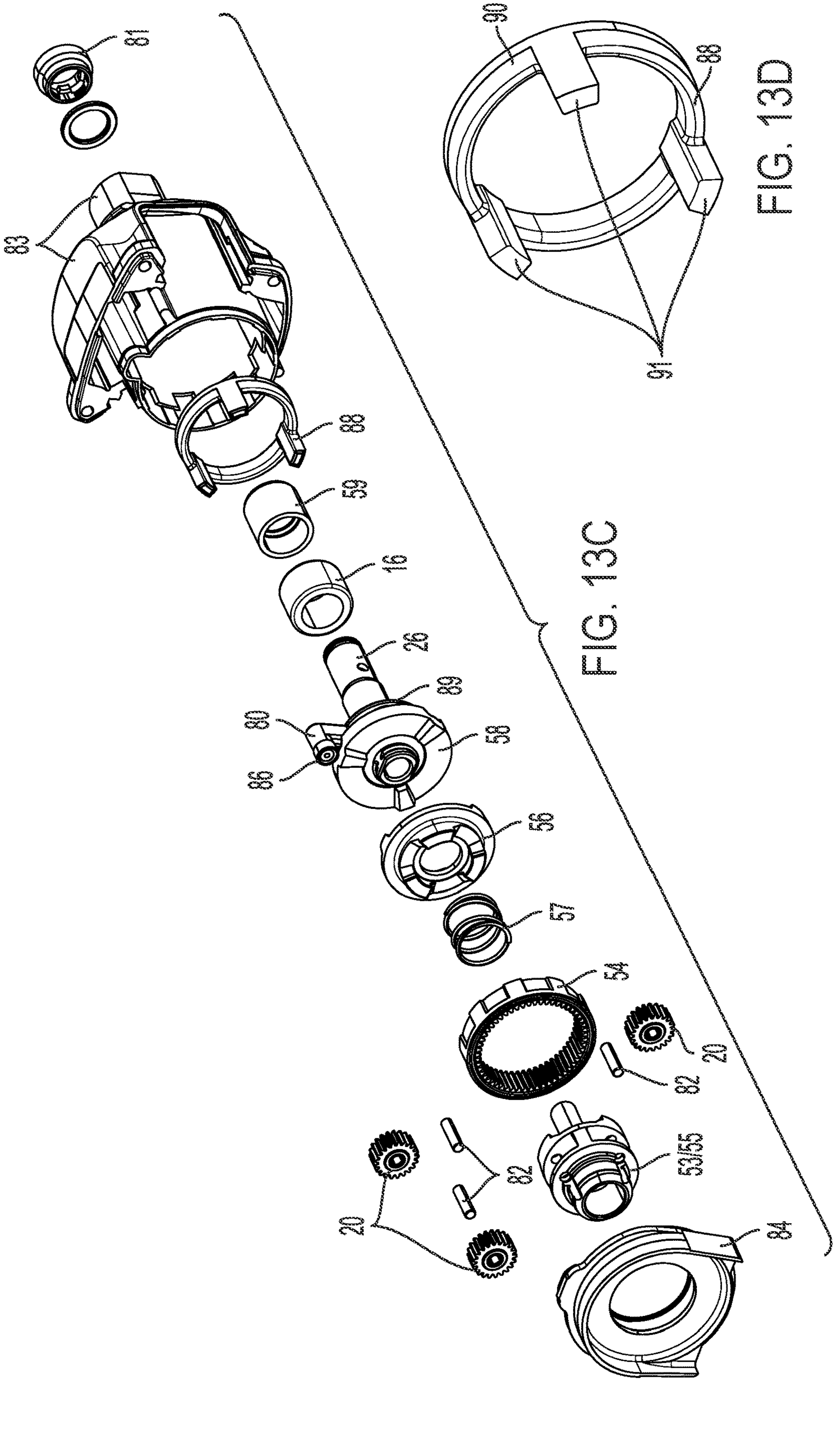
FIG. 13C is a rear portion perspective exploded view of an example transmission and clutch assembly with a braking mechanism.
FIG. 13D is a perspective view of the braking mechanism of FIG. 13C.
Figure 13E:
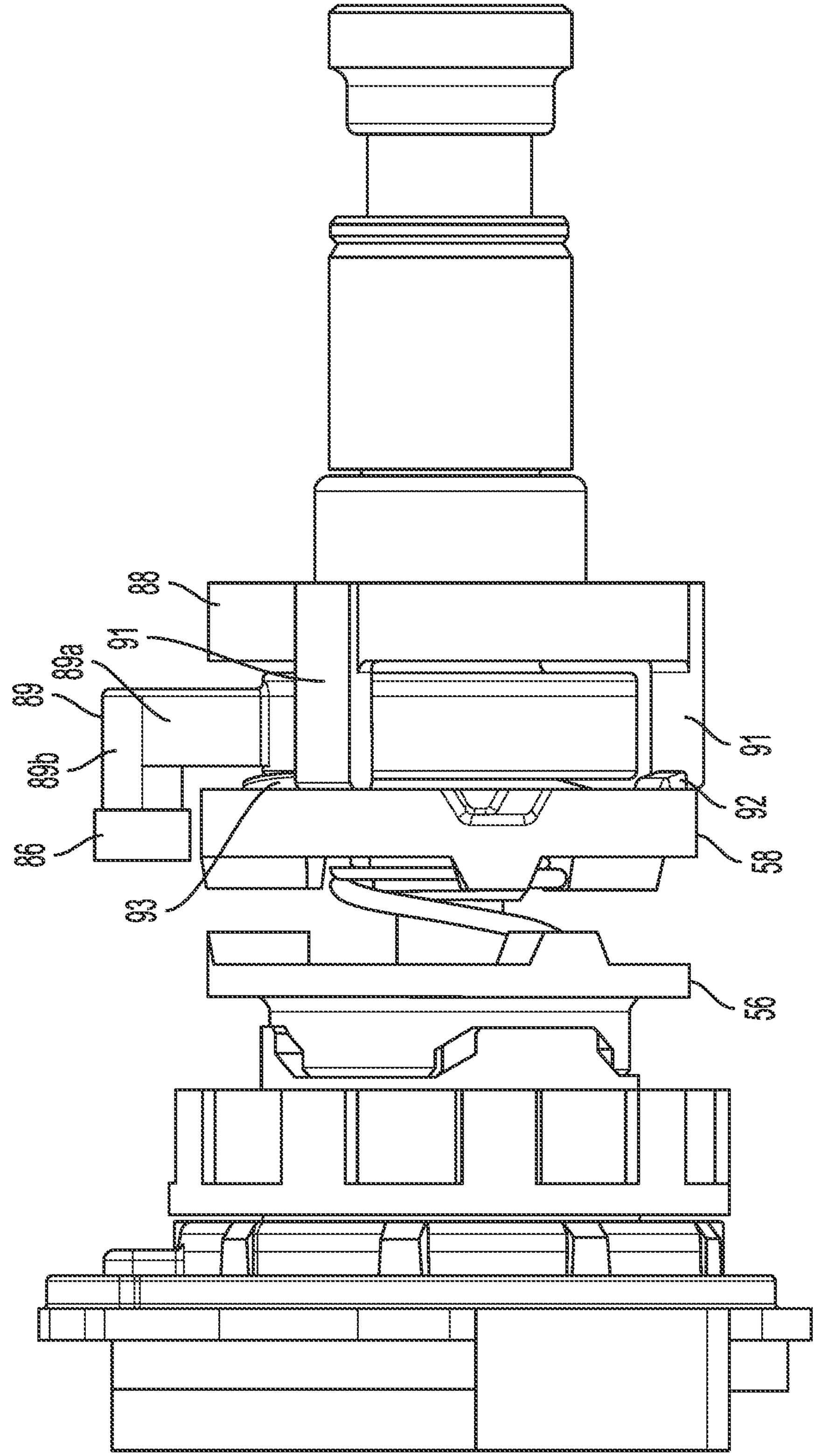
FIG. 13E is a side view of the assembled transmission and clutch assembly of FIG. 13C with the braking mechanism engaged.
Figure 13F:
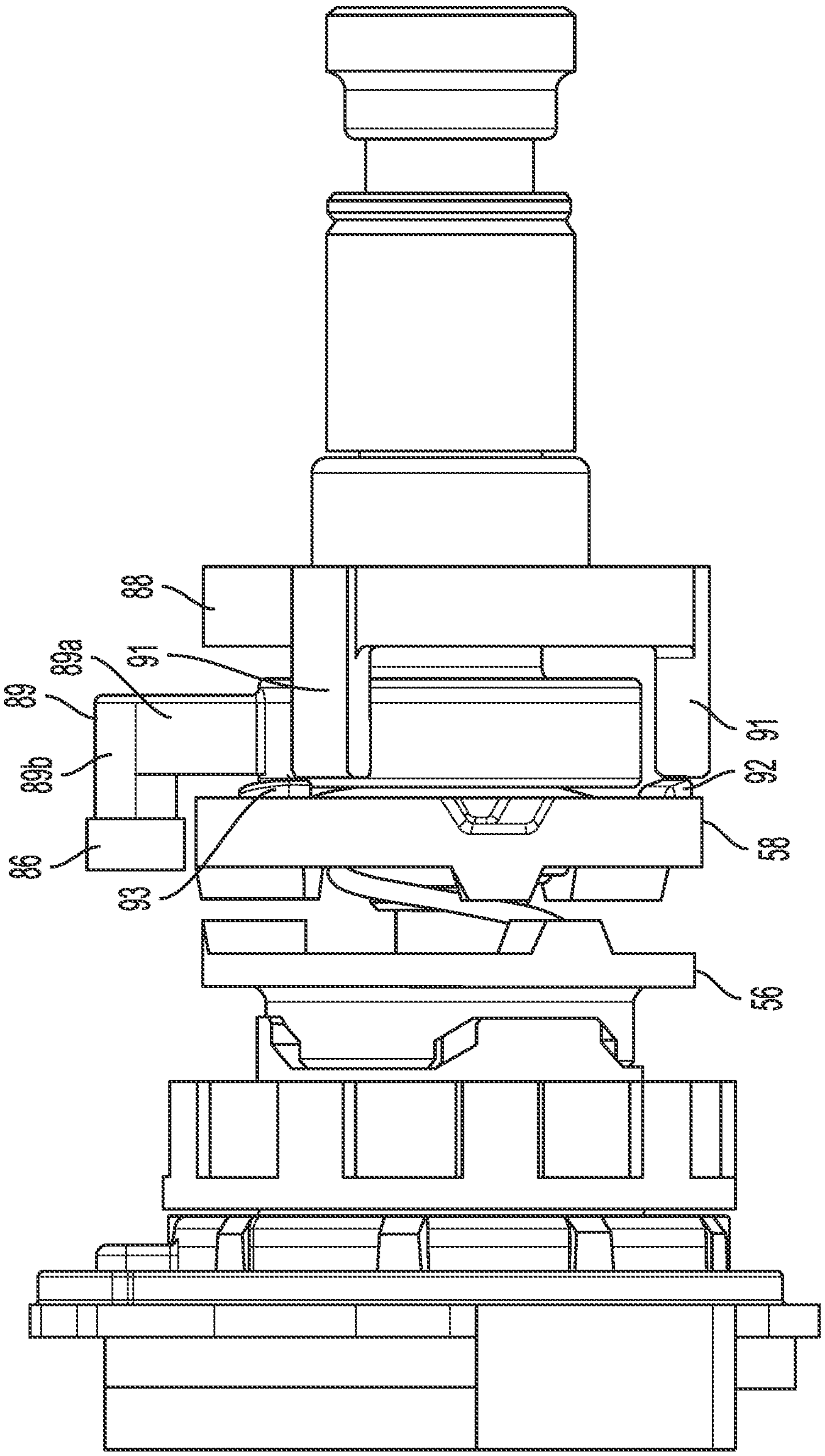
FIG. 13F is a side view of the assembled transmission and clutch assembly of FIG. 13C with the braking mechanism disengaged.
Figure 13G:
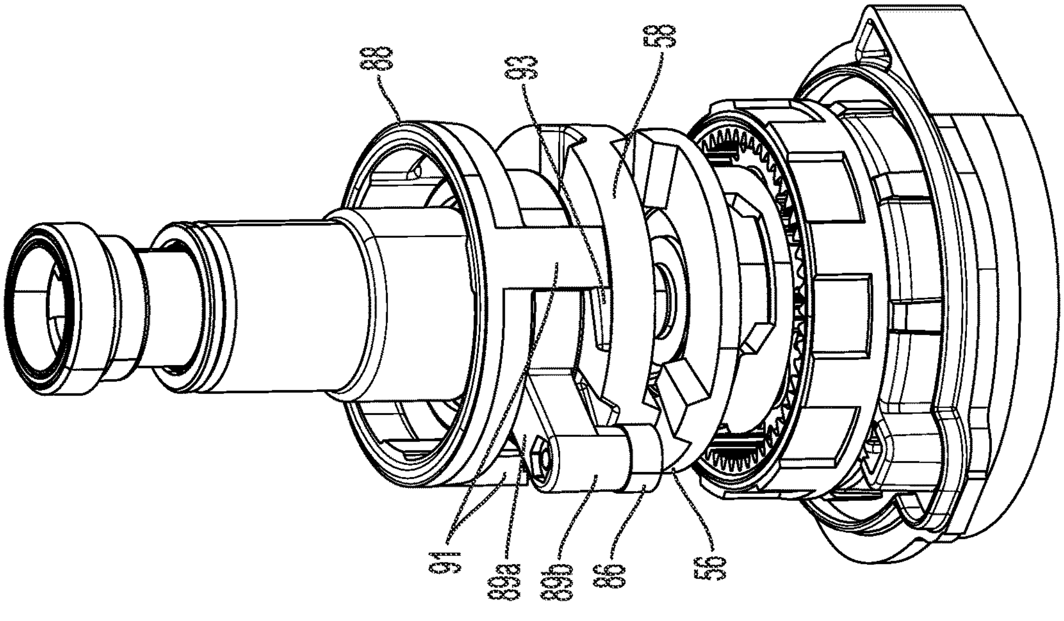
FIG. 13G is a side view of the assembled transmission and clutch assembly of FIG. 13C with the braking mechanism engaged.
Figure 13H:
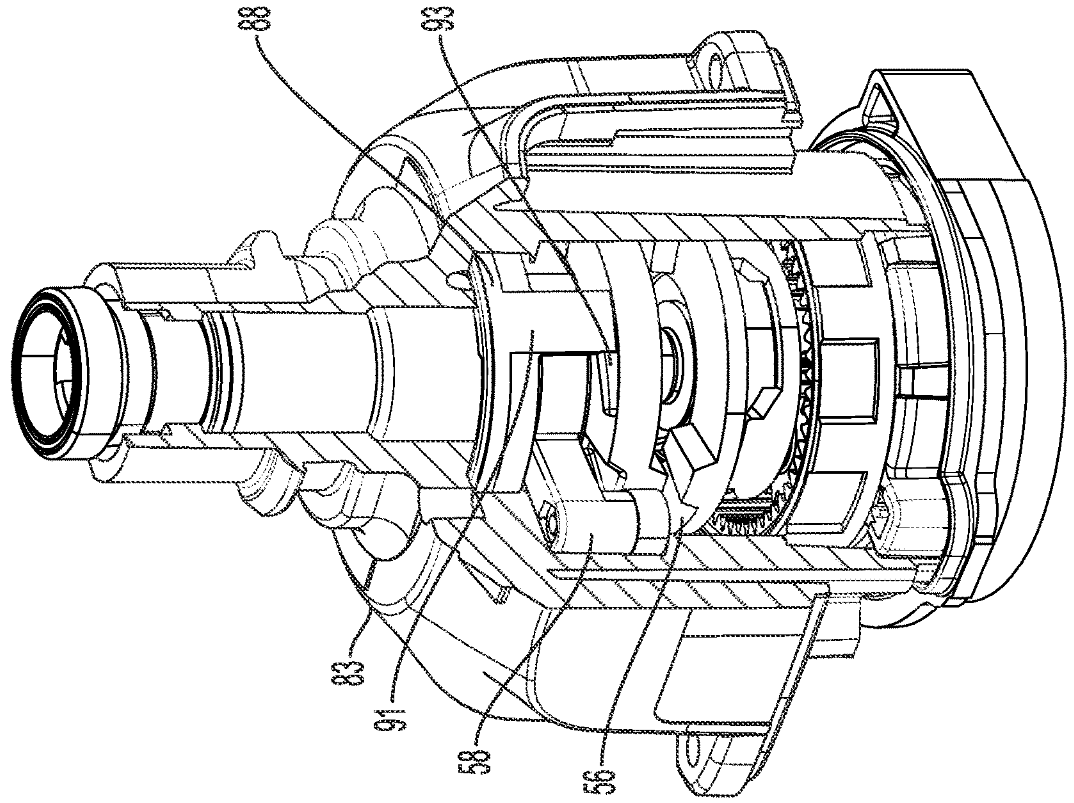
FIG. 13H is a side view of the assembled transmission and clutch assembly of FIG. 13G in a partial cutaway of the gear and clutch case.
Figure 13I:
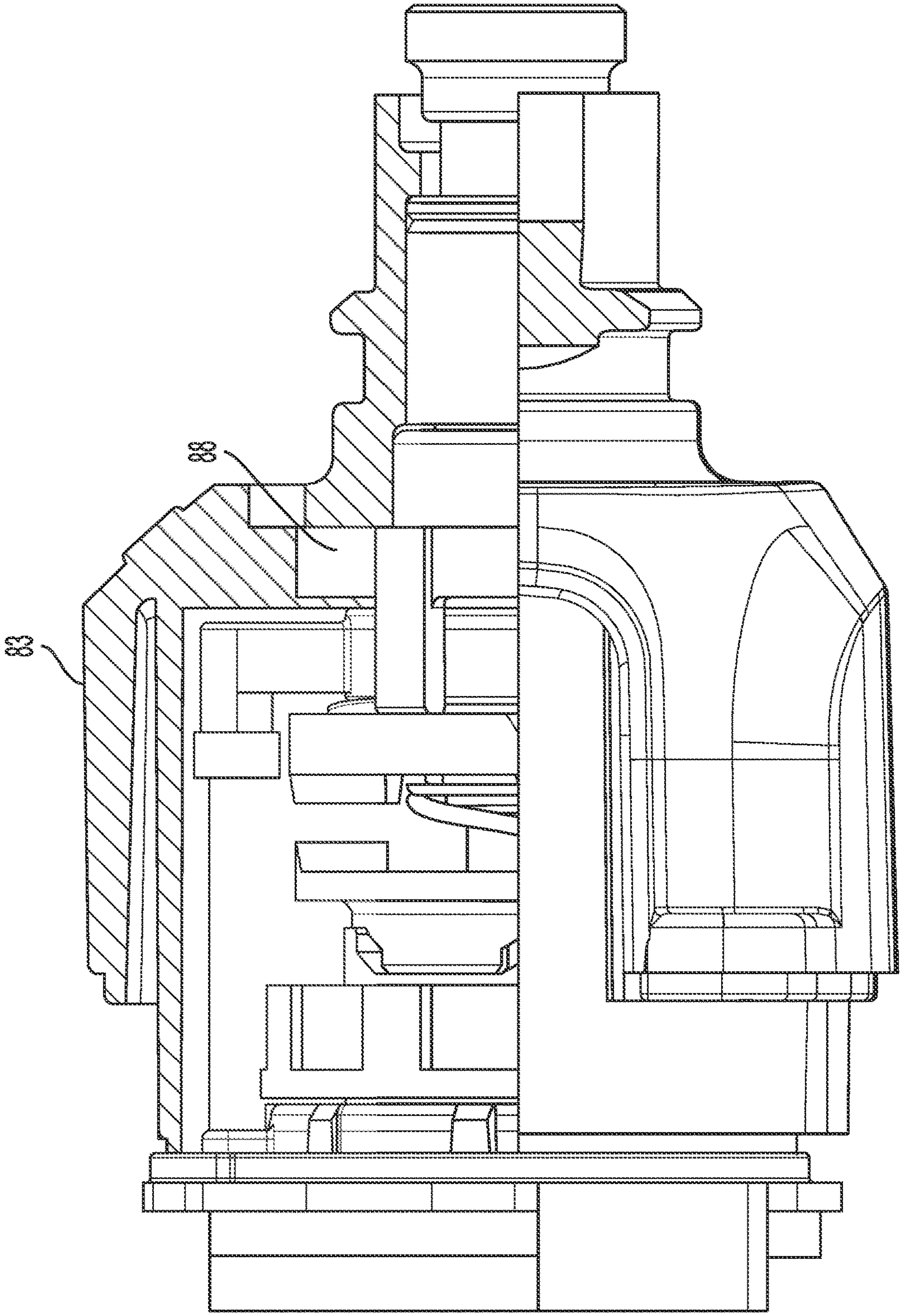
FIG. 13I is a side view of the assembled transmission and clutch assembly of FIG. 13G in a partial cutaway of the gear and clutch case.
Figure 13J:
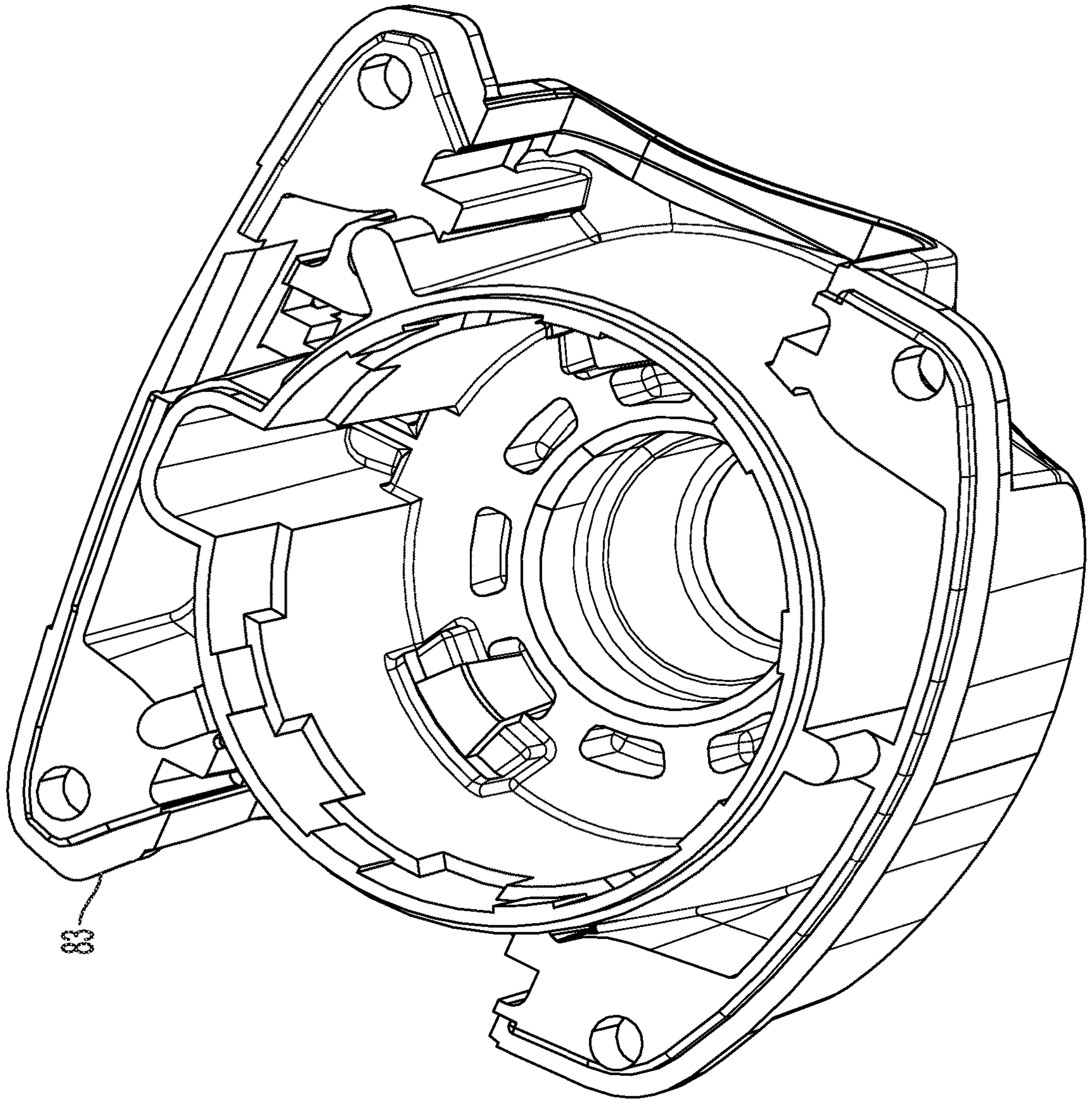
FIG. 13J is a top view of the gear and clutch case of FIG. 13I.
Figure 14:
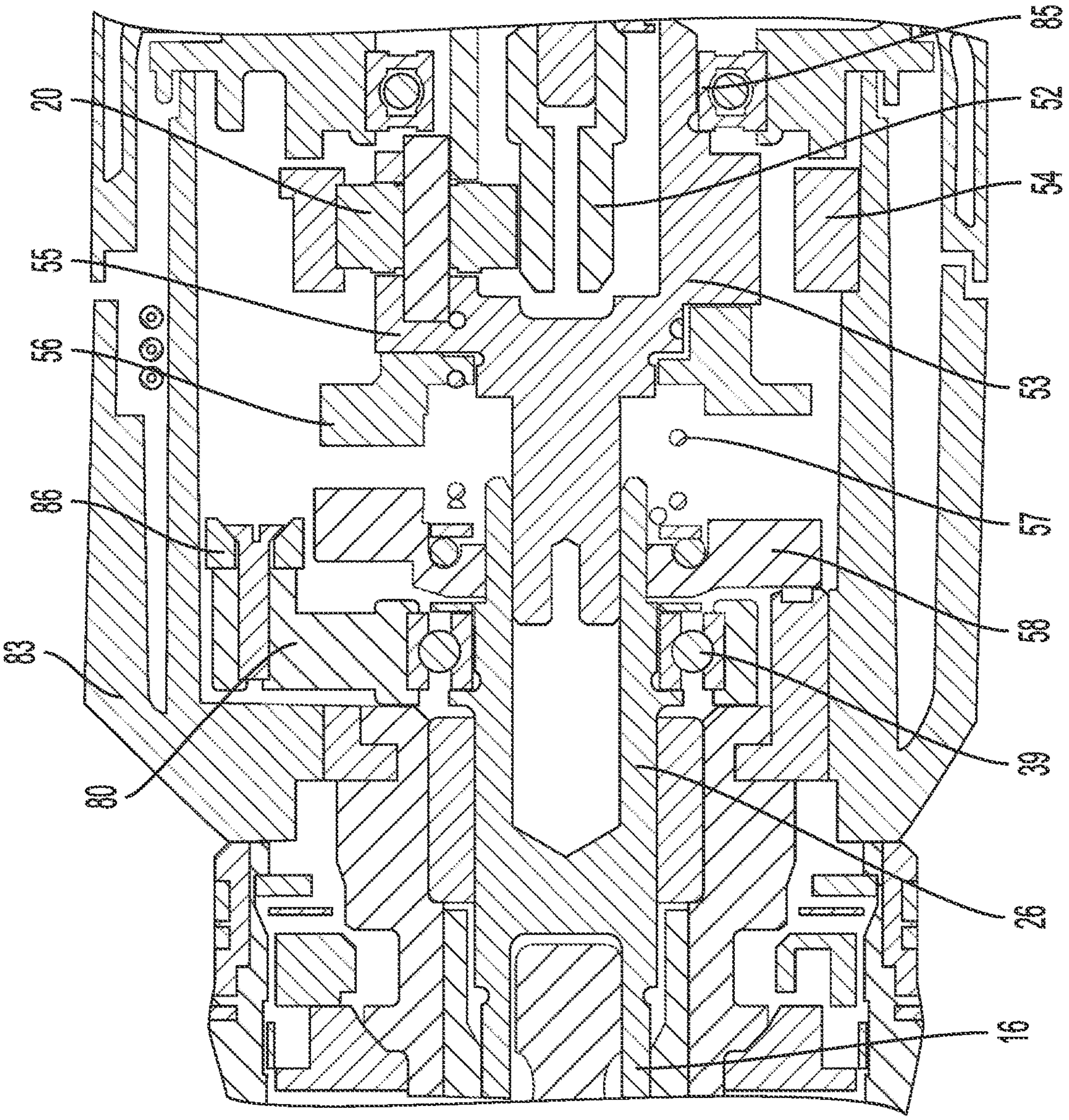
FIG. 14 is a side view of an assembled transmission and clutch assembly for a screwgun.
Figure 15:
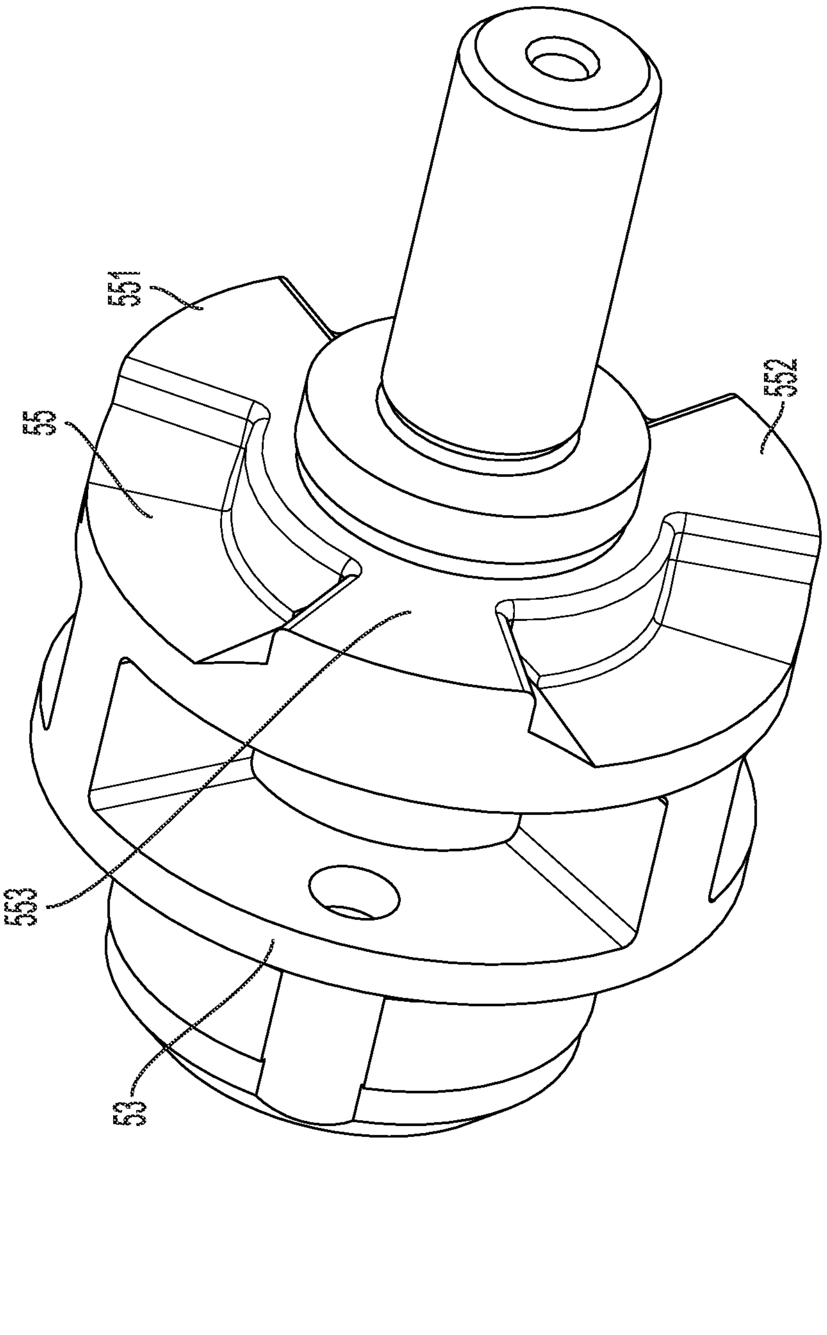
FIG. 15 is a perspective view of an example integrated clutch input face.

Referring to FIGS. 13A-15, an example transmission and clutch assembly for the power tool 10 is illustrated. FIG. 13A is a rear portion perspective exploded view of an example transmission and clutch assembly for a screwgun. FIG. 13B is a front portion perspective exploded view of the transmission and clutch assembly of FIG. 13A. FIG. 14 is a side view of an assembled transmission and clutch assembly for a screwgun. FIG. 15 is a perspective view of an example planet carrier 53 with an integrated input clutch 55.

As mentioned above, the motor (not shown) drives the working end or tool bit holder 16 via the motor output shaft (not shown), the output spindle 26, and the transmission and clutch assembly. The transmission and clutch assembly includes a gear and clutch case front portion 83 and a gear and clutch case rear portion 84, in which the transmission and clutch components are at least partially disposed. A bearing 81 is disposed in the gear and clutch case front portion 83. In some implementations, and as illustrated, the transmission may be a planetary gear transmission that includes a sun gear 52 (also referred to as a pinion), a planet carrier 53 for holding three planet gears 20, and a ring gear 54 that is fixed around the planet gears. Pins 82 (also referred to as carrier pins) are configured to secure and hold the planet gears 20 in the planet carrier 53. The sun gear 52 is operably coupled to the motor output shaft 51, which rotatably drives the sun gear 52. The sun gear 52 is operably coupled to the planet gears 20 where the teeth of the sun gear 52 rotatably drive the planet gears 20. The planet gears 20 rotate around axes that revolve around the sun gear 52. The ring gear 54 binds and encases the planet gears 20. A bearing 39 (also referred to as an output spindle bearing) supports the output spindle 26. As shown in FIG. 14, a planet carrier bearing 85 support the planet carrier 53.

The transmission is operably coupled to a clutch system that includes an input clutch 55 integrated with the planet carrier 53, an intermediate clutch 56, a clutch spring 57, and an output clutch 58. The output clutch 58 is operably coupled to the output spindle 26 and the tool bit holder 16. The output clutch 58 moves axially with the with the output spindle 26 and the tool bit holder 16. In general operation, the rotation of the motor output shaft rotatably drives the sun gear 52 and the planet carrier 53 with the integrated input clutch 55 and the intermediate clutch 56. An axial gap between the intermediate clutch 56 and the output clutch 58 keeps the output clutch disengaged from the intermediate clutch 56 until an axial force is exerted on the tool bit holder

16, such as by a user pressing the tool bit holder 16 into a workpiece. The axial force exerted on the tool bit holder axially moves the tool bit holder 16 and the output spindle 26, which is coupled to the tool bit holder 16, and the output clutch 58, which is coupled to the output spindle 26, and compresses the clutch spring 57 until the output clutch 58 engages the rotating intermediate clutch 56. The rotating intermediate clutch 56 imparts rotation to and rotatably drives the output clutch 58, the output spindle 26, and the tool bit holder 16.

Referring more specifically to FIG. 15, the input clutch 55 is integrated with the planet carrier 53. With the input clutch 55 integrated with the planet carrier 53, the overall transmission and clutch assembly is more compact and enables users to use the power tool in tighter and more confined spaces, where manoeuvrability may be challenging. The input clutch 55 includes multiple clutch faces 551, 552, and 553. The clutch faces 551, 552, and 553 mesh and interact with corresponding clutch faces on the intermediate clutch 56. In general, the input clutch 55 and the intermediate clutch 56 remain axially stationary, while the output clutch 58 is a movable clutch that moves in an axial direction to engage the intermediate clutch 56 when the spring force of the clutch spring 57 is overcome and to disengage the intermediate clutch 56 when the spring force of the clutch spring 57 is released.

Figure 17A:
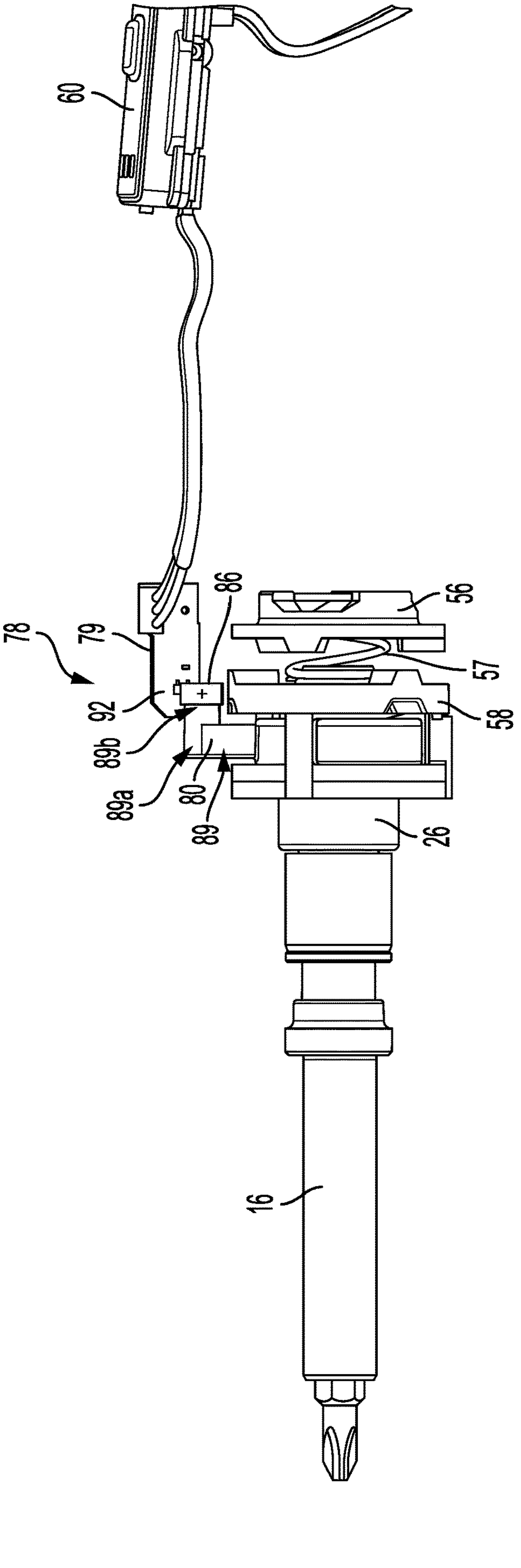
FIG. 17A is a side assembled view of an example mode change sensor.
Figure 17B:
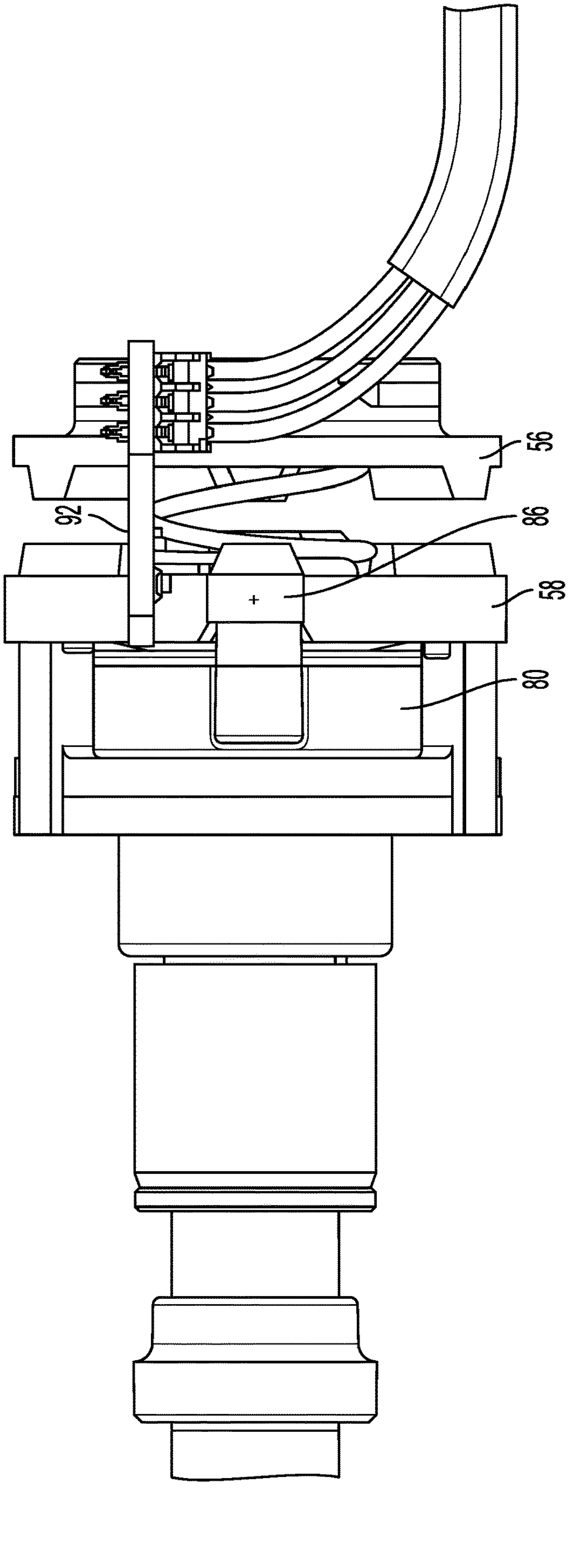
FIG. 17B is a partial side assembled view of the mode change sensor of FIG. 17A rotated 90 degrees.

Referring also to FIG. 17A, the sensor assembly 78 comprises a sensed member 89 including a magnet arm assembly 80 and a sensing member 79 including a Hall sensor 92. The magnet arm assembly 89 includes a radial arm portion 89*a* that extends radially outward from the output spindle to a radius that is greater than a radius of the output clutch 58, an axial arm portion 89*b* that extends axially rearward across at least a portion of the output clutch 58, and, a magnet 86 that is coupled to the axial arm portion 89*b* approximately even with the output clutch 58. The magnet arm 80 is coupled to the output clutch 58. The magnet arm assembly 80 and magnet 86 move axially when the output clutch 58 moves axially. In this manner, the axial position of the magnet arm assembly 80 and magnet 86 may be sensed by the Hall sensor 92 to detect the movement of the tool bit holder 16, the output spindle 26, and the output clutch 58 when the tool bit holder 16 is pressed against a workpiece. The detection of the movement of these components may be used to one or more of the modes of operation discussed above such as, for example, the push start mode(s) and the rapid sequential mode(s). At least a portion of the magnet arm assembly 80 is located forward of the output clutch 58 on the side closer to the gear and clutch case front portion 83. The magnet arm assembly 80 and the Hall sensor 92 are discussed in more detail below with respect to FIGS. 17A-19D.

Referring to FIGS. 13C-13J, the transmission and clutch assembly also may include a braking mechanism 88, also referred to as a clutch stop. FIG. 13C illustrates an exploded view of the clutch and transmission assembly with the braking mechanism 88 and FIG. 13D illustrates the braking mechanism component by itself. The braking mechanism may include a ring 90 and multiple legs 91. As illustrated in FIGS. 13E, 13G, 13H, and 13I the legs 91 of the braking mechanism 88 extend from a point axially forward of the sensed member 89 of the sensor assembly 78 to a point axially rearward of the radial arm portion 89*a* of the sensor assembly 78 to engage stops 93 on the output clutch 58 when the output clutch 58 is in its forward position to prevent rotation of the output clutch 58 and the tool bit holder 16 when the output clutch 58 is disengaged from the intermediate clutch 56 and the input clutch 55. This is also referred to as a "dead spindle" position. In this example, the braking mechanism 88 includes multiple legs 91 that engage stops 93 on the output clutch 58 when the output clutch 58 is in its forward position to prevent rotation of the output clutch 58 and the tool bit holder 16 when the output clutch 58 is disengaged from the intermediate clutch 56 and the input clutch 55.

In FIG. 13F, the stops 93 on the output clutch 58 are disengaged from the legs 91 on the braking mechanism 88. For instance, as the output clutch 58 re-engages the intermediate clutch 56, the stops 93 on the output clutch 58 disengage from the legs 91 on the braking mechanism 88 so that the output clutch 58 and the output spindle 26 may rotate. In FIGS. 13H-13J, the braking mechanism 88 is illustrated as being integrated as part of the gear and clutch case 83. For example, the braking mechanism 88 may be insert molded into the gear and clutch case 83.

Figure 16A:
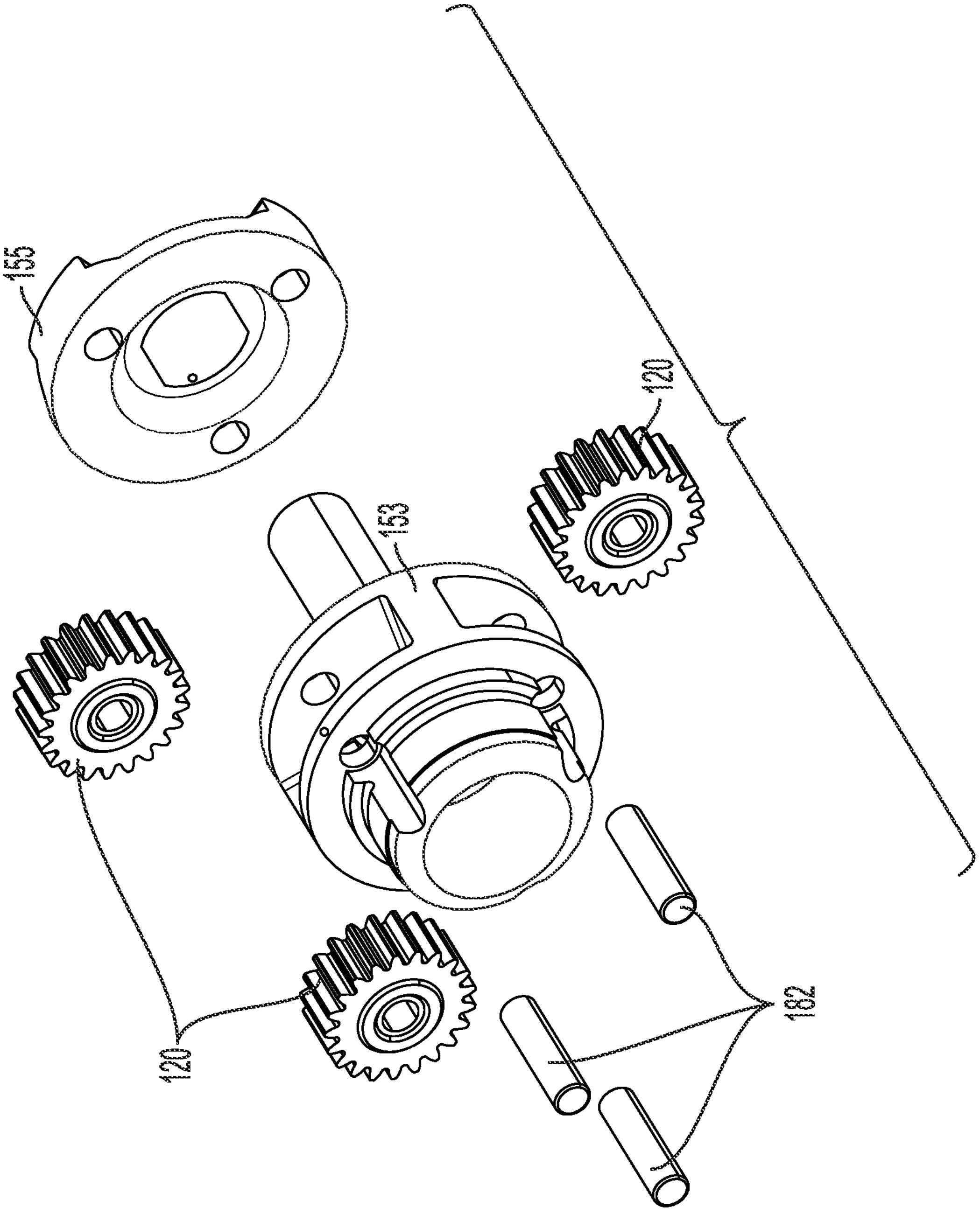
FIG. 16A is a rear perspective exploded view of another example input clutch.
Figure 16B:
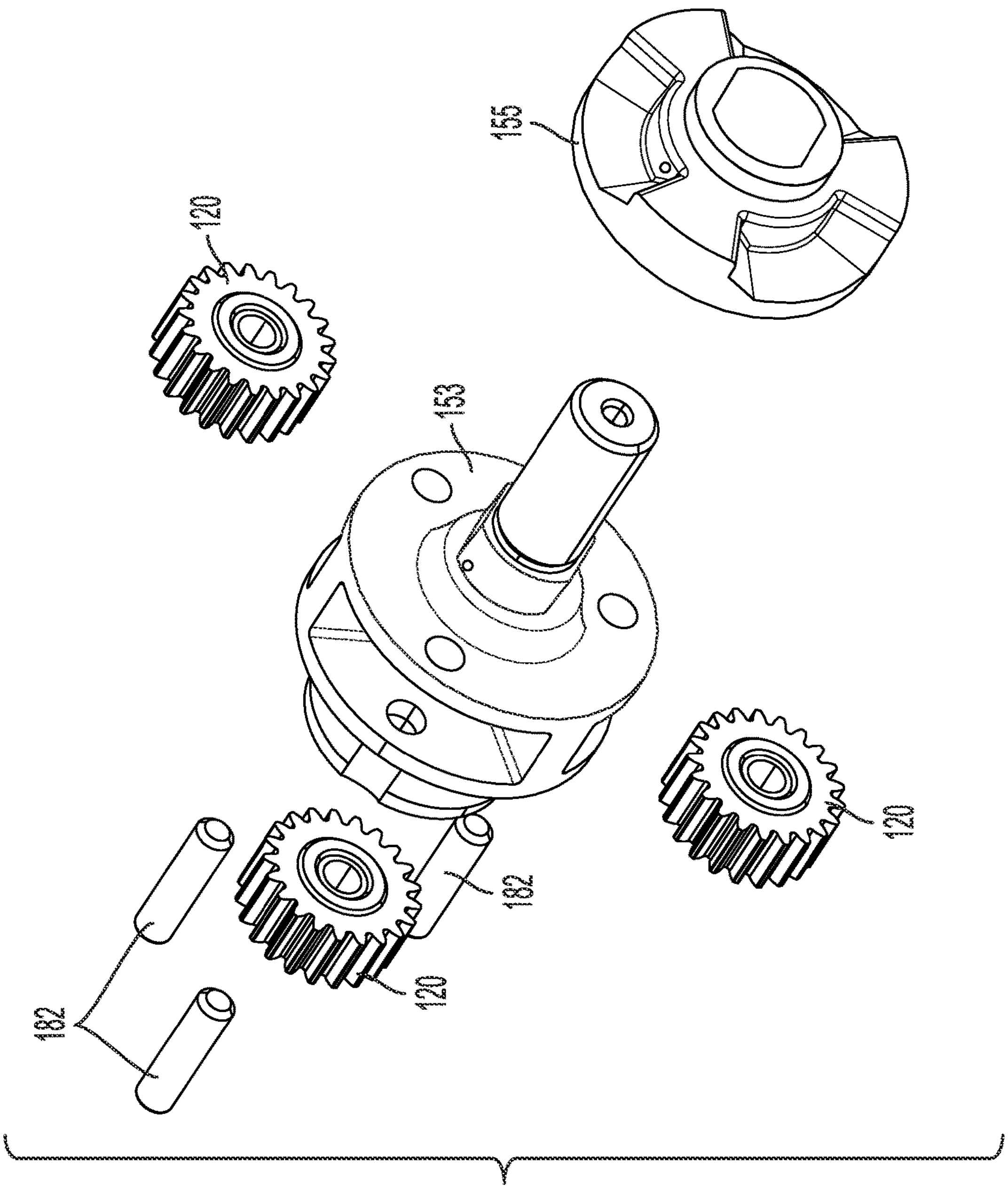
FIG. 16B is a front perspective exploded view of the input clutch of FIG. 16A.

Referring to FIGS. 16A and 16B, another example implementation of a transmission and clutch assembly is illustrated. FIG. 16A is a front perspective exploded view of another example input clutch. FIG. 16B is a rear perspective exploded view of the input clutch of FIG. 16A. In this example, the input clutch 155 is not integrated with the planet carrier 153 and instead is a separate component. The pins 182 function as a securing mechanism to secure and hold the planets 120 in the planet carrier 153 and to hold the input clutch 155 to the planet carrier 153.

In some implementations, the transmission may include a parallel axis transmission, similar to the one described in U.S. Pat. No. 7,469,753, which is incorporated herein by reference.

Figure 18:
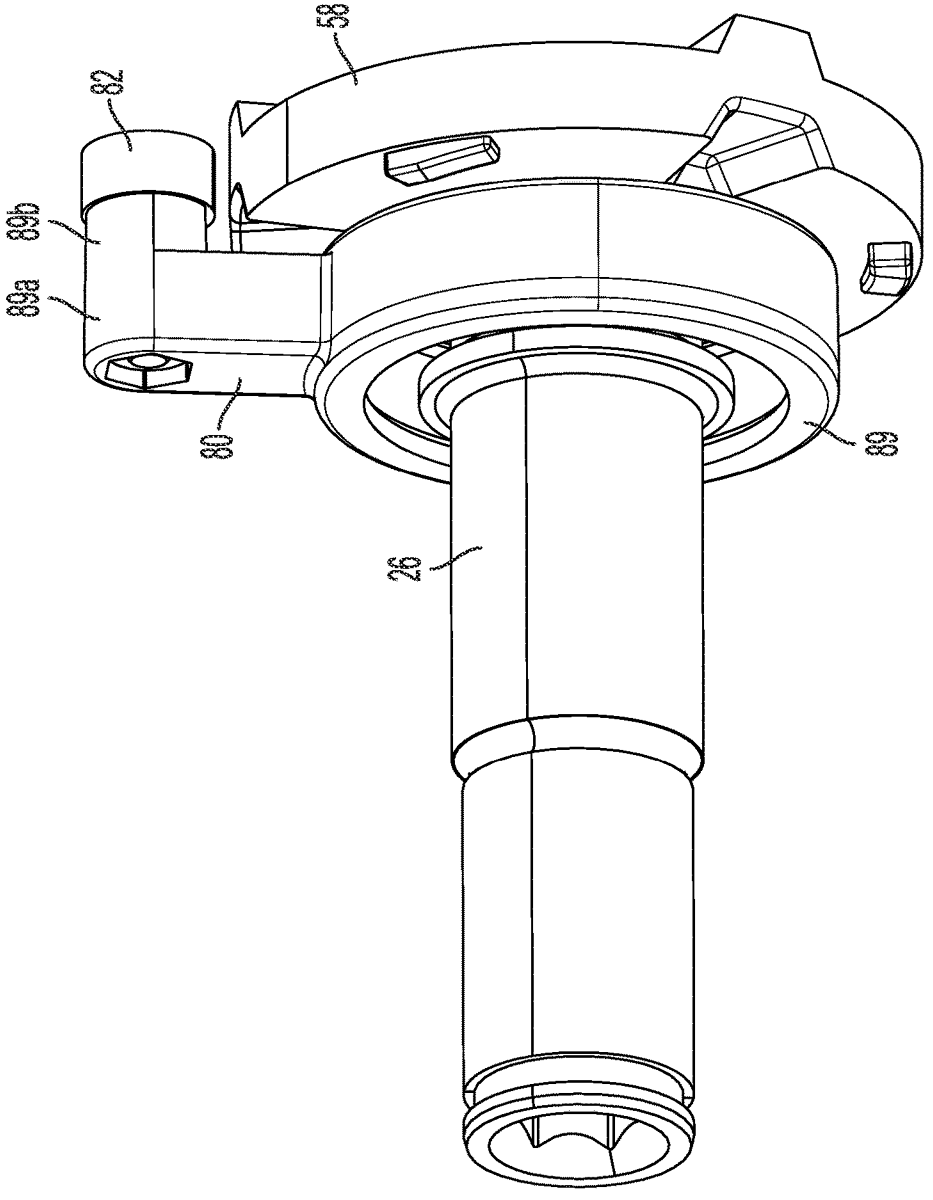
FIG. 18 is a side view of the output shaft with magnet arm assembly of FIG. 17A.

Referring to FIGS. 17A-19D, an example sensor assembly 78 is illustrated. The sensor assembly 78 includes the magnet arm assembly 80 coupled to the output spindle 26, the magnet 86, and the Hall sensor 92 electrically connected to the electronic mode select switch 60. FIG. 17A is a side assembled view of an example mode change sensor. FIG. 17B is a partial side assembled view of the mode change sensor of FIG. 17A rotated 90 degrees. FIG. 18 is a side view of the mode change sensor of FIG. 17A.

The magnet arm assembly 80 is coupled to the tool bit holder 16 side of the output clutch 58, which is forward of the clutch spring 57 and the intermediate clutch 56. In operation, the Hall sensor 92 senses the movement of the magnet 86 by detecting a change in polarity as the magnet moves axially. The Hall sensor 92 may be a bi-latching Hall sensor that uses the detected change in polarity of the magnet, due to the axial movement of the magnet 86, to send signals to the electronic mode select switch 60, which may be relayed to the motor controller. In some implementations, the Hall sensor may be an ordinary Hall sensor that detects the proximity of the magnet.

When the user applies pressure to the tool bit holder 16 against a workpiece, the tool bit holder 16, the output spindle 26, and the output clutch 58 with the attached magnet arm assembly 80 move axially to compress the clutch spring 57 towards the intermediate clutch 56. The magnet 86 is fixed to the magnet arm assembly 80 and moves axially with the magnet arm assembly 80 and the output clutch 58. As the magnet 86 moves across the Hall sensor 92 and the change of polarity is sensed, the Hall sensor 92 sends a signal to the electronic mode select switch 60. If the current mode of operation is the push start mode or rapid sequential mode, the motor will turn ON responsive to the detected axial movement and the signal initiated by the Hall sensor 92.

When the user releases the pressure of the tool bit holder 16 from the workpiece, the tool bit holder 16, the output spindle 26, and the output clutch 58 with the attached magnet arm assembly 80 move axially away from the intermediate clutch 56. The magnet 86 is fixed to the magnet arm assembly 80 and moves axially with the magnet arm assembly 80 and the output clutch 58. As the magnet 86 moves back across the Hall sensor 92 and the change of polarity is sensed, the Hall sensor 92 sends a signal to the electronic mode select switch 60. If the electronic mode select switch 60 is in the push mode, the motor will turn OFF responsive to the detected axial movement and the signal initiated by the Hall sensor 92. If the electronic mode select switch 60 is in the rapid sequential mode, the motor remains ON for the period of time responsive to the detected axial movement and the signal initiated by the Hall sensor 92.

Figure 19A:
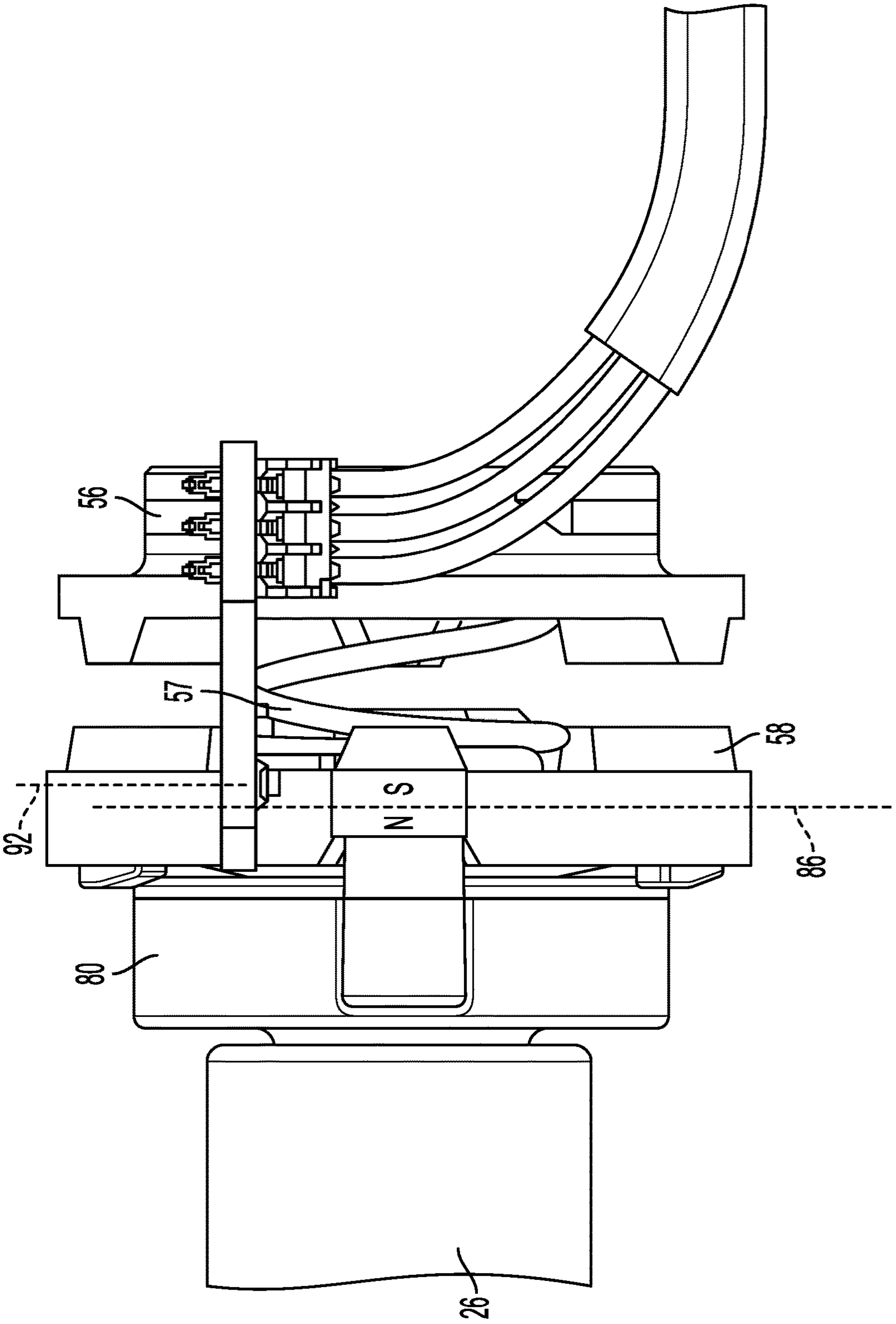
FIG. 19A is a partial side assembled view of the mode change sensor of FIG. 17A in a first position.

FIGS. 19A-19D illustrate the operation of the magnet arm assembly 80 and the Hall sensor 92. FIG. 19A is a partial side assembled view of the mode change sensor of FIG. 17A in a first position. In FIG. 19A, the tool state is the motor is OFF and the push start mode is selected on the electronic mode select switch and in a standby state. The output clutch 58 is disengaged from the intermediate clutch 56. The Hall sensor is looking for a magnetic pole change, where the "S" magnetic pole of the magnet 86 is positioned below the Hall sensor 92.

Figure 19B:
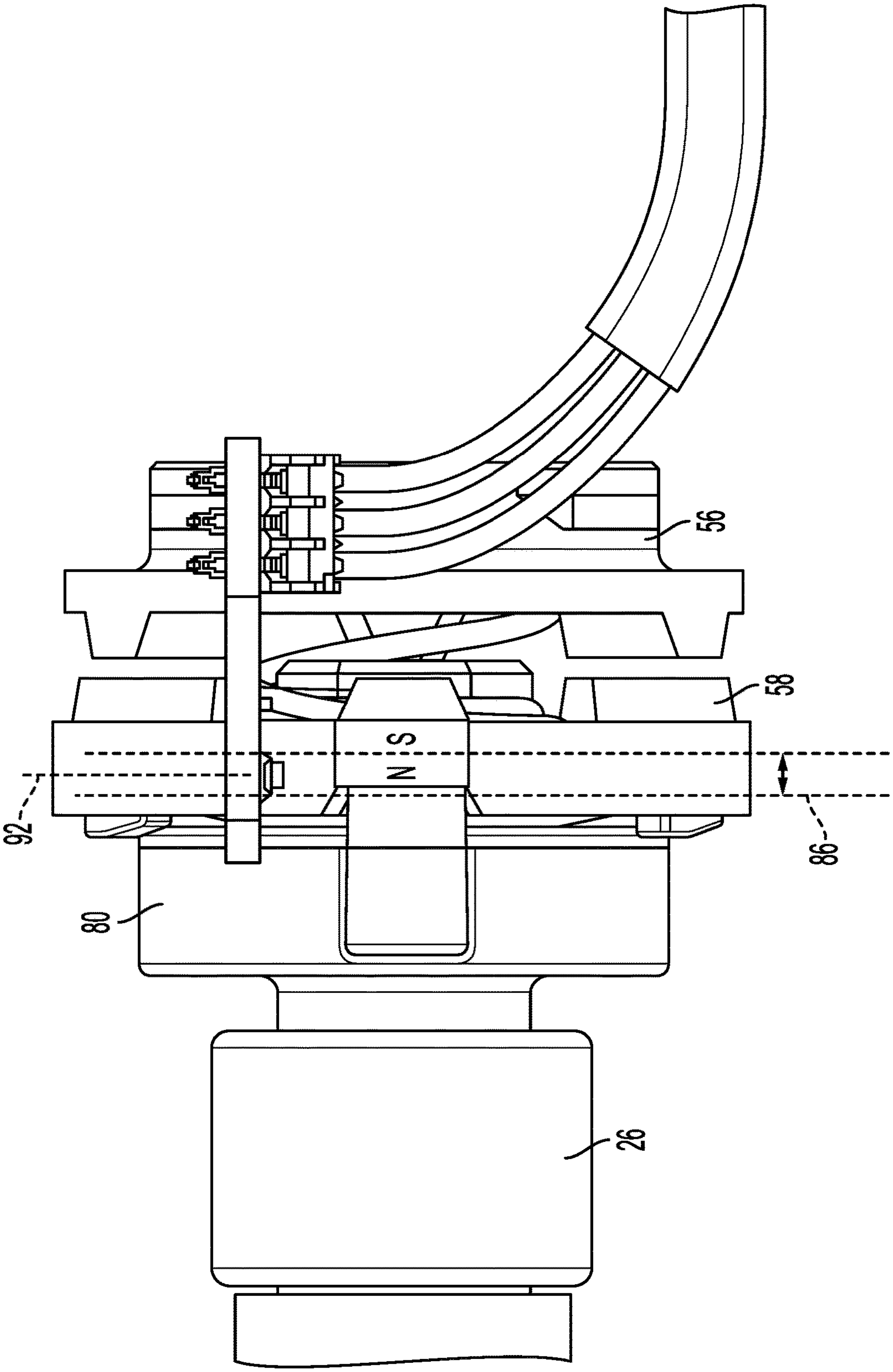
FIG. 19B is a partial side assembled view of the mode change sensor of FIG. 17A in a second position.

FIG. 19B is a partial side assembled view of the mode change sensor of FIG. 17A in a second position. In FIG. 19B, output spindle 26, the magnet arm assembly 80, and the magnet 86 move axially from a home position and travel the distance marked by "distance traveled." The axial movement moves the magnet 86 past the Hall sensor 92 such that the "N" pole of the magnet is positioned below the Hall sensor 92 and the Hall sensor 92 senses the magnetic pole change from "S" to "N". The Hall sensor 92 sends a signal to turn the Motor ON. The Motor turns ON even though the output clutch 58 has not yet engaged the intermediate clutch 56.

Figure 19C:
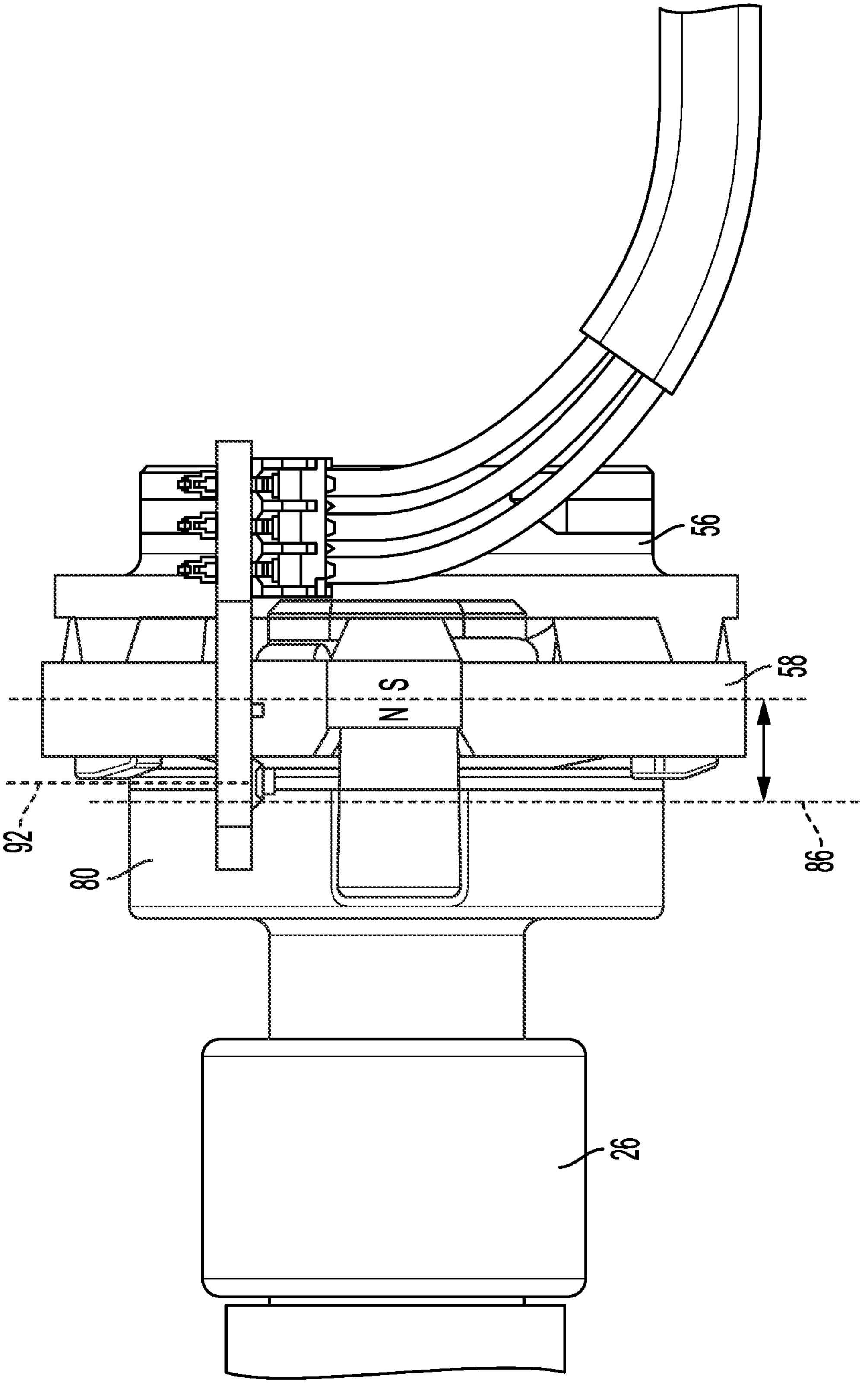
FIG. 19C is a partial side assembled view of the mode change sensor of FIG. 17A in a third position.

FIG. 19C is a partial side assembled view of the mode change sensor of FIG. 17A in a third position. In FIG. 19C, the axial movement of the output spindle 26, the magnet arm assembly 80, the magnet 86, and the output clutch 58 continues to engage the rotating intermediate clutch 56. The output clutch 58 engages the intermediate clutch 56 causing the output spindle 26 and the tool bit holder to rotate and drive a fastener into the workpiece. The tool state is the Motor is ON, the clutches are engaged and driving a fastener. The Hall sensor 92 is waiting for another change in polarity of the magnet.

Figure 19D:
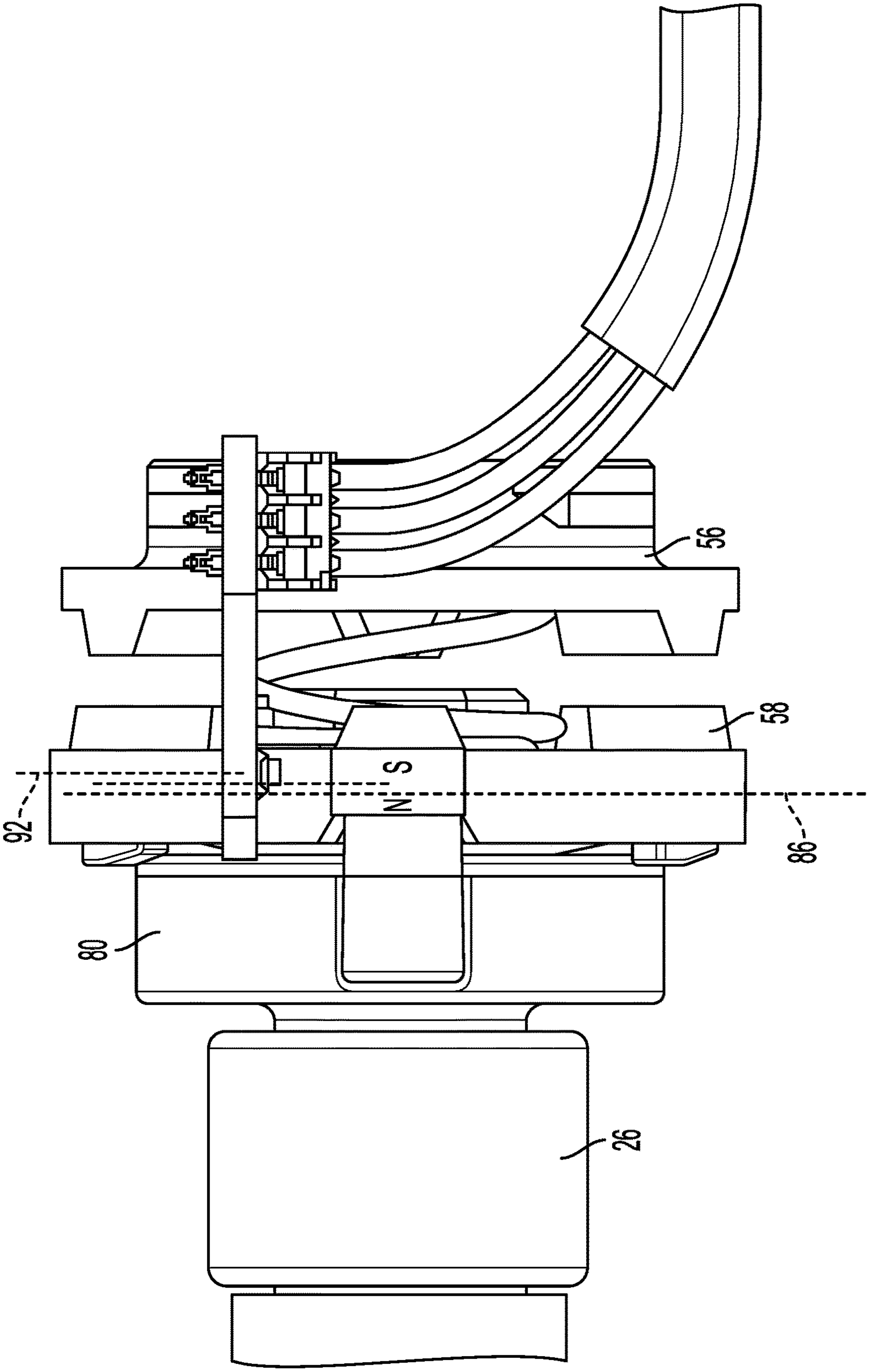
FIG. 19D is a partial side assembled view of the mode change sensor of FIG. 17A in a fourth position.

FIG. 19D is a partial side assembled view of the mode change sensor of FIG. 17A in a fourth position. In FIG. 19D, the output clutch 58 disengages from the intermediate clutch 56 and the output clutch 58, along with the magnet arm assembly 80 and the magnet 86, move axially back to the home position. The output clutch 58 and the output spindle 26 stop rotating when the clutches disengage. As the magnet 86 moves axially, the Hall sensor 92 senses the change in polarity from "N" back to "S". The Hall sensor 92 sends a signal to turn the Motor Off. If the electronic mode select switch 60 is in the push mode, the motor will turn OFF responsive to the detected axial movement and the signal initiated by the Hall sensor 92. If the electronic mode select switch 60 is in the rapid sequential mode, the motor remains ON for the period of time responsive to the detected axial movement and the signal initiated by the Hall sensor 92.

Figure 20:
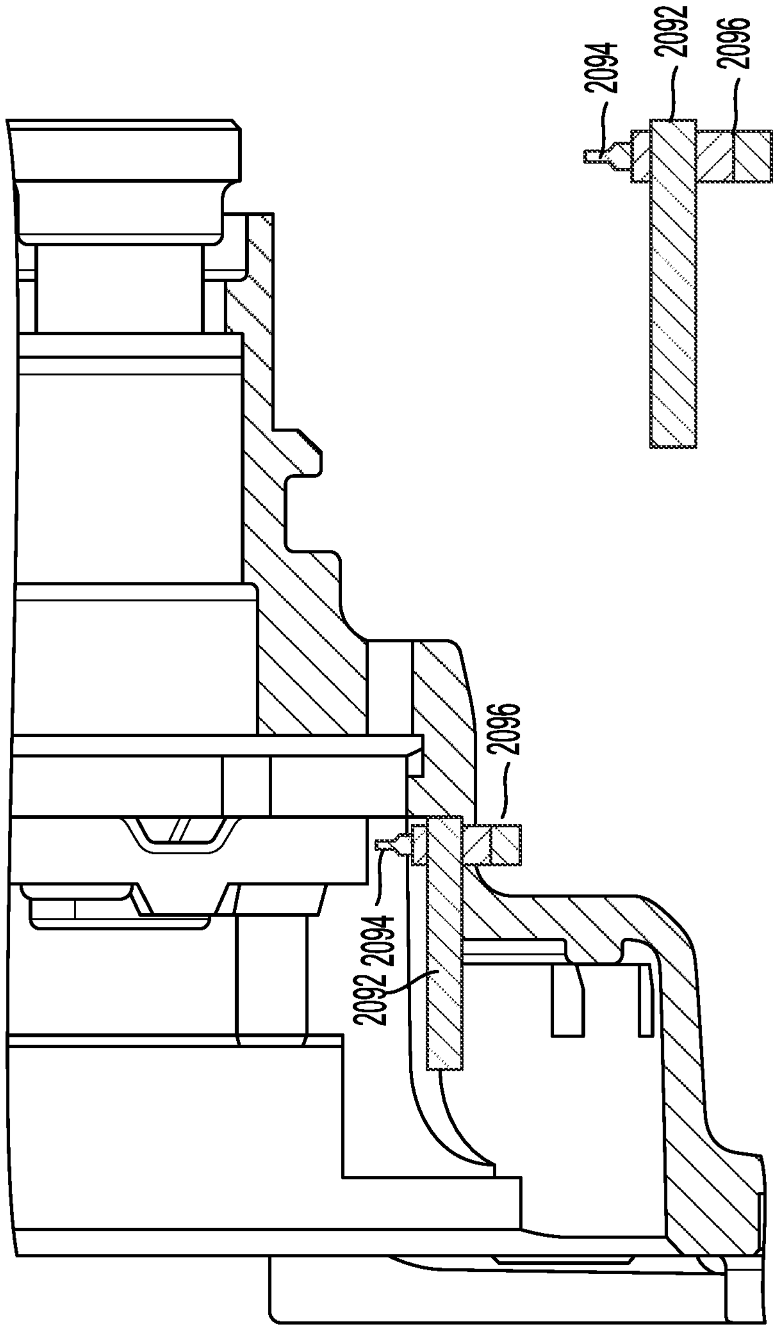
FIG. 20 is a partial side assembled view of another mode change sensor using a Hall sensor with a concentrator.

Referring to FIG. 20, another example implementation of a mode change sensor is illustrated. FIG. 20 is a partial side assembled view of another mode change sensor using a Hall sensor 2092 with a concentrator 2094. In some implementations, a Hall sensor 2092 may be used with a concentrator 2094 and a fixed permanent magnet 2096. The concentrator 2094 directs or focuses a magnetic field on the output clutch. When the output clutch moves axially, the magnetic field passing through the Hall sensor 2092 changes and the Hall sensor 2092 sends a signal to turn the motor ON. When the output clutch moves axially again, the magnetic field passing through the Hall sensor 2092 reverses and the Hall sensor 2092 sends a signal to turn the motor OFF.

Figure 21A:
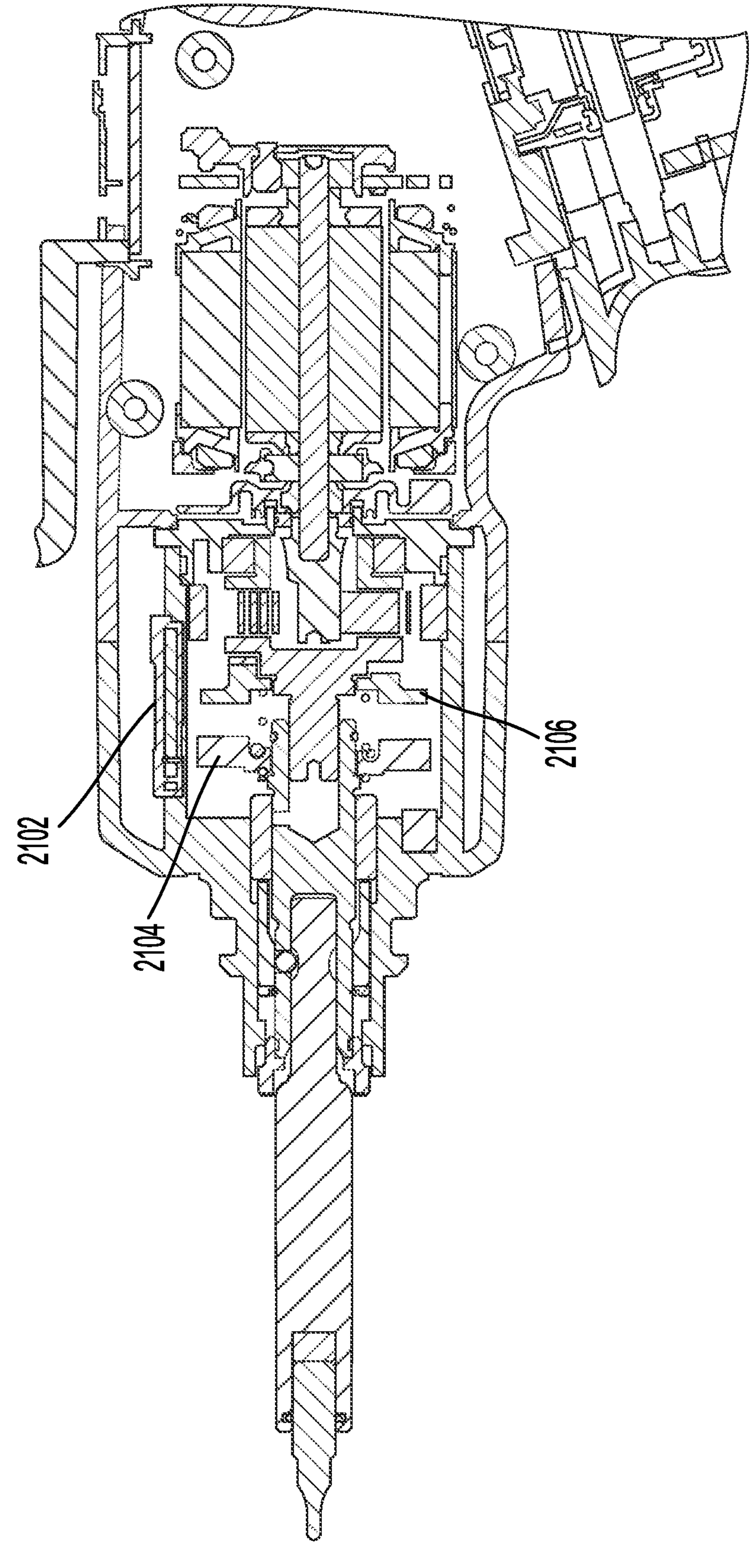
FIG. 21A is a side assembled view of another mode change sensor using an inductive sensor in a first position.
Figure 21B:
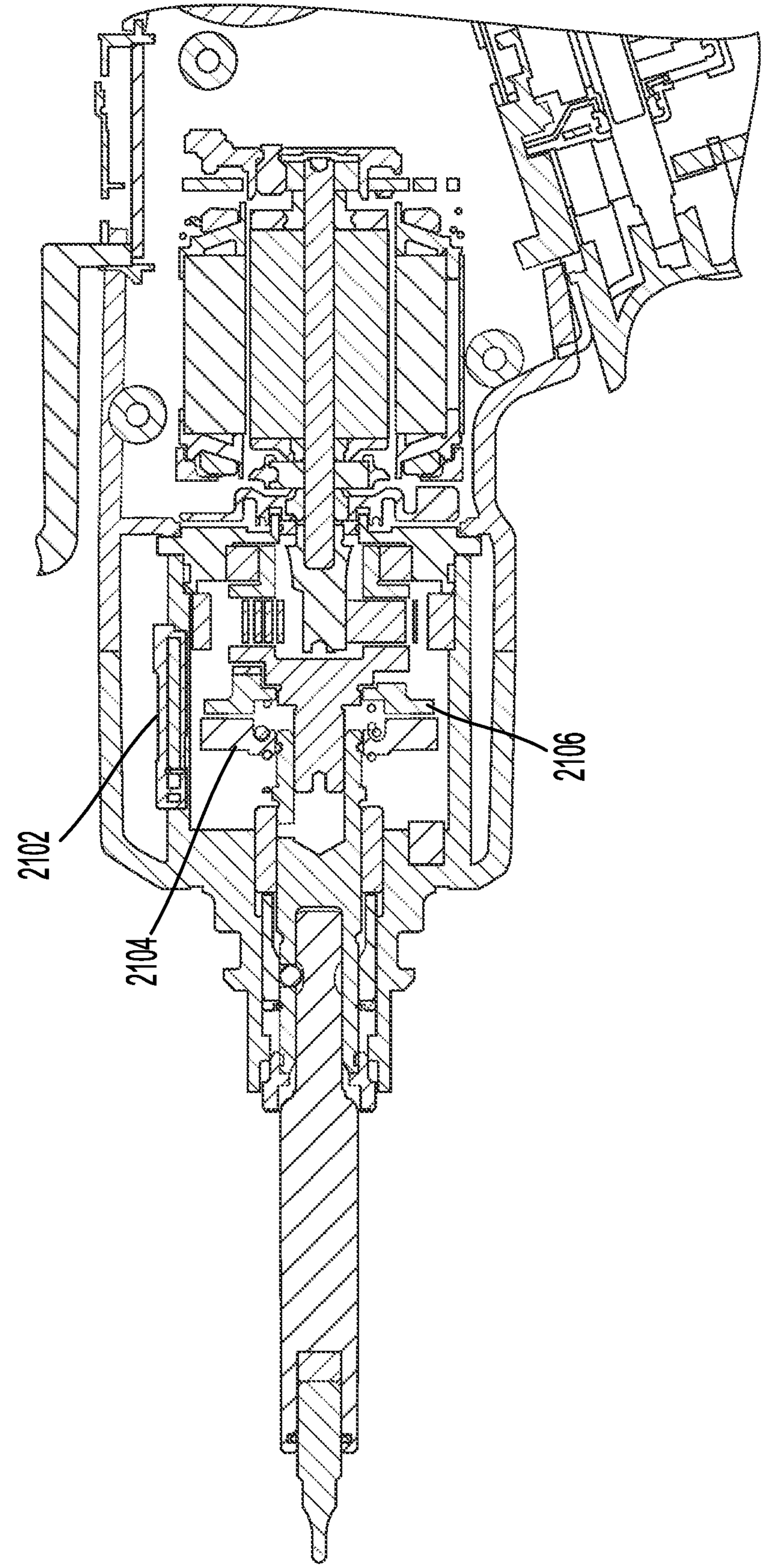
FIG. 21B is a side assembled view of the mode change sensor of FIG. 21A in a second position.
Figure 22A:
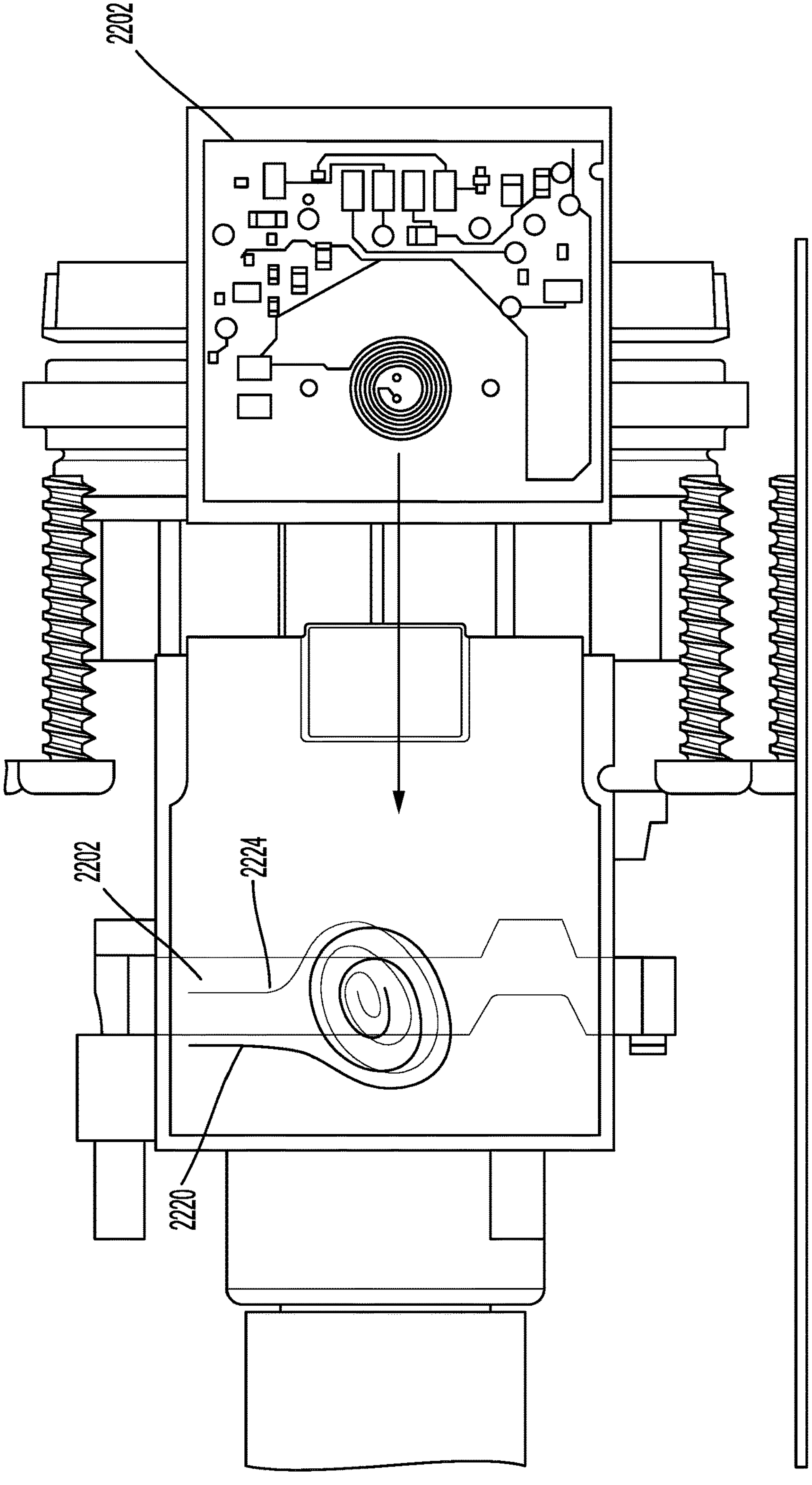
FIG. 22A is a partial side assembled view of the mode change sensor of FIG. 21A illustrating an inset view of inductive sensing coils.
Figure 22B:
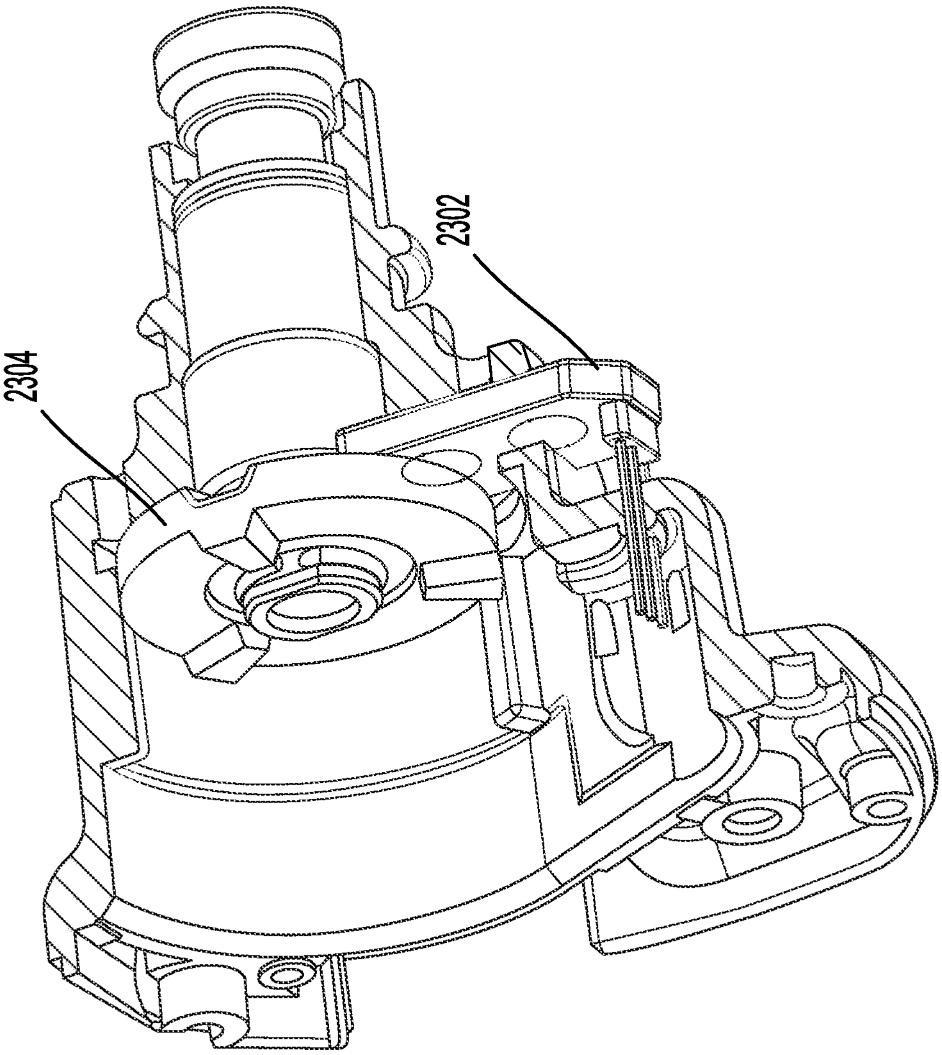
FIG. 22B a partial cutaway side assembled view of the mode change sensor of FIG. 21A except the sensor is moved to the front of the clutch face.
Figure 23B:
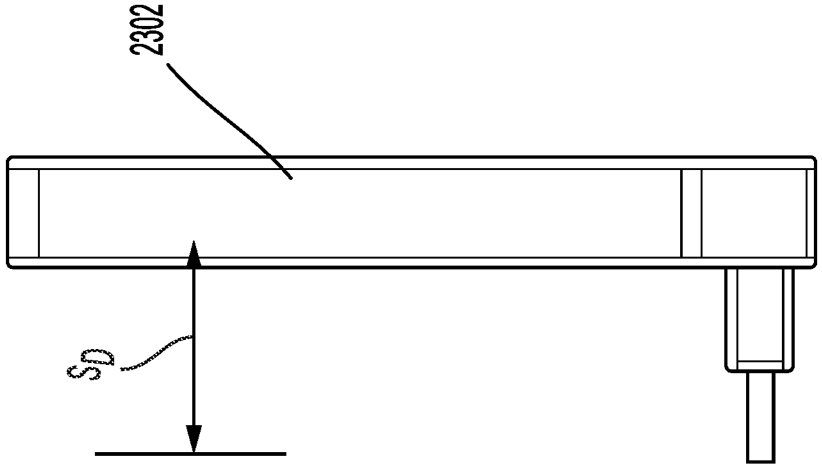
FIG. 23B is a side view of the inductive sensor coils of FIG. 23A.

Referring to FIGS. 21A-23B, other example implementations illustrate mode change sensor using an inductive sensor. FIG. 21A is a side assembled view of another mode change sensor using an inductive sensor in a first position. FIG. 21B is a side assembled view of the mode change sensor of FIG. 21A in a second position. FIG. 22A is a partial side assembled view of the mode change sensor of FIG. 21A illustrating an inset view of inductive sensing coils. FIG. 22B a partial cutaway side assembled view of the mode change sensor of FIG. 21A. FIG. 23A is a top view of inductive sensor coils. FIG. 23B is a side view of the inductive sensor coils of FIG. 23A.

In FIGS. 21A and 21B, an inductive sensor board 2102 is used to detect a change in position/axial movement of the output clutch 2104. The inductive sensor board 2102 is positioned above the output clutch 2104. FIG. 21A shows the output clutch 2104 is a first disengaged position, where the output clutch 2104 is disengaged from the intermediate clutch 2106. In FIG. 21B, the inductive sensor board 2102 no longer senses the ferrous metal of the output clutch 2104 as the output clutch 2104 moves axially towards the intermediate clutch 2106. Responsive to sensing this change, the inductive sensor board 2102 sends a signal to turn the motor ON. When the output clutch 2104 disengages from the intermediate clutch 2106, the inductive sensor board 2102 senses the ferrous metal of the output clutch 2104 and sends a signal to turn the motor OFF.

In some implementations, the scheme can also be reversed and the inductive sensor board 2102 can look at the gap between the output clutch 2104 and the intermediate clutch 2106. Then, when the output clutch 2104 moves into view, the inductive sensor board 2102 would detect the movement and turn the motor ON and OFF, as appropriate.

FIG. 22A illustrates the details of the inductive sensor 2202 with a receiving coil 2220 on the top side of the printed circuit board and the sensing coil 2224 on the bottom (clutch) side of the printed circuit board, where the output clutch is in a forward position.

Figure 23A:
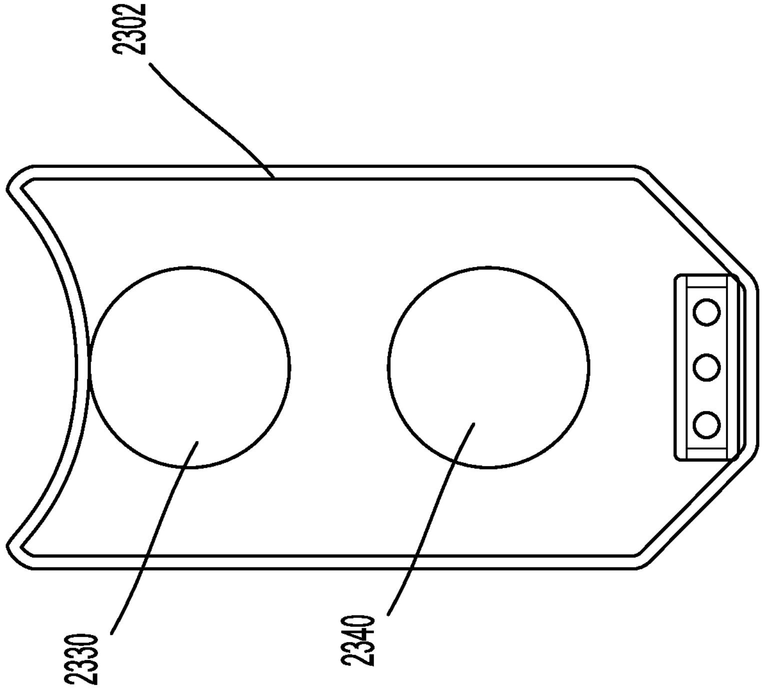
FIG. 23A is a top view of inductive sensor coils.

FIGS. 22B, 23A, and 23B illustrate a two coil inductive sensor implementation. The printed circuit board 2302, also referred to as an Auto Start Module, includes an inductive sensor using a side by side coil design to achieve the furthest sensing range with a first coil 2330 and a second coil 2340. The switching distance $S_D$ is a fixed distance from the sensor's surface where a conductive target will switch the sensor output signal from Low to High. The switching distance $S_D$ is approximately 40% of the coil diameter with an approximate coil diameter of between 5 mm and 9 mm (e.g., approximately 7 mm) and an approximate switching distance $S_D$ of between 2 mm and 3.6 mm (e.g., approximately 2.8 mm). The target for the inductive sensor is the output clutch 2304 and the distance from the inductive sensor to the target is the Target Distance or $T_D$.

Figure 24:
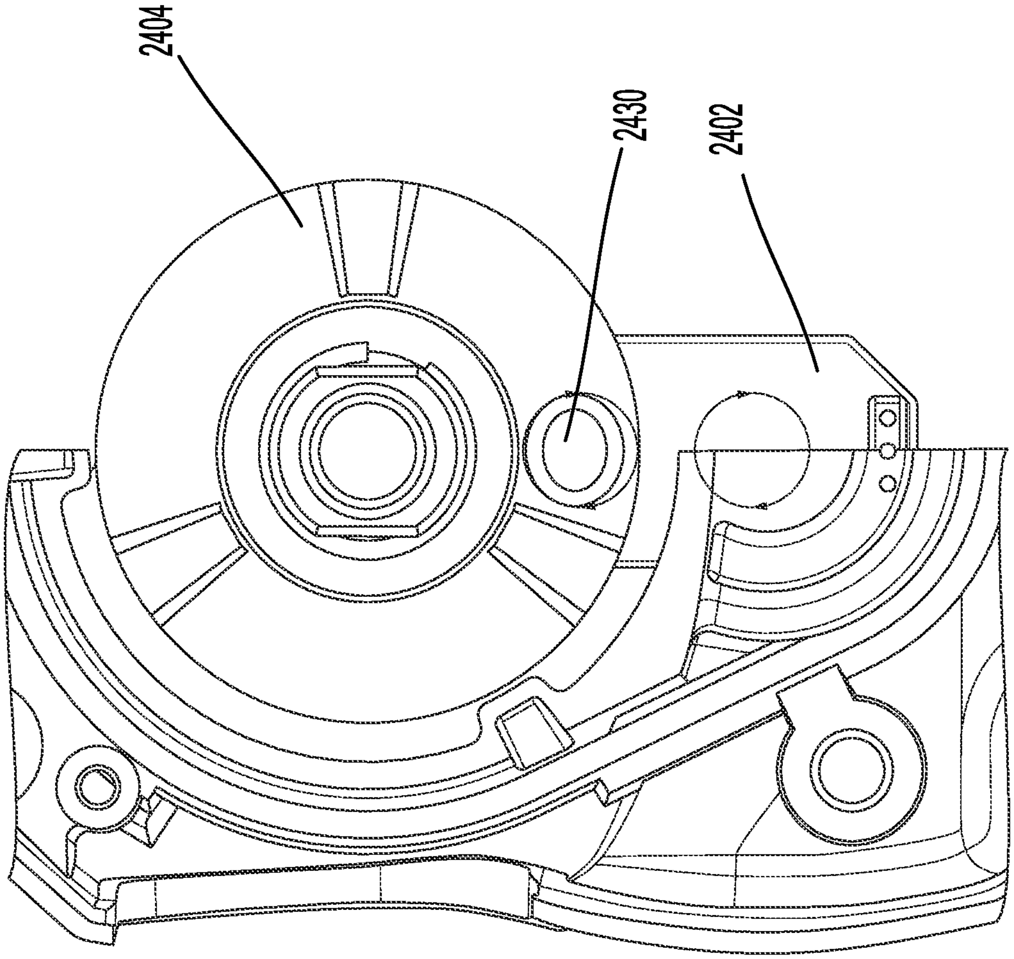
FIG. 24 is a top view of inductive sensor coils.

Referring to FIG. 24, the location of the inductive sensor coils is illustrated. The auto start module 2402 is housed inside the gear case behind the output clutch 2404. The sense coil 2430 is positioned so the output clutch 2404 covers 100% of the coil diameter.

Figure 25B:
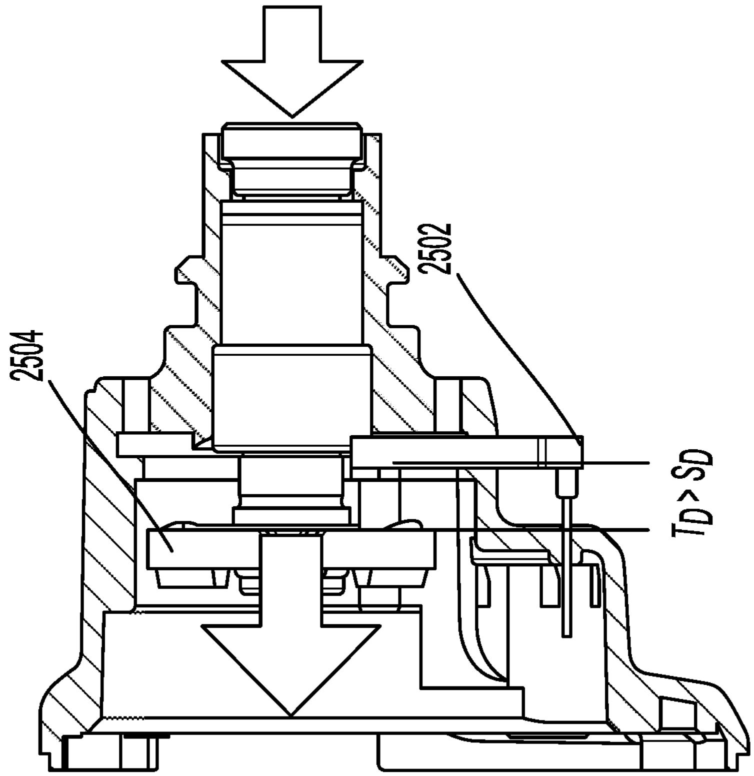
FIG. 25B is a partial cutaway side assembled view of the inductive sensor of FIG. 25A in a second position.
Figure 25A:
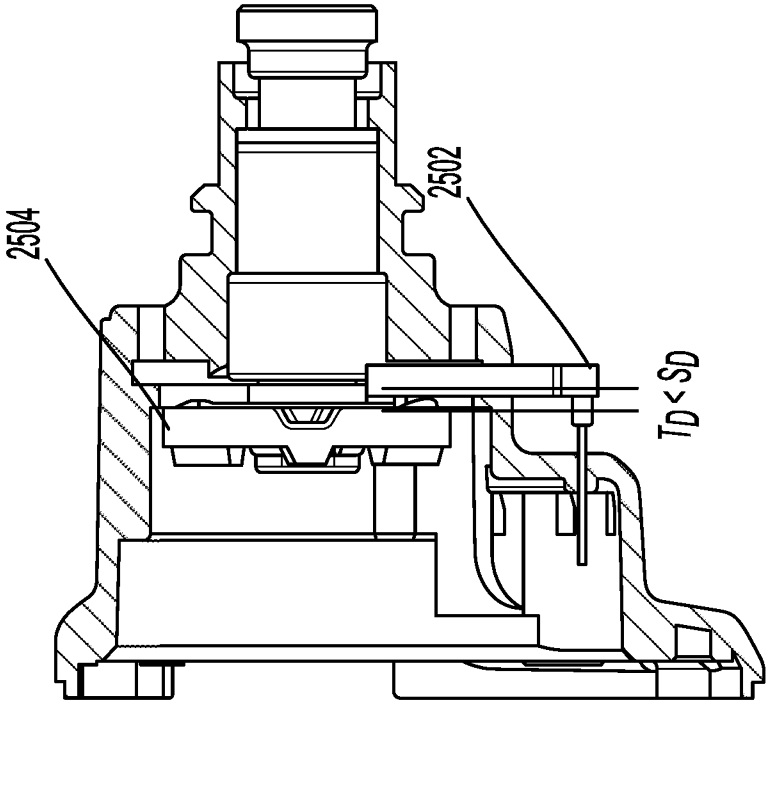
FIG. 25A is a partial cutaway side assembled view of an inductive sensor in a first position.

Referring to FIGS. 25A and 25B, the output clutch 2504 is shown in a position at rest (or home position) (FIG. 25A) and during actuation (FIG. 25B). When the output clutch 2504 displacement is greater than the switching distance ($T_D > S_D$), the auto start module 2502 will send a HIGH signal to the motor. As the output clutch 2504 disengages from the motor, the $T_D < S_D$ and the auto start module 2502 will send a LOW signal to stop the motor.

Figure 26A:
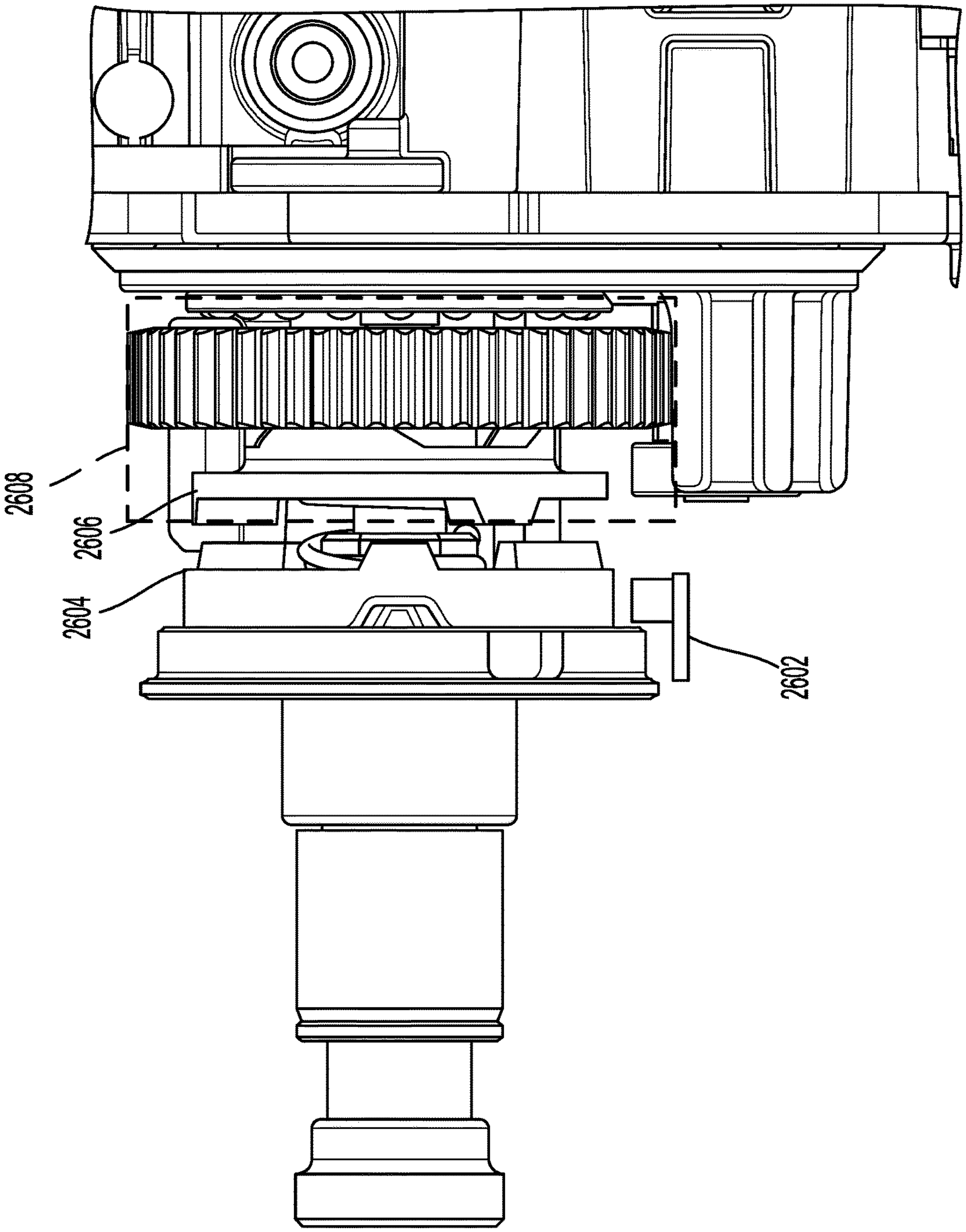
FIG. 26A is a partial side assembled view of a two coil radial inductive sensor in a first position.
Figure 26B:
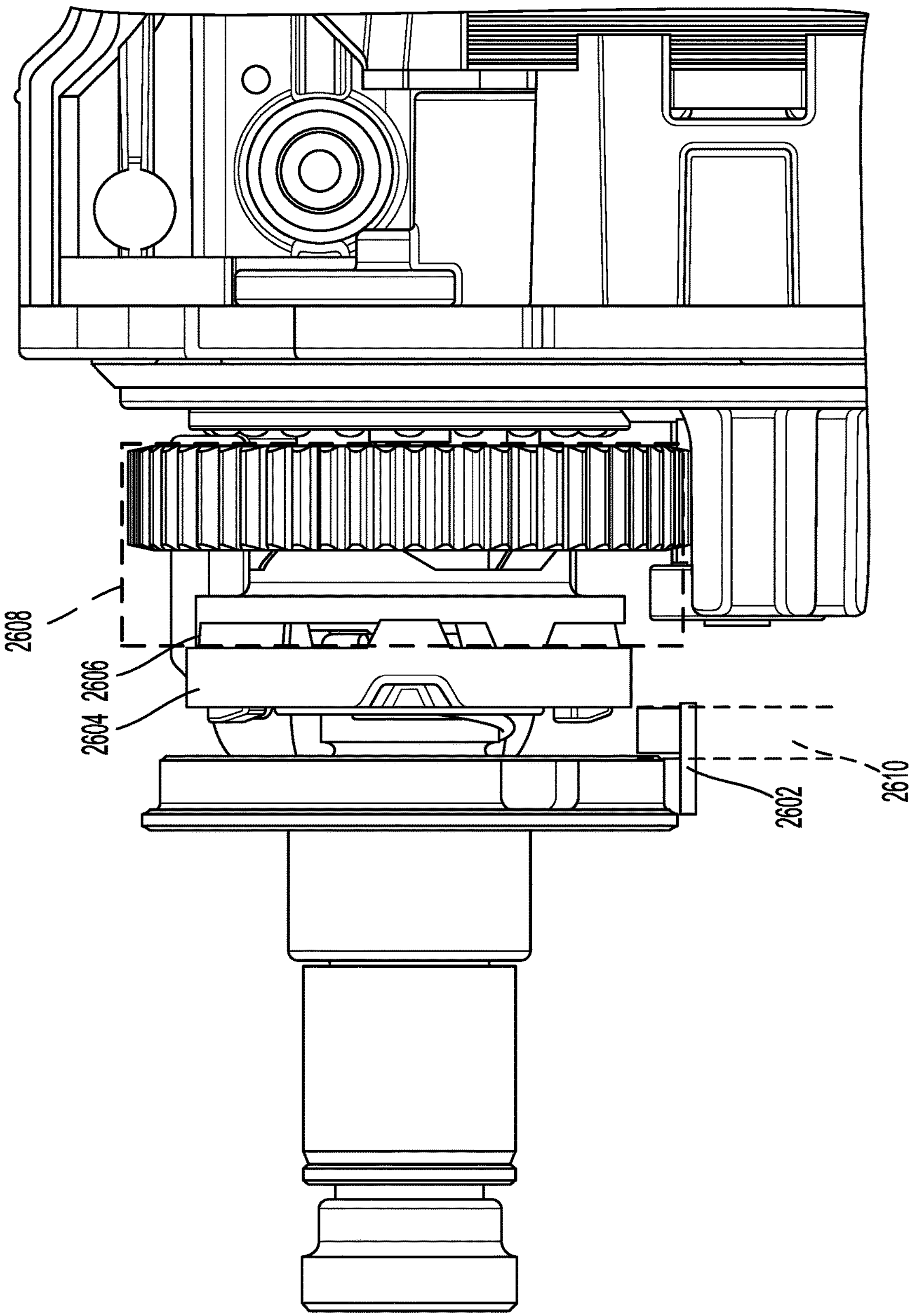
FIG. 26B is a partial side assembled view of the two coil radial inductive sensor of FIG. 26A in a second position.

Referring to FIGS. 26A and 26B, another example implementation of a mode change sensor that uses a two coil radial inductive sensor 2602 (also referred to as inductive sensor or inductive sensor board) is illustrated. FIG. 26A illustrates a partial side assembled view of a two coil radial inductive sensor 2602 in a first position with the output clutch 2604 disengaged from the intermediate clutch 2606 (i.e., the output clutch 2604 in rest position meaning no pressure is being applied by the user to a workpiece). The inductive sensor board 2602 is fixed in position in the gearcase disposed below the output clutch 2604. The inductive sensor 2602 is positioned to detect movement of the output clutch 2604 towards the intermediate clutch 2606 by watching for a gap between the gear case 2608 and the output clutch 2604 when pressure is applied by the user against a workpiece.

FIG. 26B illustrates a partial side assembled view of the two coil radial inductive sensor 2602 of FIG. 26A in a second position when the output clutch 2604 has moved towards to the intermediate clutch 2606 (i.e., the output clutch 2604 has moved into driving position to drive a fastener). The inductive sensor 2602 senses the gap 2610 between the gear case 2608 and the output clutch 2604 as the output clutch 2604 moves axially toward the intermediate clutch 2606. Responsive to sensing the gap 2610, the inductive sensor 2602 sends a signal to turn the motor ON and the output clutch 2604, output spindle, and tool bit holder rotate to drive a fastener. When the output clutch 2604 disengages from the intermediate clutch 2606, the output clutch 2604 returns to the rest position and the gap 2610 is closed. The inductive sensor 2602 senses the gap 2610 is closed and sends a signal to turn the motor OFF.

Figure 27A:
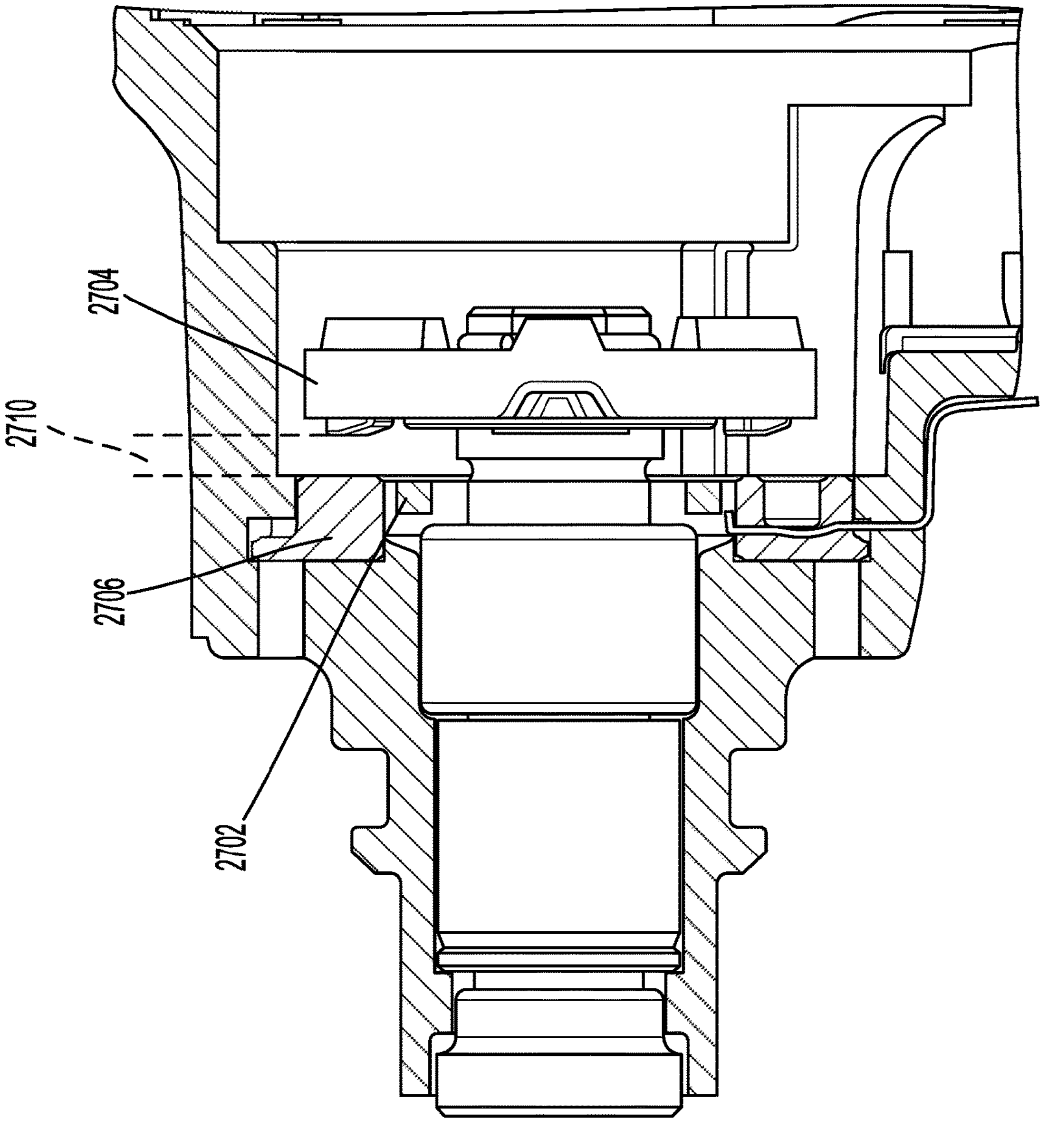
FIG. 27A is a partial side assembled view of a two coil axial inductive sensor in a first position.
Figure 27B:
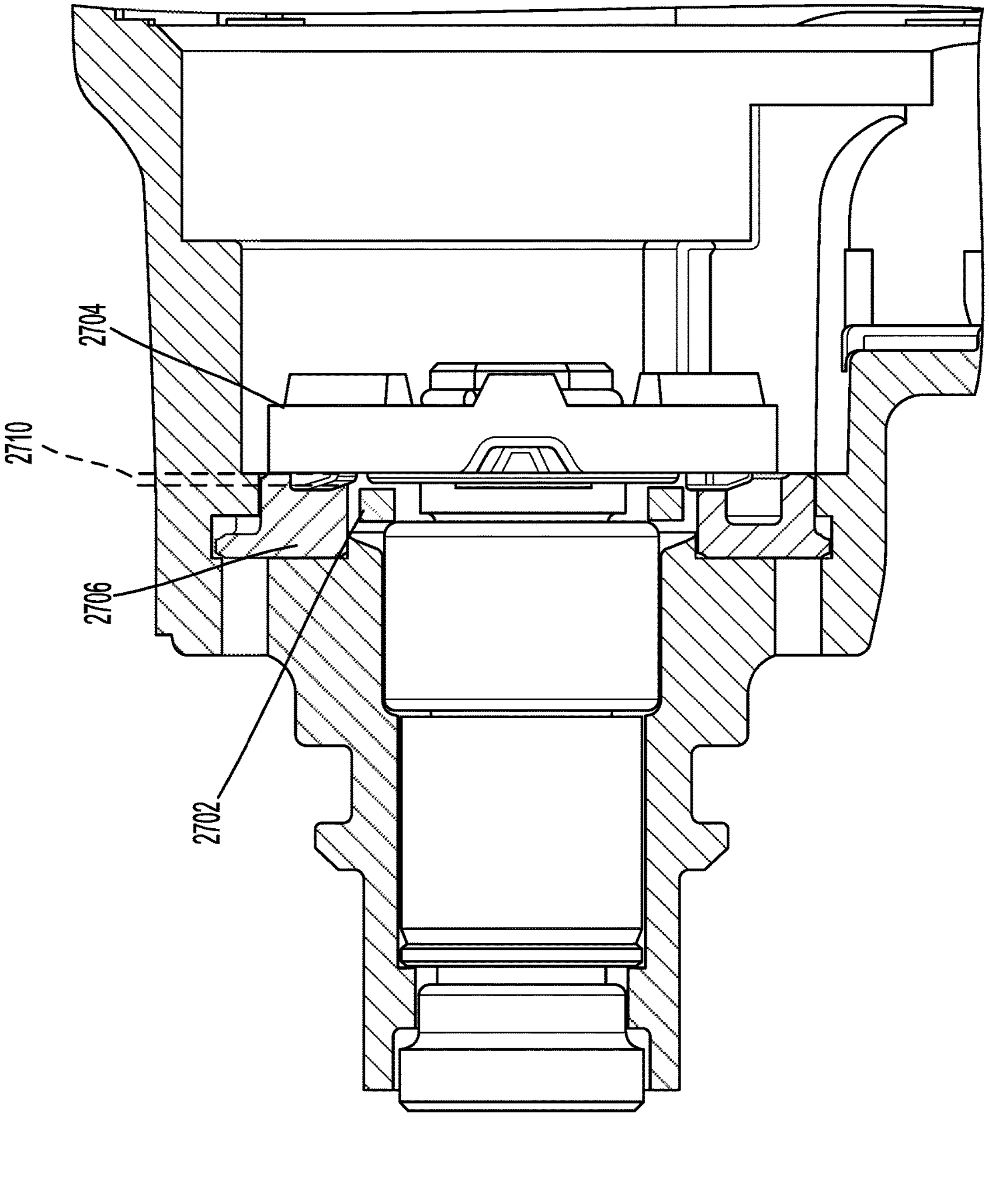
FIG. 27B is a partial side assembled view of the two coil axial inductive sensor of FIG. 27A in a second position.
Figure 27C:
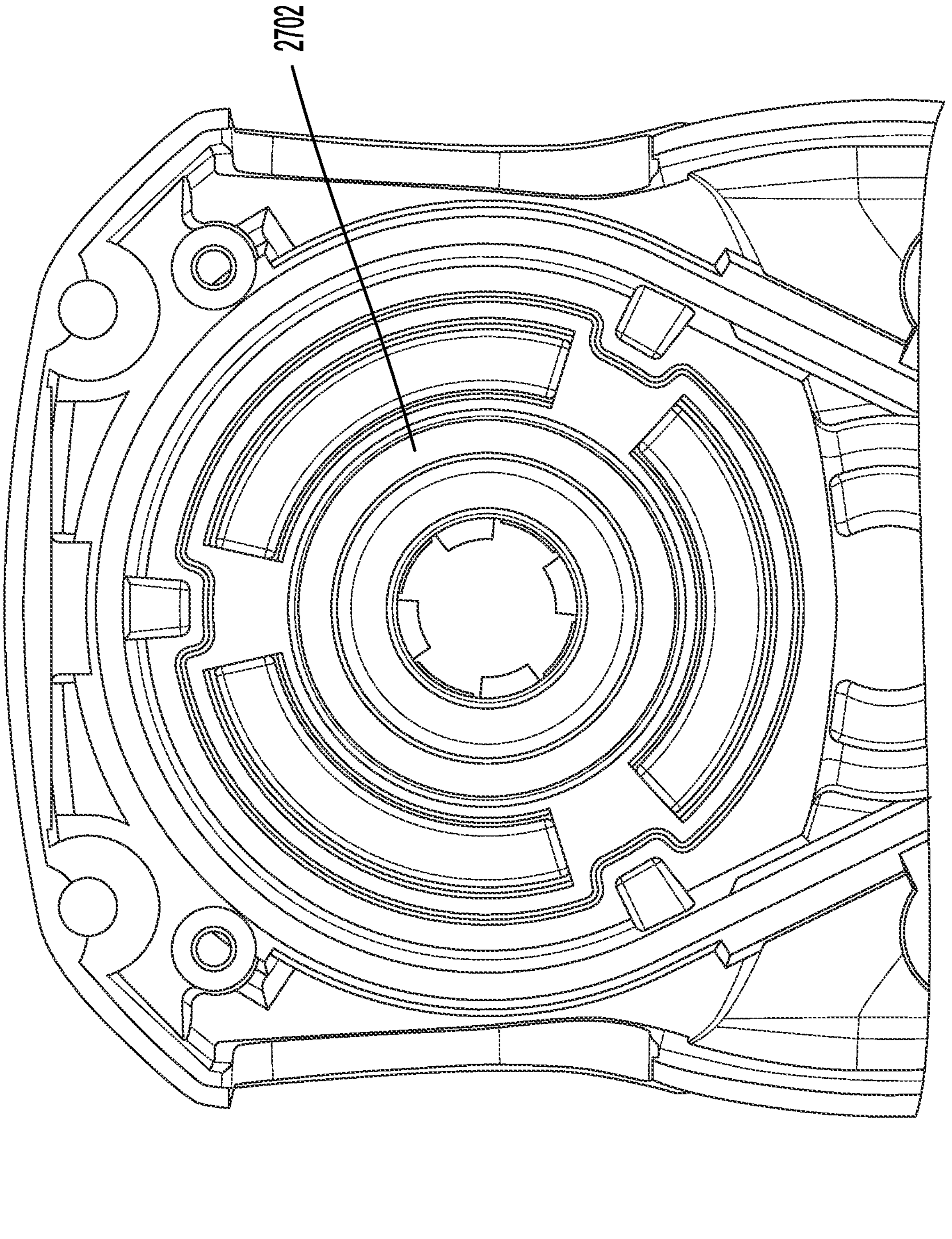
FIG. 27C is a front view of the two coil axial inductive sensor of FIG. 27A.

Referring to FIGS. 27A-27C, another example implementation of a mode change sensor using an axial inductive sensor is illustrated. A donut-shaped induction sensor 2702 is used that is concentric with the output shaft axis of rotation. This allows the induction sensor 2702 to nest in the assembly and use less space. The induction sensor 2702 works by looking at the outside face of the output clutch 2704 and senses a change in the distance of the output clutch 2704 when the power tool is in use. FIG. 27A illustrates a partial side assembled view of a two coil axial inductive sensor 2702 in a first position with the output clutch 2704 engaged with the intermediate clutch 2706 is a drive mode. A gap 2710 is created when the output clutch 2704 is in the drive mode and the donut-shaped inductive sensor 2702 senses the gap 2710 and sends a signal via the wire to turn the motor ON. FIG. 27B illustrates a partial side assembled view of the two coil axial inductive sensor 2702 of FIG. 27A in a second position when the output clutch 2704 is disengaged from the intermediate clutch 2706 in the rest position. The gap 2710 is closed in this position and the inductive sensor 2702 senses the closed gap 2710 and sends a signal to turn the motor OFF. FIG. 27C illustrates a front view of the two coil axial inductive sensor 2702 of FIG. 27A showing its donut shape and location concentric with the output shaft.

In one or more of the mode change sensor implementations described above, a duty cycle method to "pulse" the sensor at a % duty cycle may be used to reduce electromagnetic interference (EMI). For example, at a 20% duty cycle, the sensor is on for 2 ms and off for 8 ms. This duty cycle is fast enough to detect the output clutch movement faster than a user can perceive the movement. Operating the inductive sensor on a duty cycle provides the advantage of much lower EMI emissions than if no duty cycle is used and the sensor is on for 100% of the time.

Figure 28A:
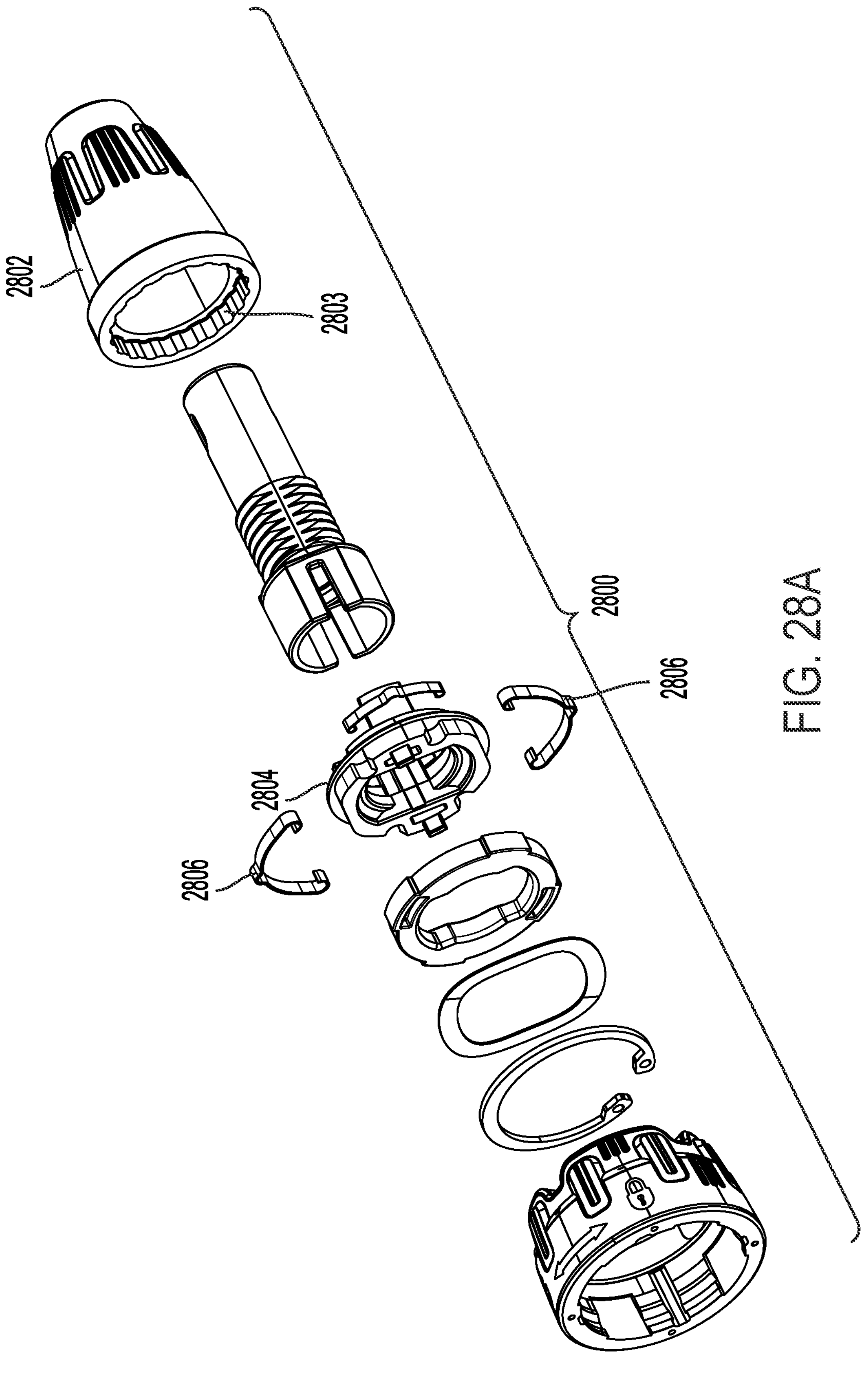
FIG. 28A is a rear perspective exploded view of a depth adjustment nosecone with a depth collar adjustment.
Figure 28B:
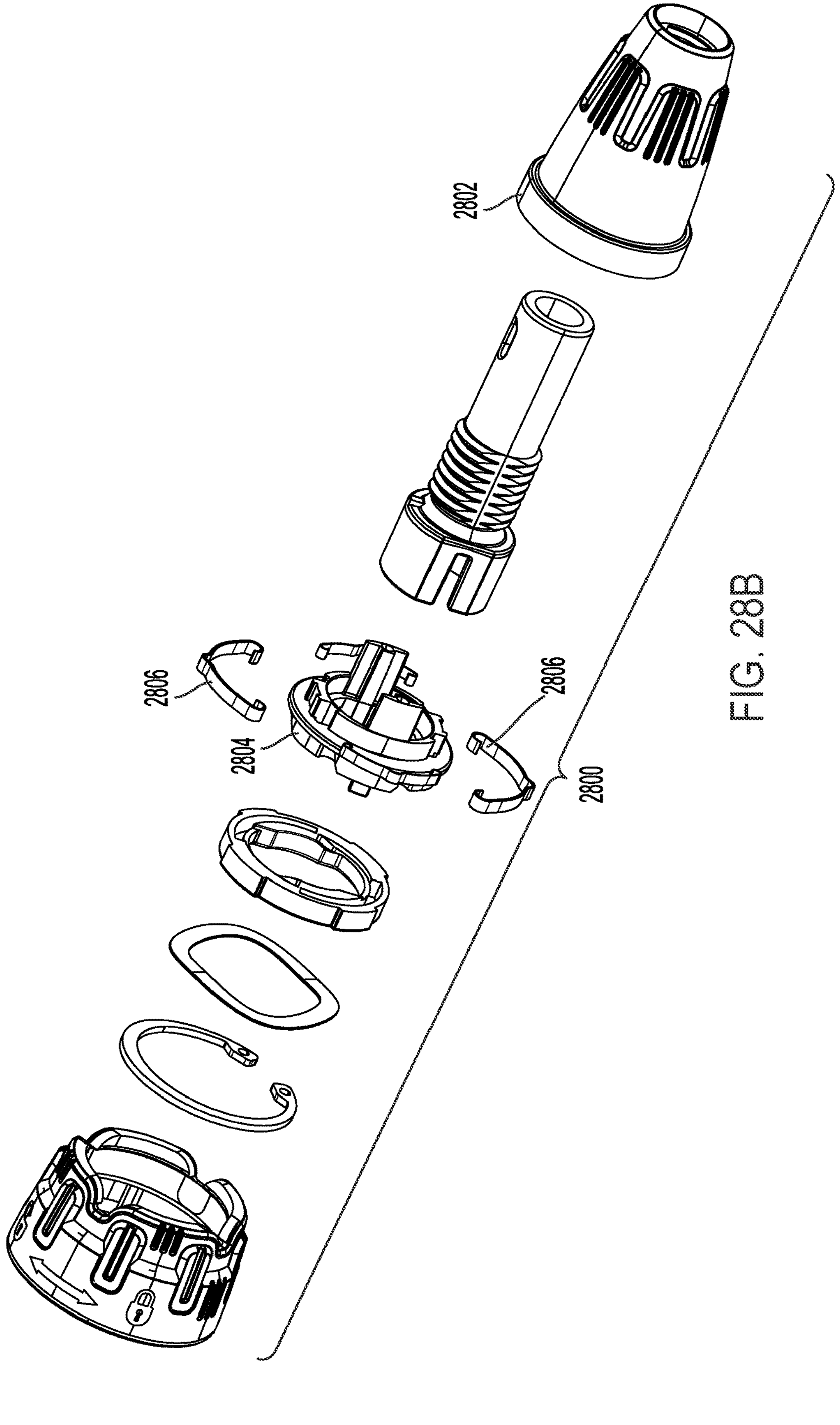
FIG. 28B is a front perspective exploded view of the depth adjustment nosecone of FIG. 28A.

Referring to FIGS. 28A and 28B, a depth adjustment nosecone 2800 with a depth adjustment collar 2802 is illustrated. FIG. 28A is a rear perspective exploded view of a depth adjustment nosecone 2800 with a depth adjustment collar 2802. FIG. 28B is a front perspective exploded view of the depth adjustment nosecone 2800 of FIG. 28A. The depth adjustment nosecone 2800 is removeable and is used to adjust the depth to which a screw can be driven. An example depth adjustment nosecone is described in commonly assigned U.S. Pat. No. 10,406,661 at col. 6, line 12 to col. 7, line 14, which is herein incorporated by reference.

In FIGS. 28A and 28B, the depth adjust nosecone 2800 includes differences from the incorporated patent such as the depth adjustment collar 2802 has concave indexing recesses 2803 that are used to hold the depth adjustment collar 2802 in a fixed position. The spring holder assembly 2804 includes leaf springs 2806 that engage the concave indexing recesses 2803 as the depth adjustment collar 2802 rotates.

Figure 29A:
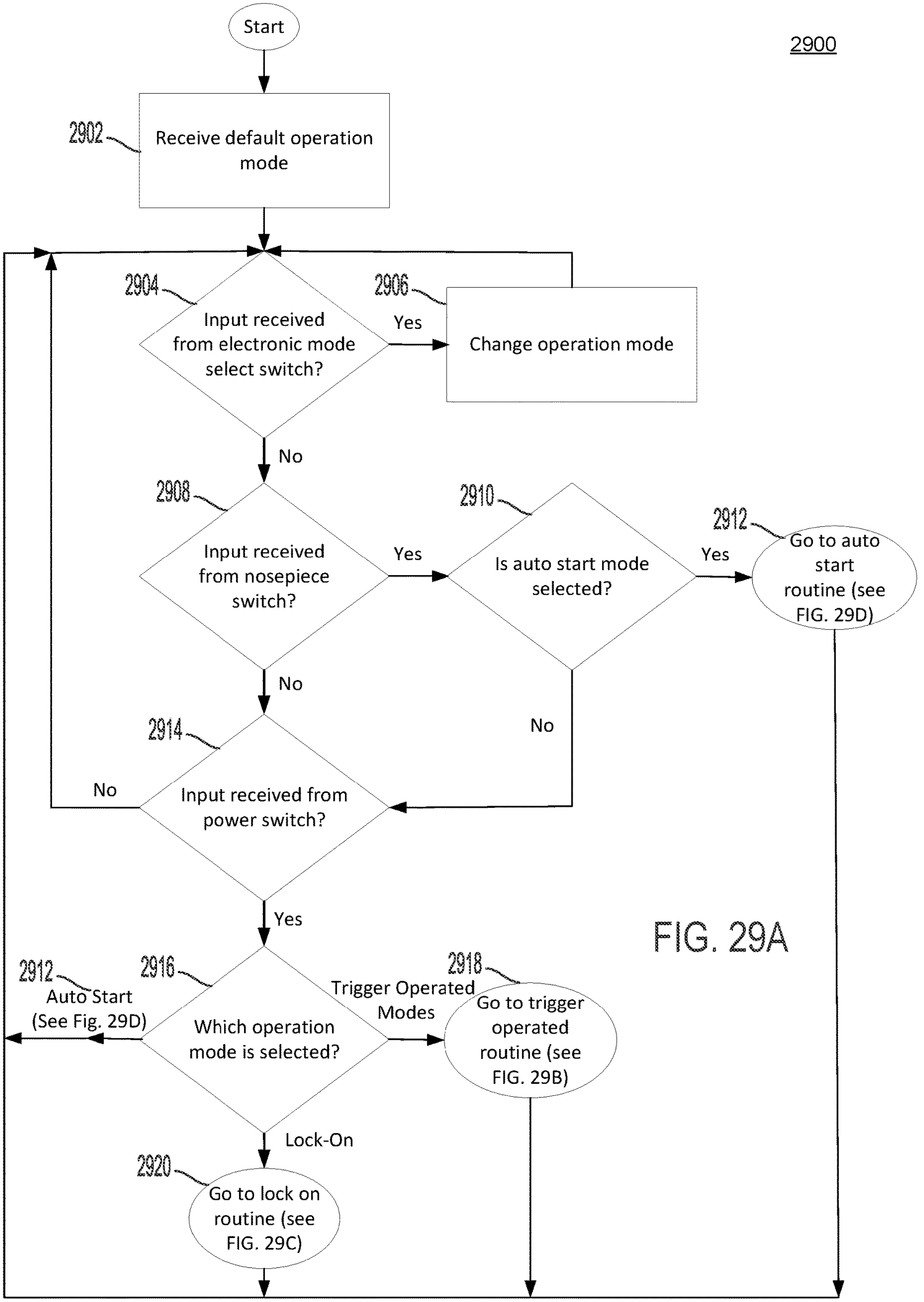
FIG. 29A is an example flowchart of the operations of the screwgun of FIGS. 1A-1H.
Figure 29B:
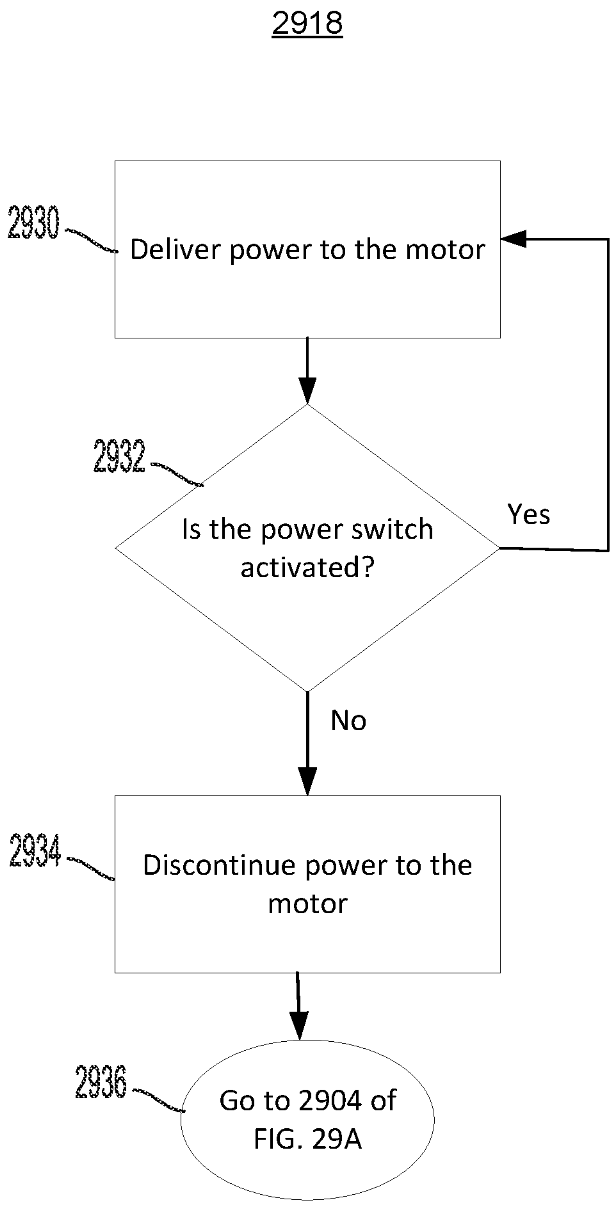
FIG. 29B is an example flowchart of the trigger operated modes of operation of the screwgun of FIGS. 1A-1H.
Figure 29C:
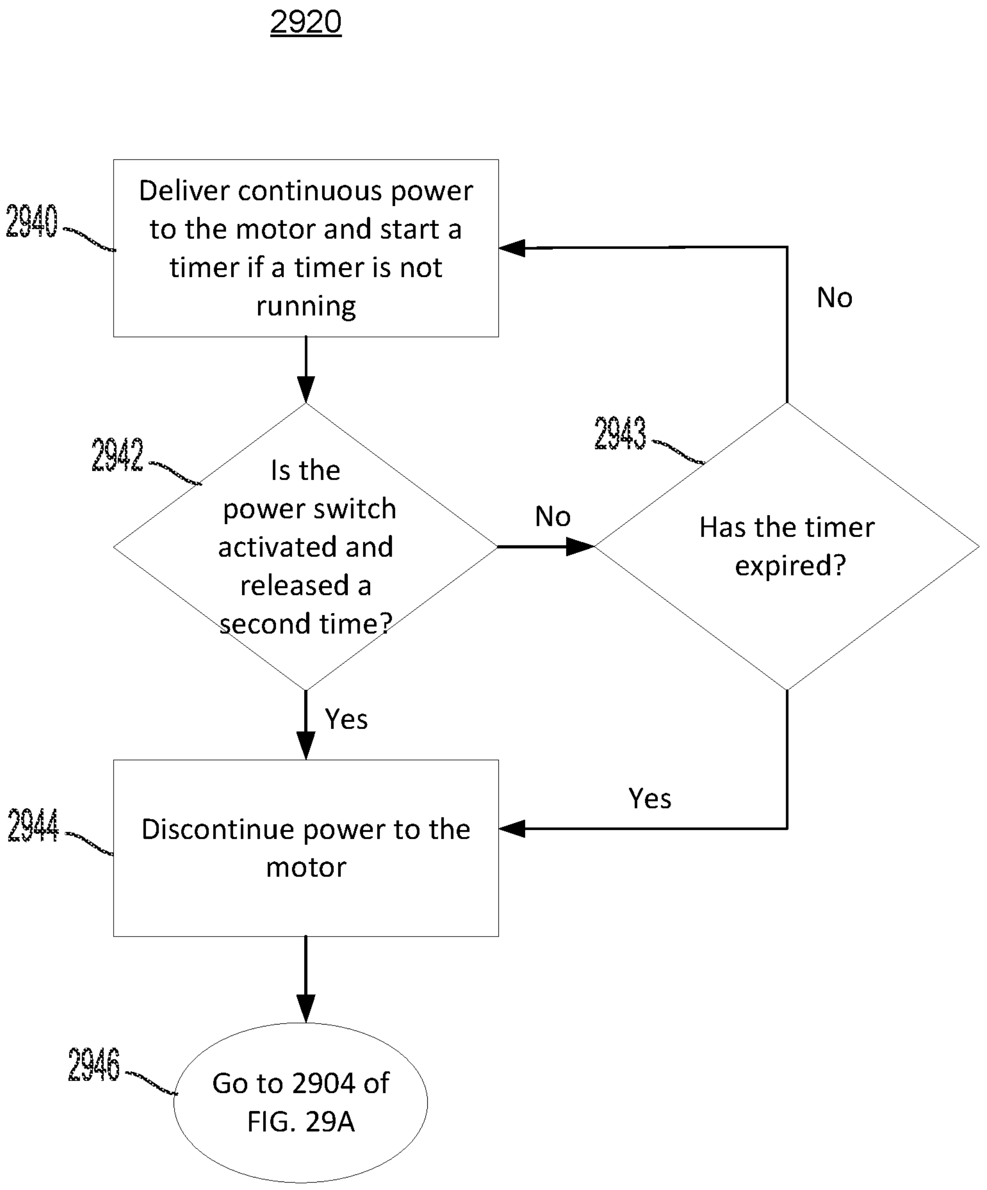
FIG. 29C is an example flowchart of the lock on mode of operation of the screwgun of FIGS. 1A-1H.
Figure 29D:
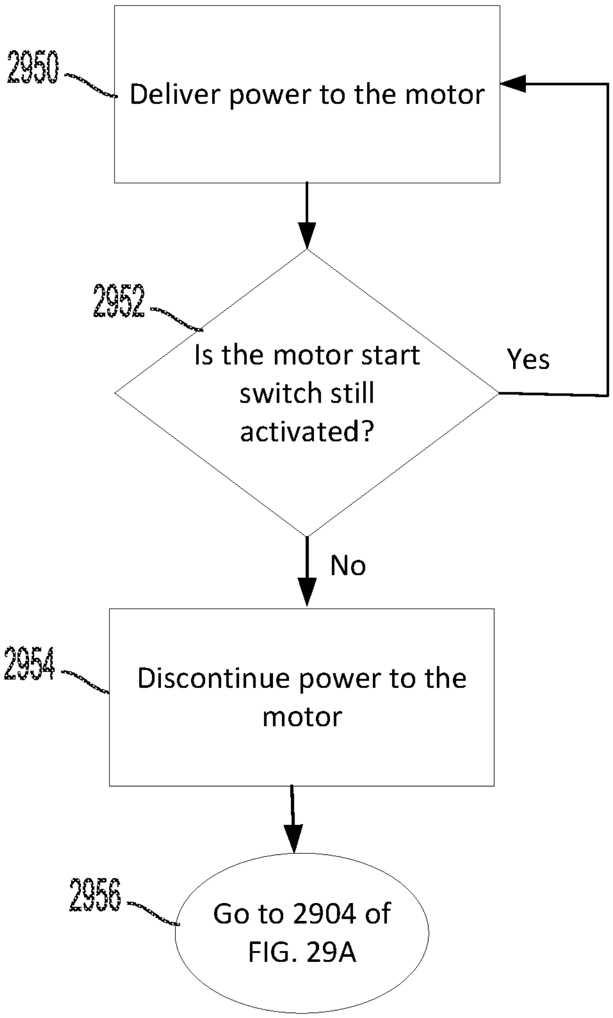
FIG. 29D is an example flowchart of the auto start mode of operation of the screwgun of FIGS. 1A-1H.

FIG. 29A is an example flowchart of a process 2900 for controlling the operation of a power tool such as, for example, the power tool 10 of FIGS. 1A-1H. FIG. 29B is an example flowchart of the trigger operated modes of operation of the screwgun of FIGS. 1A-1H. FIG. 29C is an example flowchart of the lock on mode of operation of the screwgun of FIGS. 1A-1H. FIG. 29D is an example flowchart of the auto start mode of operation of the screwgun of FIGS. 1A-1H. Process 2900 is performed by the power tool 10. More specifically, process 2900 may be performed using the components of the motor controller, which may include a memory module and a microcontroller, and/or the electronic mode select switch 60, which includes a memory module 63 and a microcontroller 62, as illustrated in FIG. 7. In some implementations, the motor controller may be a component separate from the power switch 30 and the electronic mode select switch 60 or the motor controller may be incorporated as a component of the power switch 30 or the electronic mode select switch 60.

Referring to FIG. 29A, process 2900 includes receiving a default operation mode (2902). In some implementations, the default operation mode includes the last operation mode of the power tool as stored in the memory module 63 of the electronic mode select switch 60, as illustrated in FIG. 7. The last operation mode may be stored as an operation mode state in the memory module 63. The memory module 63 may retain the operation mode state for a period of time. In some implementations, the operation mode state is retained for the period of time, but may be erased upon certain events such as, for example, the removal of the battery pack from the power tool. If there is no operation mode state stored in the memory module 63, then a default operation mode is entered, where the default operation mode may be a triggered operated mode such as, for example, the manual high speed operation mode.

In some implementations, the memory module 63 retains state information for the operation mode. In some implementations, the memory module in the motor controller may maintain state information for the operation mode.

In some implementations, process 2900 may not default to the last operation mode as stored in the memory module 63 and instead may use a default operation mode, where the default operation mode may be one of the trigger operated modes such as, for example, the manual high speed mode or the manual low speed mode.

Process 2900 determines whether an input was received from the electronic mode select switch (2904). For example, the power tool 10 determines if the user has selected the electronic mode select switch 60. If an input from the electronic mode select switch 60 is received, then the operation mode of the power tool 10 is changed (2906). The selected mode may be stored in the memory module 63 and/or in a memory module in the motor controller. Then, process 2900 loops back and determines again if an input from the electronic mode select switch has been received (2904). In this manner, a user may cycle through and select a desired operation mode for the power tool 10, as described above in more detail.

If an input from the electronic mode select switch 60 is not received or is not received again, then the power tool 10 determines if an input is received from the nosepiece switch (2908). As discussed above, the nosepiece switch may be a part of the sensor assembly 78, which is activated when the user presses the power tool 10 against a workpiece. If there is an input from the nosepiece switch and the auto start mode is selected (2910), then the auto start mode operation is performed (2912).

If there is no input received from the nosepiece switch (2908) or the auto start mode is not detected (2910), then process 2900 determines whether an input has been received from the power switch 30 (2914). If no input is received from the power switch 30, then process 2900 goes back to determine whether an input is received from the electronic mode select switch 60 (2904). If an input is received from the power switch 30, then the power tool 10 determines which operation mode is selected (2916). The microcontroller 62 in the electronic mode select switch 60 may be programmed to determine the operation mode (2916) and retrieve the selected mode from storage in the memory module 63 and/or the motor controller.

Depending on the selected operation mode 2916, power is delivered to the motor in one of the trigger operated mode (2918), the lock on mode (2020), or the auto start mode (2012).

Referring to FIG. 29B, the trigger operated mode routine 2918 is illustrated. When the power switch 30 is activated and the power tool 10 is in the trigger operated mode, then power is delivered to the motor (2930). As long as the power switch 30 is activated (2932), power is delivered to the motor (2930). When the power switch 30 is released or deactivated, then power is discontinued to the motor (2934) and the process returns (2936) to FIG. 29A at step 2904 to determine whether an input is received from the electronic mode select switch 60.

The triggered operated mode may include a manual high speed mode, a manual low speed mode, or a variable speed mode. In the manual high speed mode, the motor is controlled to rotate at a substantially constant high speed (or substantially constant high target speed) regardless of the travel distance of the power switch. In the manual low speed mode, the motor is controlled to rotate at a substantially constant low speed (or substantially constant low target speed) regardless of the travel distance of the power switch. In the variable speed mode, the speed of the motor depends on the travel distance of the power switch. Additional details for these modes of operation are described above.

Referring to FIG. 29C, the lock on mode routine 2920 is illustrated. When the lock on mode has been selected, continuous power is delivered to the motor (2940) starting when the power switch is activated. At the same time a timer is started if a timer is not currently running. Continuous power continues to be delivered to the motor without interruption, even if the power switch is subsequently released. Power continues to be delivered to the motor (2940) until the power switch is subsequently actuated and released a second time (step 2942) or until a timer expires (step 2943), whichever comes first. Once the power switch is activated and released a second time (2942) or the timer expires (2943), then power to the motor is discontinued (2944) and the process returns (2946) to FIG. 29A at step 2904 to determine whether an input is received from the electronic mode select switch.

Referring to FIG. 29D, the auto start mode routine 2912 is illustrated. When the auto start mode has been selected, power is delivered to the motor (2950). As long as the motor start switch is activated (2952), power is delivered to the motor (2950). The motor start switch may be one or both of the power switch 30 and the nosepiece switch, which is part of the sensor assembly 78. That is, power may be delivered to the motor in the auto start mode using one or both of the power switch 30 and the nosepiece switch. Once the motor start switch is released or no longer activated (2953), then power to the motor is discontinued (2954) and the process returns (2956) to FIG. 29A at step 2904 to determine whether an input is received from the electronic mode select switch.

It is understood that the elements of process 2900 may be performed in a different order than the order illustrated in FIG. 29A.

In the following some examples are described.

Example 1: A power tool comprising:

a housing;

a motor disposed in the housing;

a motor controller disposed in the housing and electrically coupled to the motor;

a transmission disposed in the housing and coupled to the motor;

a tool bit holder configured to be rotatably driven by the motor via the transmission and configured to receive a tool bit for rotatably driving threaded fasteners;

a power switch actuatable from outside the housing and coupled to the motor controller to control power delivery to the motor; and an electronic mode select switch actuatable from outside the housing and electrically coupled to the motor controller, the electronic mode select switch configured to select between at least a first mode of operation in which power delivery to the motor is controlled by actuation of the power switch and an electronic lock on mode in which continuous power is delivered to the motor upon a single actuation and release of the power switch.

Example 2: A power tool comprising:

a housing including a motor housing portion, a transmission housing portion coupled to the motor housing portion, and a handle portion coupled to and extending transverse to the motor housing portion;

a motor disposed at least partially in the motor housing portion;

a motor controller disposed in the housing and electrically coupled to the motor to control power delivery to the motor;

a transmission disposed at least partially in the transmission housing portion;

a tool bit holder configured to be rotatably driven by the motor via the transmission and configured to receive a tool bit for rotatably driving threaded fasteners;

a power switch actuatable from outside the housing and coupled to the motor controller to control power delivery to the motor; and an electronic mode select switch coupled to and actuatable from outside the motor housing, the electronic mode select switch electrically coupled to the motor controller and configured to select among a plurality of modes of operation of the motor, wherein the electronic mode select switch is configured to be actuatable by a user with one hand while gripping the housing with the one hand in a position for actuating the power switch and driving a threaded fastener into a workpiece.

Example 3: A power tool comprising:

a housing including a motor housing portion, a transmission housing portion coupled to the motor housing portion, and a handle portion coupled to and extending transverse to a bottom surface of the motor housing portion, the motor housing portion including a top surface generally opposite the bottom surface;

a motor at least partially disposed in the motor housing portion;

a motor controller disposed in the housing and electrically coupled to the motor;

a transmission disposed at least partially in the transmission housing portion;

a tool bit holder configured to be rotatably driven by the motor via the transmission and configured to receive a tool bit for rotatably driving treaded fasteners;

a power switch actuatable from outside the housing and coupled to the motor controller to control power delivery to the motor;

an electronic mode select switch coupled to and actuatable from outside the motor housing portion, the electronic mode select switch electrically coupled to the motor controller and configured to select among a plurality of modes of operation of the motor, the electronic mode select switch disposed on the top surface of the motor housing portion; and a belt clip disposed on the top surface of the motor housing portion.

Example 4: A power tool comprising:

a housing;

a motor disposed in the housing;

a motor controller disposed in the housing and electrically coupled to the motor;

a transmission and clutch assembly disposed in the housing and coupled to the motor, the transmission and clutch assembly including at least an output clutch and an input clutch;

a tool bit holder configured to be rotatably driven by the motor via the transmission and clutch assembly and configured to receive a tool bit for rotatably driving threaded fasteners;

a power switch actuatable from outside the housing and coupled to the motor controller to control power delivery to the motor;

an electronic mode select switch actuatable from outside the housing and electrically coupled to the motor controller and having one or more modes of operation for controlling power to the motor; and a mode change sensor for sensing changes in position of the output clutch, the mode change sensor located forward of the input clutch and configured to send signals to the electronic mode select switch responsive to sensing changes in the position of the output clutch.

Example 5: A power tool comprising:

a housing;

a motor disposed in the housing;

a motor controller disposed in the housing and electrically coupled to the motor;

a transmission and clutch assembly disposed in the housing and coupled to the motor, the transmission and clutch assembly including a planetary gear assembly having a planet carrier, an output clutch, an intermediate clutch coupled to one face of the planet carrier, and an input clutch integrated with an opposite face of the planet carrier;

an electronic mode select switch coupled to and actuatable from outside the motor housing, the electronic mode select switch electrically coupled to the motor controller and configured to select among a plurality of modes of operation of the motor; and a tool bit holder configured to be rotatably driven by the motor via the transmission and clutch assembly and configured to receive a tool bit for rotatably driving threaded fasteners.

Example 6: A power tool comprising:

a housing;

a motor disposed in the housing;

a motor controller disposed in the housing and electrically coupled to the motor;

a transmission disposed in the housing and configured to be driven by the motor;

an output spindle extending from the housing and configured to be moved axially relative to the housing when depressed against a workpiece;

a clutch disposed between the transmission and the tool bit holder, the clutch having an input clutch member coupled to the transmission and an output clutch member coupled to the output spindle, the output clutch moveable between a rearward position in which torque is transmitted from the transmission to the output spindle via the clutch when the output spindle is depressed against a workpiece, and a forward position in which torque transmission from the transmission to the output shaft is interrupted;

a sensor assembly including a sensed member coupled to the output spindle axially forward of the output clutch member and configured to move axially with the output spindle and a sensing member axially fixed relative to the housing to sense a position of the sensed member; and a brake mechanism configured to engage the output member the clutch when in the forward position to inhibit rotation of the output member, the brake mechanism including at least one leg extending from a point axially forward of the sensed member and extending past at least a portion of the sensed member to engage the output clutch member when in the forward position.

Example 7: The power tool as in any of the preceding examples, wherein the power tool is a screwgun.

As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A power tool comprising:

a housing including a motor housing portion, a transmission housing portion coupled to the motor housing portion, and a handle portion coupled to and extending transverse to a bottom surface of the motor housing portion, the motor housing portion including a top surface generally opposite the bottom surface;

a motor at least partially disposed in the motor housing portion;

a motor controller disposed in the housing and in electrical communication with the motor;

a transmission disposed at least partially in the transmission housing portion;

a tool bit holder configured to be rotatably driven by the motor via the transmission and configured to receive a tool bit for rotatably driving threaded fasteners;

a power switch actuatable from outside the housing and in electrical communication with the motor controller to control power delivery to the motor;

an electronic mode select switch coupled to and actuatable from outside the motor housing portion, the electronic mode select switch in electrical communication with the motor controller and configured to select among a plurality of modes of operation of the motor, the electronic mode select switch disposed on the top surface of the motor housing portion, wherein the top surface of the motor housing portion includes a wall that at least partially surrounds the electronic mode select switch, the electronic mode select switch being fully recessed relative to the wall; and a belt clip disposed on the top surface of the motor housing portion, wherein at least a portion of the belt clip forms the wall.

2. The power tool of claim 1, wherein the electronic mode select switch is recessed in the top surface of the motor housing portion and the belt clip extends above the top surface of the motor housing portion.

3. The power tool of claim 1, wherein the top surface of the motor housing portion includes a rib that is disposed at least partially surrounding the electronic mode select switch, wherein at least a portion of the rib forms the wall and the rib is raised above the top surface of the motor housing portion.

4. The power tool of claim 1, wherein the top surface of the motor housing portion includes multiple air vents disposed on the top surface of the motor housing portion.

5. The power tool of claim 1, wherein the electronic mode select switch is configured to be actuatable by a user with one hand while gripping the housing with the one hand in a position for actuating the power switch and driving a threaded fastener into a workpiece.

6. The power tool of claim 5, wherein the power switch is disposed on the handle portion.

7. The power tool of claim 6, wherein the housing includes multiple gripping regions that enable multiple, different gripping positions by the one hand of the user and enable access to both the electronic mode select switch and the power switch by the one hand of the user.

8. The power tool of claim 7, wherein the multiple gripping regions include:

a first gripping region on the transmission housing portion; and a second gripping region on a rear wall portion of a proximal portion of the handle portion.

9. The power tool of claim 8, wherein the multiple gripping regions further include:

a third gripping region on the motor housing portion; and a fourth gripping region on the rear wall portion of a distal portion of the handle portion.

10. The power tool of claim 9, wherein the multiple gripping regions further include:

a fifth gripping region on a front wall portion of the proximal portion of the handle portion; and a sixth gripping region on the front wall portion of the proximal portion of the handle portion distal of the fifth gripping region.

11. The power tool of claim 7, wherein the motor housing portion includes a first concave recess on a first side of the motor housing portion and a second concave recess on a second side of the motor housing portion, wherein:

the first side of the motor housing portion is opposite the second side of the motor housing portion, the first concave recess provides a first grip area for a thumb of the one hand of the user, and the second concave recess provides a second grip area for a forefinger of the one hand of the user.

12. A power tool comprising:

a housing;

a motor disposed in the housing;

a motor controller disposed in the housing and in electrical communication with the motor;

a transmission disposed in the housing and coupled to the motor;

a tool bit holder configured to be rotatably driven by the motor via the transmission and configured to receive a tool bit for rotatably driving threaded fasteners;

a power switch actuatable from outside the housing and in electrical communication with the motor controller to control power delivery to the motor; and an electronic mode select switch actuatable from outside the housing and in electrical communication with the motor controller, the electronic mode select switch configured to select between at least a first mode of operation in which power delivery to the motor is controlled by actuation of the power switch and an electronic lock on mode in which the electronic mode select switch and the motor controller function electronically to deliver continuous power to the motor starting upon an actuation and continuing after a subsequent release of the power switch.

13. The power tool of claim 12, wherein the housing includes a motor housing portion having a top surface and a bottom surface generally opposite the top surface, the power tool further comprising a belt clip disposed on the top surface of the motor housing portion.

14. The power tool of claim 13, wherein the electronic mode select switch is recessed in the top surface of the motor housing portion and the belt clip extends above the top surface of the motor housing portion.

15. The power tool of claim 13, wherein the top surface of the motor housing portion includes a rib that is disposed at least partially surrounding the electronic mode select switch, wherein the rib is raised above the top surface of the motor housing portion.

16. The power tool of claim 13, wherein the top surface of the motor housing portion includes multiple air vents disposed on the top surface of the motor housing portion.

17. The power tool of claim 12, wherein the electronic mode select switch is configured to be actuatable by a user with one hand while gripping the housing with the one hand in a position for actuating the power switch and driving a threaded fastener into a workpiece.

18. The power tool of claim 17, wherein the housing includes multiple gripping regions that enable multiple, different gripping positions by the one hand of the user and enable access to both the electronic mode select switch and the power switch by the one hand of the user.

19. The power tool of claim 12, wherein the electronic mode select switch includes an indicator that provides a visual indication of a selected mode of operation.

20. The power tool of claim 19, wherein the motor controller further includes:

a memory module for storing instructions for the first mode of operation and the electronic lock on mode; and a microcontroller that is configured to perform the instructions stored in the memory module and communicate the instructions to a motor control circuit.

21. The power tool of claim 12, wherein the first mode of operation is a manual high speed mode, and the electronic mode select switch is further configured to select among the first mode of operation, the electronic lock on mode, and a manual low speed mode in which power delivery to the motor is controlled by actuation of the power switch, wherein the manual low speed mode causes a lower amount of power delivery to the motor than the manual high speed mode.

22. The power tool of claim 21, wherein the power switch is a variable speed power switch.

23. The power tool of claim 12, wherein the electronic mode select switch is disposed on a top surface of the housing.

* * * * *